US009094242B2

(12) United States Patent
Yu et al.

(10) Patent No.: US 9,094,242 B2
(45) Date of Patent: *Jul. 28, 2015

(54) PILOT DESIGN FOR WIRELESS SYSTEM

(71) Applicant: Microsoft Corporation, Redmond, WA (US)

(72) Inventors: Dong-Sheng Yu, Ottawa (CA); Mo-Han Fong, L'Orignal (CA); Jianglei Ma, Kanata (CA); Sophie Vrzic, Nepean (CA); Hang Zhang, Nepean (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/506,544

(22) Filed: Oct. 3, 2014

(65) Prior Publication Data
US 2015/0055725 A1      Feb. 26, 2015

Related U.S. Application Data

(63) Continuation of application No. 13/967,167, filed on Aug. 14, 2013, now Pat. No. 8,879,652, which is a continuation of application No. 12/397,723, filed on Mar. 4, 2009, now Pat. No. 8,514,954.

(60) Provisional application No. 61/036,737, filed on Mar. 14, 2008, provisional application No. 61/033,637, filed on Mar. 4, 2008.

(51) Int. Cl.
*H04L 25/02* (2006.01)
*H04L 5/00* (2006.01)
(Continued)

(52) U.S. Cl.
CPC .......... *H04L 25/0226* (2013.01); *H04L 5/0023* (2013.01); *H04L 5/0048* (2013.01);
(Continued)

(58) Field of Classification Search
USPC .......................... 375/267, 260, 299, 347, 349
See application file for complete search history.

(56) References Cited

U.S. PATENT DOCUMENTS 7,869,341 B2   1/2011   Lim et al.
8,248,975 B2   8/2012   Fujita et al.
(Continued)

OTHER PUBLICATIONS

"Final Office Action", U.S. Appl. No. 12/397,723, Oct. 18, 2012, 14 pages.
(Continued)

*Primary Examiner* — Kabir A Timory
(74) *Attorney, Agent, or Firm* — Brandon Roper; Judy Yee; Micky Minhas

(57) ABSTRACT

The description herein relates to pilot designs for an Orthogonal Frequency Division Multiplexing (OFDM) based communication system. In at least one embodiment, the communication system is one operating according to the IEEE 802.16m, or WiMax, standard. In general, an OFDM transmitter operates to insert pilot symbols into a resource of a transmit frame according to a predetermined staggered pilot symbol pattern defining pilot symbol locations within the resource of the transmit frame. The predetermined pilot symbol pattern is defined such that pilot symbols are located at or near time boundaries of the resource, at or near frequency boundaries of the resource, or both. By doing so, when generating a channel estimate for the communication channel between the OFDM transmitter and an OFDM receiver based on the pilot symbols, extrapolations needed to estimate the channel near the boundaries of the resource are optimized, thereby improving overall channel estimation accuracy.

20 Claims, 44 Drawing Sheets

(51) Int. Cl.
*H04L 27/26* (2006.01)
*H04L 25/03* (2006.01)

(52) U.S. Cl.
CPC ............ *H04L25/0204* (2013.01); *H04L 27/26* (2013.01); *H04L 27/2647* (2013.01); *H04L 27/2611* (2013.01); *H04L 2025/03414* (2013.01)

(56) References Cited

U.S. PATENT DOCUMENTS

| | | |
|---|---|---|
| 8,514,954 B1 | 8/2013 | Yu et al. |
| 8,537,915 B2 | 9/2013 | Yu et al. |
| 8,879,652 B2 | 11/2014 | Yu et al. |
| 8,923,369 B2 | 12/2014 | Yu et al. |
| 2003/0072254 A1 | 4/2003 | Ma et al. |
| 2005/0174929 A1* | 8/2005 | Hayashi et al. ............... 370/208 |
| 2006/0146948 A1 | 7/2006 | Park et al. |
| 2006/0221808 A1 | 10/2006 | Shirakata et al. |
| 2007/0021130 A1* | 1/2007 | Taira ........................... 455/502 |
| 2007/0070882 A1 | 3/2007 | Kawauchi et al. |
| 2008/0137562 A1 | 6/2008 | Li et al. |
| 2008/0273581 A1 | 11/2008 | Kodama et al. |
| 2009/0011700 A1 | 1/2009 | Nishio et al. |
| 2012/0224659 A1 | 9/2012 | Yu et al. |
| 2013/0329818 A1 | 12/2013 | Yu |
| 2014/0010268 A1 | 1/2014 | Yu |
| 2015/0085961 A1 | 3/2015 | Yu et al. |

OTHER PUBLICATIONS

"Final Office Action", U.S. Appl. No. 13/967,167, Mar. 13, 2014, 7 pages.
"Final Office Action", U.S. Appl. No. 14/027,034, Mar. 17, 2014, 5 pages.
"Non-Final Office Action", U.S. Appl. No. 12/397,723, Mar. 8, 2012, 11 pages.
"Non-Final Office Action", U.S. Appl. No. 13/476,242, Oct. 1, 2012, 6 pages.
"Non-Final Office Action", U.S. Appl. No. 13/967,167, Nov. 13, 2013, 6 pages.
"Non-Final Office Action", U.S. Appl. No. 14/027,034, Nov. 21, 2013, 9 pages.
"Notice of Allowance", U.S. Appl. No. 12/397,723, Apr. 17, 2013, 7 pages.
"Notice of Allowance", U.S. Appl. No. 13/476,242, May 6, 2013, 7 pages.
"Notice of Allowance", U.S. Appl. No. 13/967,167, Jul. 1, 2014, 8 pages.
"Notice of Allowance", U.S. Appl. No. 14/027,034, Aug. 8, 2014, 6 pages.
"Restriction Requirement", U.S. Appl. No. 12/397,723, Nov. 30, 2011, 5 pages.
"Supplemental Notice of Allowance", U.S. Appl. No. 12/397,723, Jul. 24, 2013, 2 pages.
"Supplemental Notice of Allowance", U.S. Appl. No. 13/476,242, Aug. 16, 2013, 2 pages.
"Supplemental Notice of Allowance", U.S. Appl. No. 13/476,242, Jul. 31, 2013, 2 pages.
"Corrected Notice of Allowance", U.S. Appl. No. 14/027,034, Nov. 17, 2014, 2 pages.
"Restriction Requirement", U.S. Appl. No. 14/548,200, Feb. 12, 2015, 7 pages.
"Supplemental Notice of Allowance", U.S. Appl. No. 13/967,167, Oct. 8, 2014, 2 pages.
"Supplemental Notice of Allowance", U.S. Appl. No. 14/027,034, Oct. 9, 2014, 2 pages.
"Non-Final Office Action", U.S. Appl. No. 14/548,200, Apr. 16, 2015, 6 pages.

\* cited by examiner

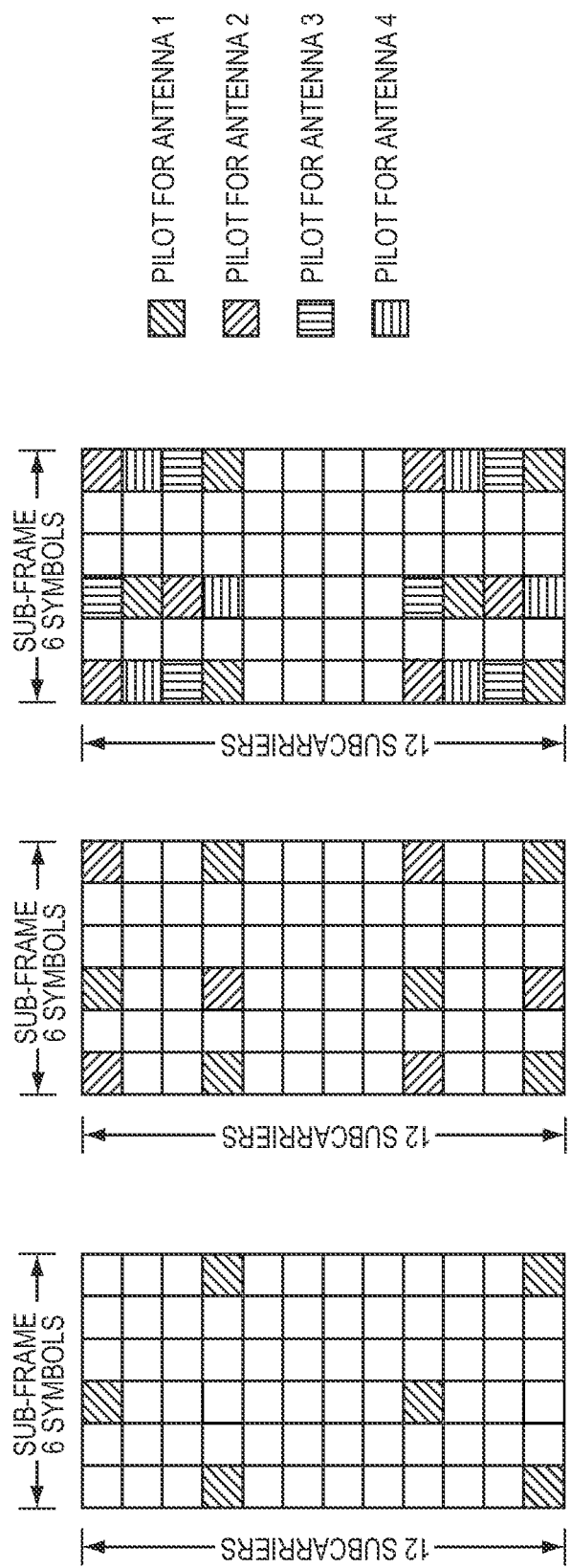

PILOT DESIGN FOR WIRELESS SYSTEM

RELATED APPLICATION

This application is a continuation of and claims priority to U.S. patent application Ser. No. 13/967,167 filed Aug. 14, 2013, which is a continuation of, and claims priority to, U.S. patent application Ser. No. 12/397,723 filed Mar. 4, 2009. Application Ser. No. 12/397,723 claims the benefit of provisional patent application Ser. No. 61/033,637, filed Mar. 4, 2008, and provisional patent application Ser. No. 61/036,737, filed Mar. 14, 2008, the disclosures of which are hereby incorporated herein by reference in their entireties.

BACKGROUND

Multiple Input Multiple Output—Orthogonal Frequency Division Multiplexing (MIMO-OFDM) is a novel highly spectral efficient technology used to transmit high-speed data through radio channels with fast fading both in frequency and in time.

In wireless communication systems that employ OFDM, a transmitter transmits data to a receiver using many sub-carriers in parallel. The frequencies of the sub-carriers are orthogonal. Transmitting the data in parallel allows symbols containing the data to be of longer duration, which reduces the effects of multi-path fading. The orthogonality of the frequencies allows the sub-carriers to be tightly spaced, while minimizing inter-carrier interference. At the transmitter, the data is encoded, interleaved, and modulated to form data symbols. Overhead information, including pilot symbols, is added and the symbols (data plus overhead) are organized into OFDM symbols. Each OFDM symbol typically uses $2^n$ frequencies. Each symbol is allocated to represent a component of a different orthogonal frequency. An inverse Fast Fourier Transform (IFFT) is applied to the OFDM symbol to generate time samples of a signal. Cyclic extensions are added to the signal, and the signal is passed through a digital-to-analog converter. Finally, the transmitter transmits the signal to the receiver along a channel.

When the receiver receives the signal, the inverse operations are performed. The received signal is passed through an analog-to-digital converter, and timing information is then determined. The cyclic extensions are removed from the signal. The receiver performs an FFT on the received signal to recover the frequency components of the signal, that is, the data symbols. Error correction may be applied to the data symbols to compensate for variations in phase and amplitude caused during propagation of the signal along the channel. The data symbols are then demodulated, de-interleaved, and decoded to yield the transmitted data.

In systems employing differential detection, the receiver compares the phase and/or amplitude of each received symbol with an adjacent symbol. The adjacent symbol may be adjacent in the time direction or in the frequency direction. The receiver recovers the transmitted data by measuring the change in phase and/or amplitude between a symbol and the adjacent symbol. If differential detection is used, channel compensation need not be applied to compensate for variations in phase and amplitude caused during propagation of the signal. However, in systems employing coherent detection the receiver must estimate the actual phase and amplitude of the channel response, and channel compensation must be applied.

The variations in phase and amplitude resulting from propagation along the channel are referred to as the channel response. The channel response is usually frequency and time dependent. If the receiver can determine the channel response, the received signal can be corrected to compensate for the channel degradation. The determination of the channel response is called channel estimation. The inclusion of pilot symbols in each OFDM symbol allows the receiver to carry out channel estimation. The pilot symbols are transmitted with a value known to the receiver. When the receiver receives the OFDM symbol, the receiver compares the received value of the pilot symbols with the known transmitted value of the pilot symbols to estimate the channel response.

The pilot symbols are overhead, and should be as few in number as possible in order to maximize the transmission rate of data symbols. Since the channel response can vary with time and with frequency, the pilot symbols are staggered amongst the data symbols to provide as complete a range as possible of channel response over time and frequency. The set of sub-carriers in frequency and time at which pilot symbols are inserted is referred to as a pilot pattern. The optimal temporal spacing between the pilot symbols is usually dictated by the maximum anticipated Doppler frequency, and the optimal frequency spacing between the pilot symbols is usually dictated by the anticipated delay spread of multi-path fading.

In OFDM communication systems employing coherent modulation and demodulation, the receiver must estimate the channel response at the frequencies of all sub-carriers and at all times. Although this requires more processing than in systems that employ differential modulation and demodulation, a significant gain in signal-to-noise ratio can be achieved using coherent modulation and demodulation. The receiver determines the channel response at the times and frequencies at which pilot symbols are inserted into the OFDM symbol, and estimates the channel response at the times and frequencies at which the data symbols are located within the OFDM symbol using interpolation and extrapolation. Placing pilot symbols more closely together within a pilot pattern results in a more accurate channel estimation. However, because pilot symbols are overhead, a tighter pilot pattern is at the expense of the transmitted data rate.

One issue with pilot patterns is that extrapolation is typically needed to estimate the channel response at sub-carriers at or near resource boundaries in frequency and in time. As is commonly known, extrapolation provides lower quality, or less accurate, results than interpolation. Therefore, there is a need for improved pilot designs that optimize, by adjusting or reducing or all together eliminating, the need for extrapolation when generating an estimate of the channel response.

SUMMARY OF THE DETAILED DESCRIPTION

The description herein relates to pilot designs for an Orthogonal Frequency Division Multiplexing (OFDM) based communication system. In some embodiments, the communication system is one operating according to the IEEE 802.16m, or advanced WiMax, standard. In general, an OFDM transmitter operates to insert pilot symbols into a resource of a transmit frame according to a predetermined staggered pilot symbol pattern defining pilot symbol locations within the resource of the transmit frame. The predetermined pilot symbol pattern is defined such that pilot symbols are located at or near time boundaries of the resource, at or near frequency boundaries of the resource, or both. By doing so, when generating a channel estimate for the communication channel between the OFDM transmitter and an OFDM receiver based on the pilot symbols, extrapolations needed to estimate the channel near the boundaries of the resource are optimized. As a result, an overall accuracy of the channel estimate is substantially improved. The resource of the transmit frame may be one or more sub-frames of the transmit frame or a resource unit within the transmit frame.

In some embodiments, a downlink frame includes one or more sub-frames, and the OFDM transmitter operates to insert pilot symbols into the one or more sub-frames of the downlink frame according to a predetermined staggered pilot symbol pattern defining pilot symbol locations with the one or more sub-frames of the downlink frame. The predetermined staggered pilot symbol pattern may be a function of the number of sub-frames in the downlink frame. At times, the inserted pilot symbols are common pilot symbols. In one embodiment, the predetermined staggered pilot symbol pattern for the one or more sub-frames is defined such that the pilot symbol locations in the last sub-frame of the downlink frame are adjusted such that there are pilot symbol locations at or near an ending time boundary of the last sub-frame of the downlink frame. In addition, the predetermined staggered pilot symbol pattern for the one or more sub-frames may be defined such that the adjusted pilot symbol locations in the last sub-frame remain substantially uniform with respect to the pilot symbol locations in the other sub-frames of the downlink frame. In another embodiment, the predetermined staggered pilot symbol pattern for the one or more sub-frames is defined such that the pilot symbol locations in the first sub-frame of the downlink frame are adjusted such that there are pilot symbol locations at or near a starting time boundary of the first sub-frame of the downlink frame. In addition, the predetermined staggered pilot symbol pattern may be defined such that the pilot symbol locations in the first sub-frame remain substantially uniform with respect to the pilot symbol locations in the other sub-frames of the downlink frame.

In some embodiments, a downlink frame includes one or more legacy sub-frames and a number of modern (e.g., IEEE 802.16m) sub-frames. Joint channel estimation for the modern sub-frames is provided based on pilots in the modern sub-frames and pilots in one of the legacy sub-frames neighboring the modern sub-frames. In some cases, the pilot symbols inserted into the modern sub-frames are common pilot symbols. More specifically, in one embodiment, the OFDM transmitter operates to insert pilot symbols into the number of modern sub-frames of the downlink frame according to a predetermined staggered pilot symbol pattern defining pilot symbol locations within the number of modern sub-frames. In the case where the last legacy sub-frame precedes the first modern sub-frame, because the pilots from the last legacy sub-frame are used for joint channel estimation, there is no need for the predetermined staggered pilot symbol pattern for the number of modern sub-frames to include pilot symbol locations at or near the starting time boundary of the first modern sub-frame. As a result, the staggered pilot symbol pattern may begin at a time offset from the starting time boundary of the first modern sub-frame. The predetermined staggered pilot symbol pattern may be uniform, and the time offset may be such that the predetermined staggered pilot symbol pattern ends with pilot symbol locations at or near an ending time boundary of the last modern sub-frame in the downlink frame.

In some embodiments, an OFDM component of a transmitter operates to insert pilot symbols into one or more sub-frames of a downlink frame according to a predetermined staggered pilot symbol pattern including basic pilot symbol locations and additional boundary pilot symbol locations. In one embodiment, the basic pilot symbol locations define a basic pilot symbol pattern that is uniform. The boundary pilot symbol locations are pilot symbol locations in addition to the basic pilot symbol locations and are at or near time boundaries of the one or more sub-frames, at or near frequency boundaries of the one or more sub-frames, or both.

In some embodiments, a pilot symbol pattern defining locations in which pilot symbols are to be inserted into a resource unit is a function of a size of the resource unit. As used herein, a resource unit is one or more contiguous blocks of symbol locations, which may be referred to one or more contiguous resource blocks. In some embodiments, a density of the pilot symbol pattern is a function of the size of the resource unit. The size of the resource unit may be defined as a number of resource blocks in the resource unit. More specifically, the OFDM transmitter operates to insert pilot symbols into a resource unit of a transmit frame according to a predetermined pilot symbol pattern defining pilot symbol locations within the resource unit, where the predetermined pilot symbol pattern is a function of a size of the resource unit. In one embodiment, the predetermined pilot symbol pattern for the resource unit is a predetermined pilot symbol pattern for a resource unit of the same size of the resource unit in the transmit frame. Alternately or additionally, the predetermined pilot symbol pattern includes pilot symbol locations at or near each time boundary of the resource unit, at or near each frequency boundary of the resource unit, or both.

Those skilled in the art will appreciate the scope of various embodiments and realize additional aspects thereof after reading the following detailed description in association with the accompanying drawings.

BRIEF DESCRIPTION OF THE DRAWINGS

The accompanying drawings incorporated in and forming a part of this specification illustrate several aspects of one or more embodiments, and together with the description serve to explain the principles of various embodiments.

FIGS. 14A through 14H illustrate exemplary pilot symbol patterns that may be utilized by the pilot inserter according to the process of FIG. 13;

DETAILED DESCRIPTION

The descriptions set forth below represent information to enable those skilled in the art to practice and illustrate various aspects of one or more embodiments. Upon reading the following description in light of the accompanying drawings, those skilled in the art will various aspects of one or more embodiments, and will recognize applications of these concepts not particularly addressed herein. It should be understood that these concepts and applications fall within the scope of the disclosure and the accompanying claims.

The following description relates to an Orthogonal Frequency Division Multiplexing (OFDM) transmitter/receiver and various staggered pilot insertion schemes. By way of introduction, an OFDM frame consists of preamble OFDM symbols and regular OFDM symbols. Each OFDM symbol uses a set of orthogonal sub-carriers. Thus, an OFDM frame can be thought of as a two-dimensional grid of symbol locations in frequency (i.e., sub-carrier frequencies) and in time (i.e., OFDM symbol time slots).

Figure 1:
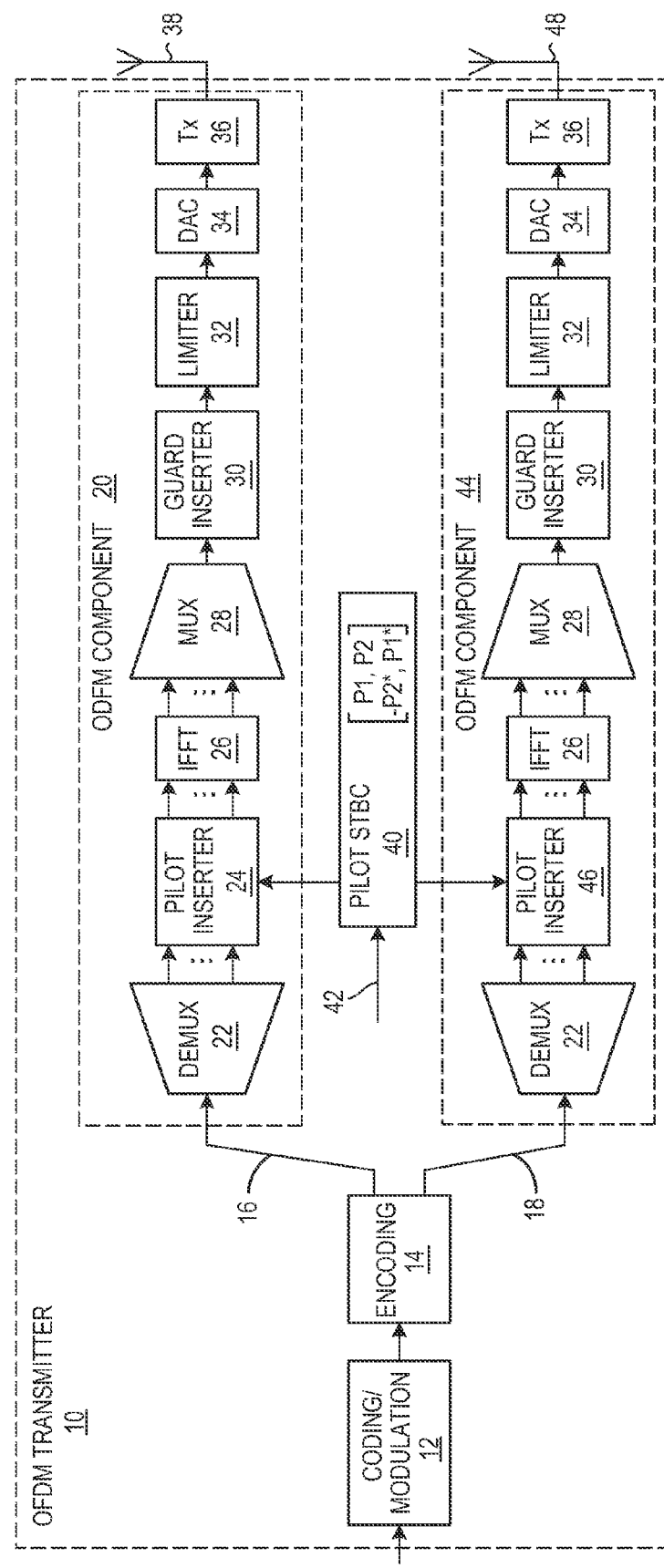
FIG. 1 is a block diagram of an Orthogonal Frequency Division Multiplexing (OFDM) transmitter according to one embodiment of this disclosure.

FIG. 1 illustrates one embodiment of a Multiple-Input Multiple-Output (MIMO) OFDM transmitter 10 (hereinafter the "OFDM transmitter 10"). Note that while much of the discussion below focuses on a MIMO transmitter and a MIMO receiver, the concepts discussed herein are also applicable to Single-Input-Single-Output (SISO) OFDM transmitters and receivers. The OFDM transmitter 10 shown in FIG. 1 is a two-output OFDM transmitter, though more generally there may be a plurality of M transmitting antenna. The OFDM transmitter 10 takes binary data as input but data in other forms may be accommodated. The binary data is passed to a coding/modulation primitive 12 responsible for encoding, interleaving, and modulating the binary data to generate data symbols, as is well known to those skilled in the art. The coding/modulation primitive 12 may include a number of processing blocks, not shown in FIG. 1. An encoder 14 applies Space-Time Block Coding (STBC) to the data symbols. The encoder 14 also separates the data symbols into a first processing path 16 and a second processing path 18, by sending alternate data symbols along each of the two processing paths. In the more general case in which the OFDM transmitter 10 includes M transmitting antennae, the encoder 14 separates the data symbols into M processing paths.

The data symbols sent along the first processing path 16 are sent to a first OFDM component 20. The data symbols are first passed to a demultiplexer 22 in the first OFDM component 20, after which the data symbols are treated as sub-carrier components. The data symbols are then sent to a pilot inserter 24, where pilot symbols are inserted among the data symbols. Collectively, the data symbols and pilot symbols are referred to hereinafter simply as symbols. The symbols are passed to an Inverse Fast Fourier Transform (IFFT) processor 26, then to a multiplexer (MUX) 28 where they are recombined into a serial stream. A guard inserter 30 adds prefixes to the symbols. Finally, the symbols are passed through a hard limiter 32, a digital-to-analog converter 34, and a radio frequency (RF) transmitter 36 which transmits symbols as a signal through a first transmitting antenna 38. In most embodiments, each element in the first OFDM component 20 is a processor, a component of a larger processor, or a collection of processors or any suitable combination of hardware, firmware, and software. These might include general purpose processors, Application Specific Integrated Circuits (ASICs), Field Programmable Gate Arrays (FPGAs), or Digital Signal Processors (DSPs), to name a few examples.

The pilot inserter 24 is connected to receive space-time coded pilot symbols from a pilot STBC function 40 which performs STBC on pilot symbols 42. The pilot STBC function 40 takes two pilot symbols 42 at a time, for example P1 and P2 as indicated in FIG. 1, and generates an STBC block consisting of a two by two matrix having (P1, P2) in the first row and having (-P2*, P1*) in the second row. It is the first row of this STBC block that is inserted by the pilot inserter 24.

The data symbols sent along the second processing path 18 are sent to a second OFDM component 44, which includes processors similar to those included in the first OFDM component 20. However, a pilot inserter 46 inserts encoded pilot symbols from the second row of the STBC block produced by the pilot STBC function 40. The symbols sent along the second processing path 18 are ultimately transmitted as a signal through a second transmitting antenna 48.

Figure 2:
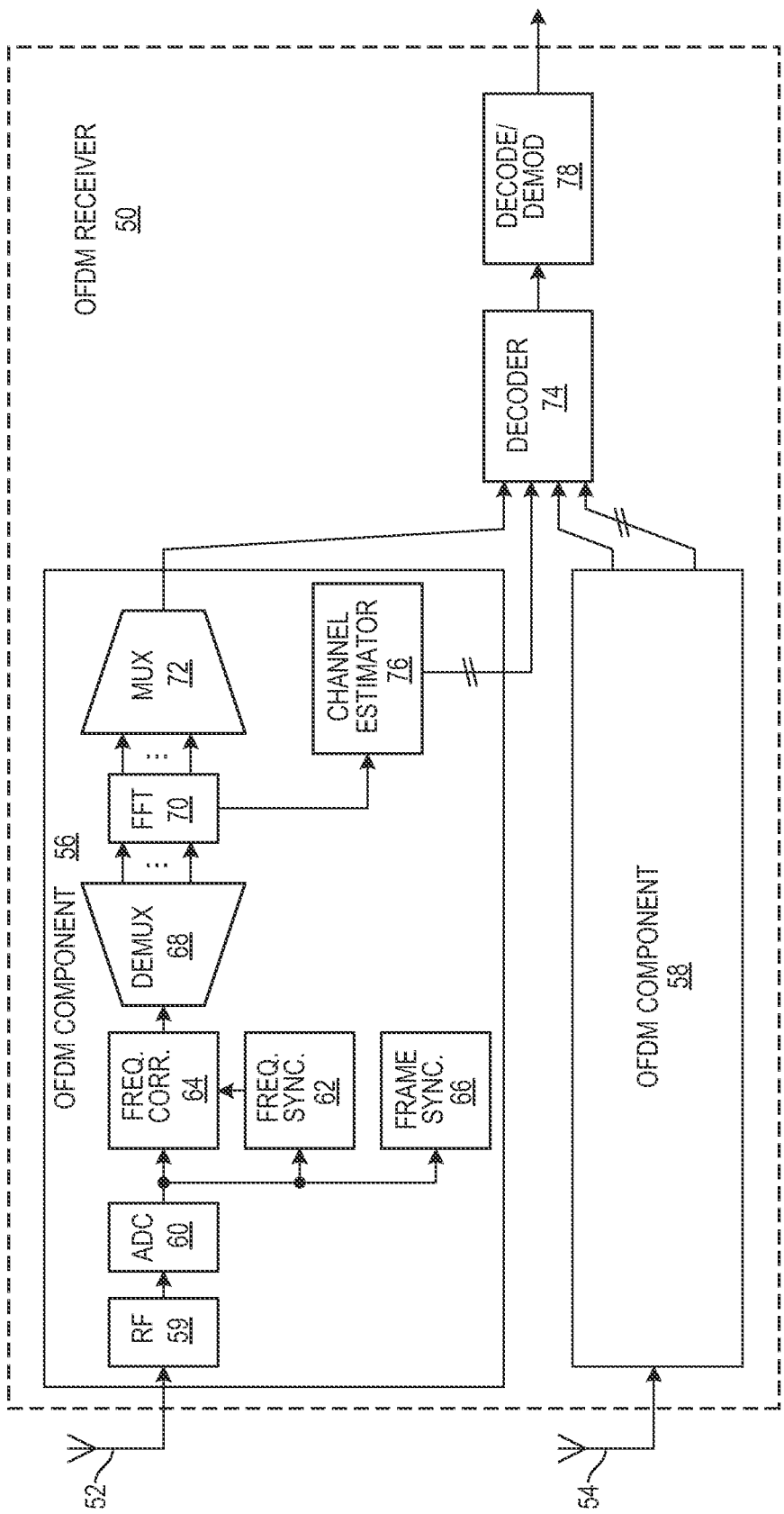
FIG. 2 is a block diagram of an OFDM receiver according to one embodiment of this disclosure.

FIG. 2 illustrates an embodiment of a MIMO-OFDM receiver 50 (hereinafter the "OFDM receiver 50"). The OFDM receiver 50 includes a first receiving antenna 52 and a second receiving antenna 54 (although more generally there will be one or more receiving antenna). The first receiving antenna 52 receives a first received signal. The first received signal is a combination of the two signals transmitted by the two transmitting antennae 38 and 48 of the OFDM transmitter 10 of FIG. 1, although each of the two signals will have been altered by a respective channel between the respective transmitting antenna and the first receiving antenna 52. The second receiving antenna 54 receives a second received signal. The second received signal is a combination of the two signals transmitted by the two transmitting antennae 38 and 48 of the OFDM transmitter 10 of FIG. 1, although each of the two signals will have been altered by a respective channel between the respective transmitting antenna and the second receiving antenna 54. The four channels between each of the two transmitting antennae 38 and 48 and each of the two receiving antennae 52 and 54 may vary with time and with frequency, and will usually be different from each other.

The OFDM receiver 50 includes a first OFDM component 56 and a second OFDM component 58 (although in general there will be N OFDM components, one for each receiving antenna). The first OFDM component 56 includes an RF receiver 59 and an analog-to-digital converter 60, which converts the first received signal into digital signal samples. The signal samples are passed to a frequency synchronizer 62 and a frequency offset corrector 64. The signal samples are also fed to a frame/time synchronizer 66. Collectively, these three components produce synchronized signal samples.

The synchronized signal samples represent a time sequence of data. The synchronized signal samples are passed to a demultiplexer 68 and then passed in parallel to a Fast Fourier Transform (FFT) processor 70. The FFT processor 70 performs an FFT on the signal samples to generate estimated received symbols which are multiplexed in a multiplexer (MUX) 72 and sent as received symbols to a decoder 74. Ideally, the received symbols would be the same as the symbols fed into the IFFT processor 26 at the OFDM transmitter 10 (FIG. 1). However, as the received signals will have likely been altered by the various propagation channels, the first OFDM component 56 must correct the received symbols by taking into account the channels. The received symbols are passed to a channel estimator 76, which analyzes received pilot symbols located at known times and frequencies within the OFDM frame. By comparing the received pilot symbols with expected pilot symbols known to be transmitted by the OFDM transmitter 10 and using known interpolation and, if needed, extrapolation techniques, the channel estimator 76 generates an estimated channel response for each frequency and time within the OFDM symbol. The estimated channel responses are passed to the decoder 74.

The second OFDM component 58 includes similar components as are included in the first OFDM component 56, and processes the second received signal in the same manner as the first OFDM component 56 processes the first received signal. Each of the OFDM components 56 and 58 passes OFDM symbols to the decoder 74.

The decoder 74 applies STBC decoding to the OFDM symbols, and passes the symbols to a decoding/demodulating primitive 78 responsible for decoding, de-interleaving, and demodulating the symbols to generate output binary data, as is well known to those skilled in the art. The decoding/demodulation primitive 78 may include a number of additional processing blocks, which are not shown in FIG. 2. Each element in the OFDM components 56 and 58 is implemented as a processor, a component of a larger processor, or a collection of processors.

Figure 3:
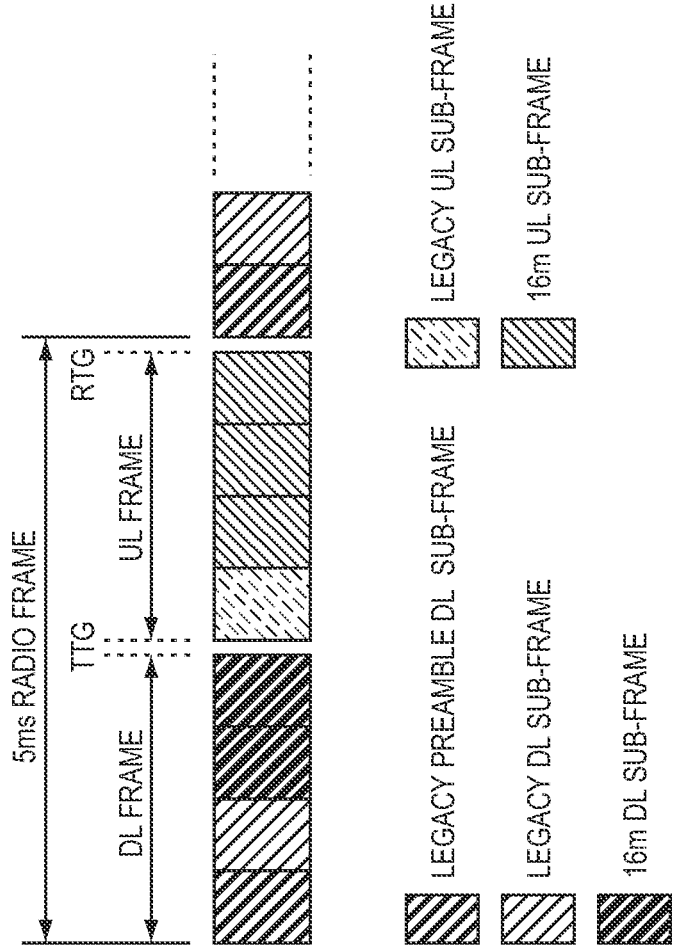
FIG. 3 illustrates an exemplary radio frame including a downlink frame and an uplink frame.

FIG. 3 illustrates a Time Division Duplex (TDD) frame structure for IEEE 802.16m having legacy support. As illustrated, the frame structure is a 5 millisecond (ms) radio frame structure including a downlink frame and an uplink frame. The downlink frame includes a number of downlink sub-frames. In this exemplary frame structure having Time Division Multiplexing (TDM) legacy support, the downlink frame includes a legacy preamble downlink sub-frame, a legacy downlink sub-frame, and a modern, or IEEE 802.16m, downlink sub-frame. Note that while the downlink frame of FIG. 3 includes one legacy downlink sub-frame and one modern downlink sub-frame, the downlink frame may include one or more legacy downlink sub-frames and one or more modern downlink sub-frames. The uplink frame includes a legacy uplink sub-frame and a modern, or IEEE 802.16m, uplink sub-frame. Again, while the uplink frame of FIG. 3 includes one legacy uplink sub-frame and one modern uplink sub-frame, the uplink frame may include one or more legacy uplink sub-frames and one or more modern uplink sub-frames. Note that if TDM legacy support is not desired, the downlink and uplink frames may include only IEEE 802.16m sub-frames.

Figure 4:
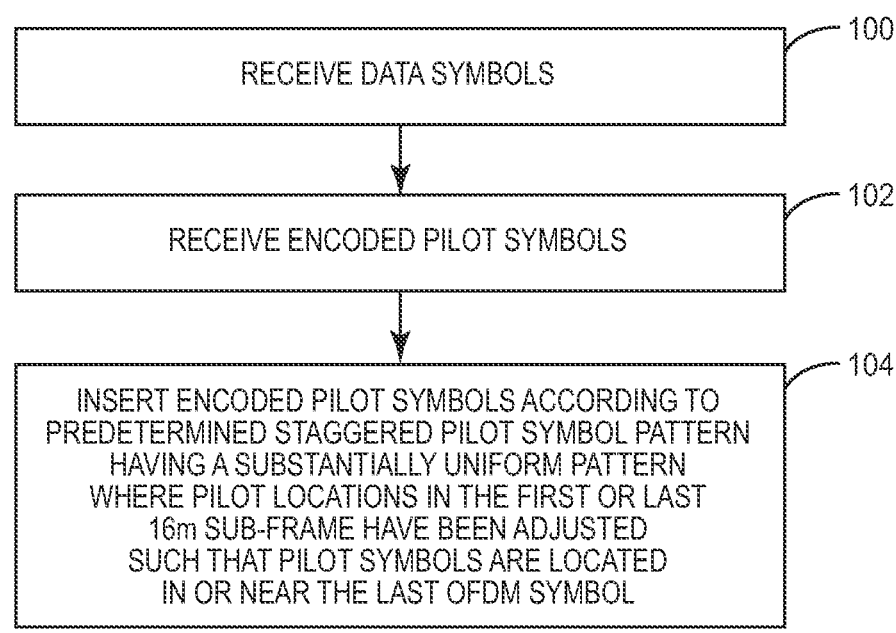
FIG. 4 is a flow chart illustrating the operation of the pilot inserter of the OFDM transmitter of FIG. 1 according to one embodiment of this disclosure.

FIG. 4 is a flow chart illustrating the operation of each of the pilot inserters 24 and 46 of FIG. 1 to insert pilot symbols among the data symbols according to one embodiment of this disclosure. The method will be described with reference to the pilot inserter 24 in the first OFDM component 20; however, the method is equally applicable to the pilot inserter 46 of the second OFDM component 44. In this embodiment, the OFDM transmitter 10 is transmitting a downlink frame including one or more modern sub-frames and only common pilots are inserted throughout the one or more modern sub-frames. For this discussion, the modern sub-frames may simply be referred to as sub-frames. Note that common pilot symbols are pilot symbols in a multiple access environment that are visible to all OFDM receivers and are primarily used only in the downlink. In contrast, dedicated pilot symbols are pilot symbols assigned to a particular OFDM receiver.

In operation, the pilot inserter 24 receives data symbols from the demultiplexer 22 for the one or more sub-frames of the downlink frame (step 100), and receives encoded pilot symbols from the pilot STBC function 40 (step 102). The pilot STBC function 40 generates (or receives) two pilot symbols and applies STBC encoding to the pilot symbols so as to generate an STBC block of encoded pilot symbols. The encoded pilot symbols generated for the first transmitting antenna 38 will be one row of the STBC block and will have a number equal to the number of transmitting antennas in the OFDM transmitter 10. Thus, for the two antenna OFDM transmitter 10 of FIG. 1, a 2×2 STBC block is generated.

The pilot inserter 24 inserts the encoded pilot symbols according to a predetermined staggered pilot symbol pattern where either the pilot symbol locations in the first sub-frame or the pilot symbol locations in the last sub-frame are adjusted such that pilot symbol locations are located at or near a corresponding time boundary of the first or last sub-frame (step 104). Note that, in an alternative embodiment, the pilot symbol locations in both the first and last sub-frames may be adjusted. More specifically, in one embodiment, the predetermined staggered pilot symbol pattern for the one or more sub-frames is defined such that the staggered pilot symbol pattern is uniform in time beginning at or near a starting time boundary of the first sub-frame of the downlink frame and continuing to the next-to-last sub-frame of the downlink frame. In some embodiments, the uniform staggered pilot symbol pattern begins in the first or near the first OFDM symbol of the first sub-frame. For example, the uniform staggered pilot symbol pattern may begin at the first or second OFDM symbol of the first sub-frame. The pilot symbol locations in the last sub-frame of the downlink frame are adjusted with respect to the uniform pattern used in the other sub-frames of the downlink frame such that (1) there are pilot symbol locations at or near an ending time boundary of the last sub-frame of the downlink frame and (2) the pilot symbol locations in the last sub-frame remain substantially uniform in time with respect to the pilot symbol locations in the other sub-frames of the downlink frame. Alternately or additionally, the staggered pilot symbol pattern includes pilot symbol locations in the last or next-to-last OFDM symbol of the last sub-frame.

In another embodiment, the predetermined staggered pilot symbol pattern for the one or more sub-frames is defined such that the pilot symbol locations in the predetermined staggered pilot symbol pattern is uniform in time from the second sub-frame through the last sub-frame of the downlink frame and includes pilot symbol locations at or near an ending time boundary of the last sub-frame of the downlink frame. At times, the last pilot symbol locations in the predetermined staggered pilot symbol pattern are in the last or next-to-last OFDM symbol of the last sub-frame. The pilot symbol locations in the first sub-frame of the downlink frame are adjusted with respect to the uniform pattern used in the other sub-frames of the downlink frame such that (1) there are pilot symbol locations at or near a starting time boundary of the first sub-frame of the downlink frame and (2) the pilot symbol locations in the first sub-frame remain substantially uniform in time with respect to the pilot symbol locations in the other sub-frames of the downlink frame. In some cases, for the first sub-frame, the staggered pilot symbol pattern includes pilot symbol locations in the first or near the first OFDM symbol of the first sub-frame. For example, for the first sub-frame, the staggered pilot symbol pattern may include pilot symbol locations in the first or second OFDM symbol of the first sub-frame.

Note that the predetermined staggered pilot symbol pattern may be a function of the number of modern sub-frames in the downlink frame. Further, a density of the predetermined pilot symbol pattern may be inversely related to the number of modern sub-frames in the downlink frame. Thus, when inserting the pilot symbols, the pilot inserter 24 may first determine the number of modern sub-frames in the downlink frame and then insert the pilot symbols according to a predetermined staggered pilot symbol pattern for that number of modern sub-frames. For example, a different pilot symbol pattern may be defined for one sub-frame, two sub-frames, three sub-frames, etc. As such, if there are two modern sub-frames in the downlink frame, the pilot inserter 24 may insert the pilots according to the predefined staggered pilot symbol pattern for two sub-frames.

Figure 5A:
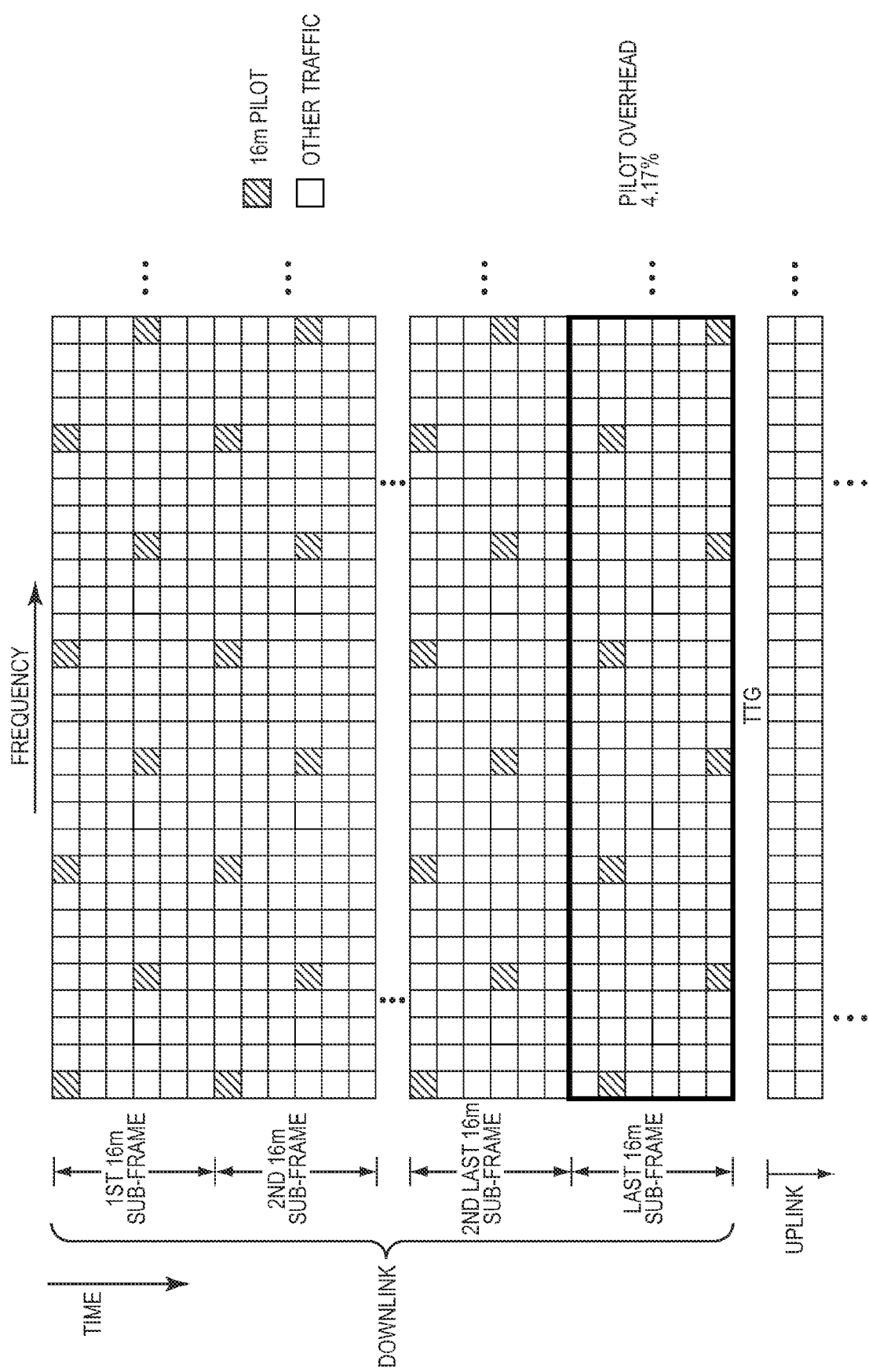
FIGS. 5A through 5J illustrate exemplary pilot symbol patterns that may be utilized by the pilot inserter according to the process of FIG. 4.

FIGS. 5A through 5J illustrate a number of exemplary staggered pilot symbol patterns that may be used by the pilot inserter 24 when operating according to the process of FIG. 4. FIG. 5A illustrates a first exemplary staggered pilot symbol pattern for a downlink frame having a number of modern sub-frames, which are simply referred to as sub-frames for this discussion. As illustrated, the staggered pilot symbol pattern includes a uniform portion that is uniform in time. The uniform portion of the staggered pilot symbol pattern begins at or near a starting time boundary of the first sub-frame and continues through the next-to-last sub-frame. Specifically, in this example, the staggered pilot symbol pattern begins at the first OFDM symbol of the first sub-frame. Then, the pilot symbol locations of the staggered pilot symbol pattern in the last sub-frame have been adjusted such that (1) there are pilot symbol locations at or near an ending time boundary of the last sub-frame of the downlink frame and (2) the pilot symbol locations in the last sub-frame remain substantially uniform in time with respect to the pilot symbol locations in the other sub-frames of the downlink frame. In this example, the pilot symbol locations in the last sub-frame have been adjusted such that there are pilot symbol locations in the last OFDM symbol of the last sub-frame. More specifically, when compared to the pilot symbol locations in the other sub-frames, the first pilot symbol locations in the last sub-frame have been shifted from the first OFDM symbol to the second OFDM symbol of the last sub-frame, and there is a larger time spacing between the pilot symbol locations in the last sub-frame.

Figure 5B:
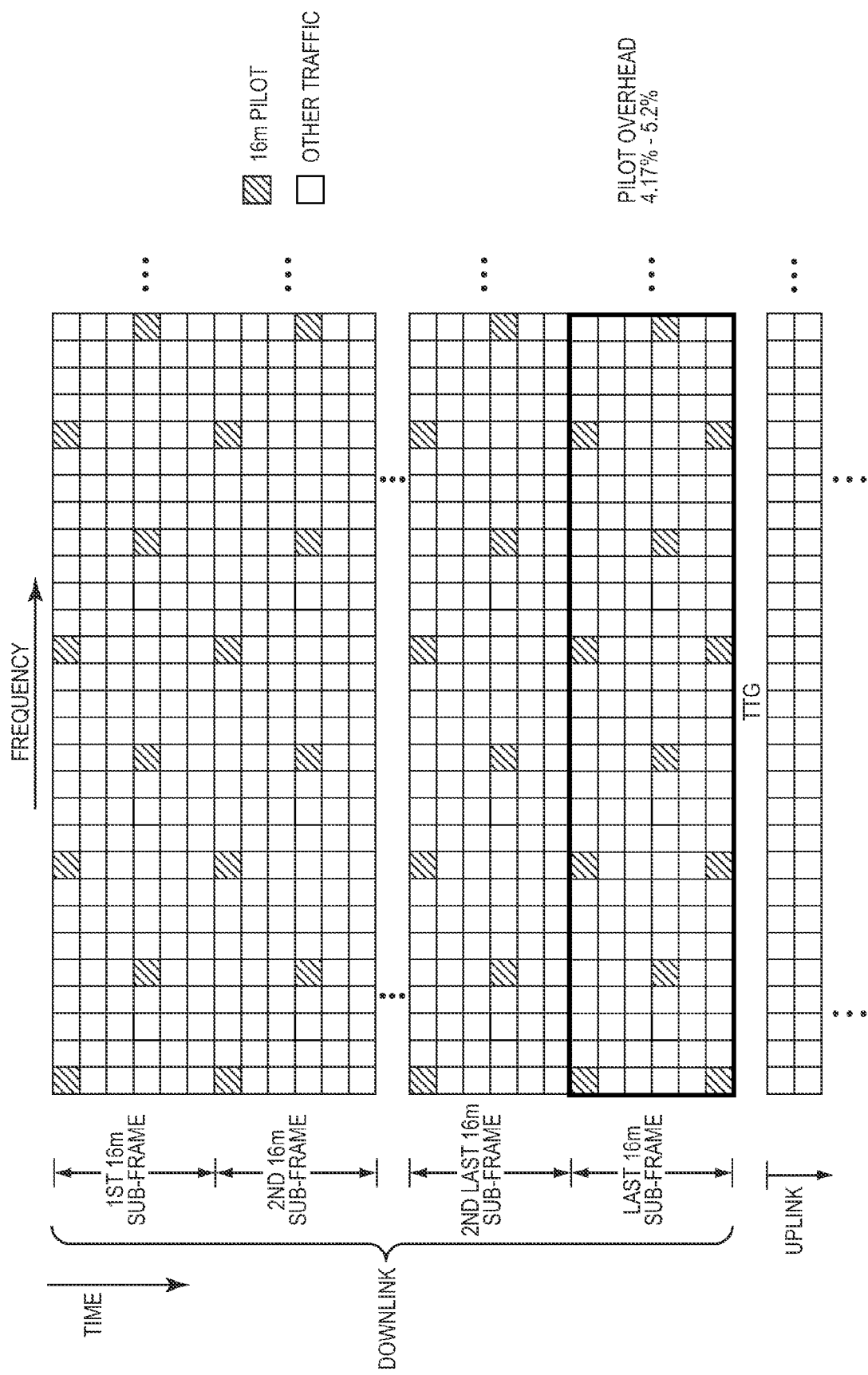

FIG. 5B illustrates a second exemplary staggered pilot symbol pattern for a downlink frame having a number of modern sub-frames, which are simply referred to as sub-frames for this discussion. The staggered pilot symbol pattern of FIG. 5B is similar to that of FIG. 5A. However, in FIG. 5B, the pilot symbol locations in the last sub-frame have been adjusted by adding additional pilot symbol locations at or near the ending time boundary of the last sub-frame. Specifically, in this example, additional pilot symbol locations have been included in the last OFDM symbol of the last sub-frame.

Figure 5C:
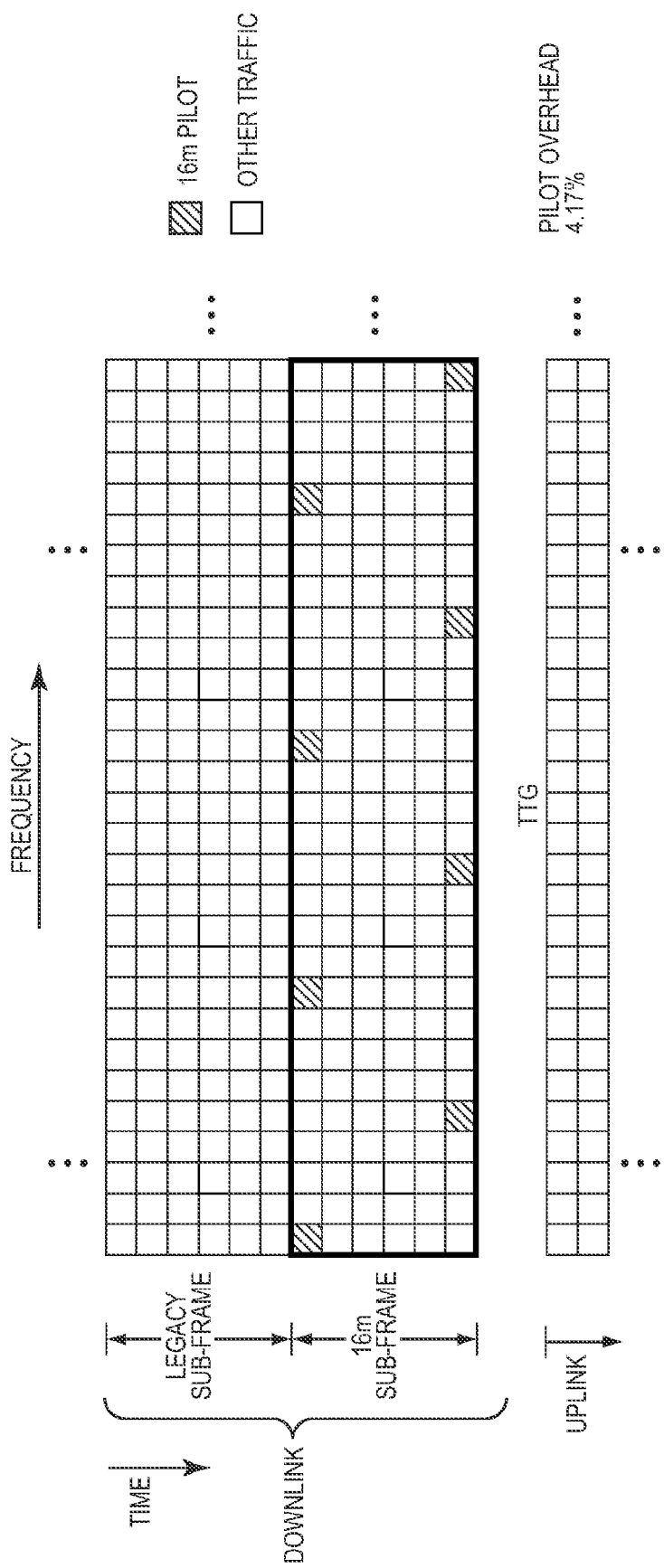

FIG. 5C illustrates a third exemplary staggered pilot symbol pattern for a downlink frame having only one modern sub-frame in the downlink frame. Thus, when compared to the pilot symbol pattern in the first sub-frames in FIGS. 5A and 5B, the pilot symbol locations in the first/last sub-frame in FIG. 5C have been adjusted by increasing the time offset between the pilot symbol locations such that pilot symbols are located at both the starting and ending time boundaries of the first/last sub-frame.

Figure 5D:
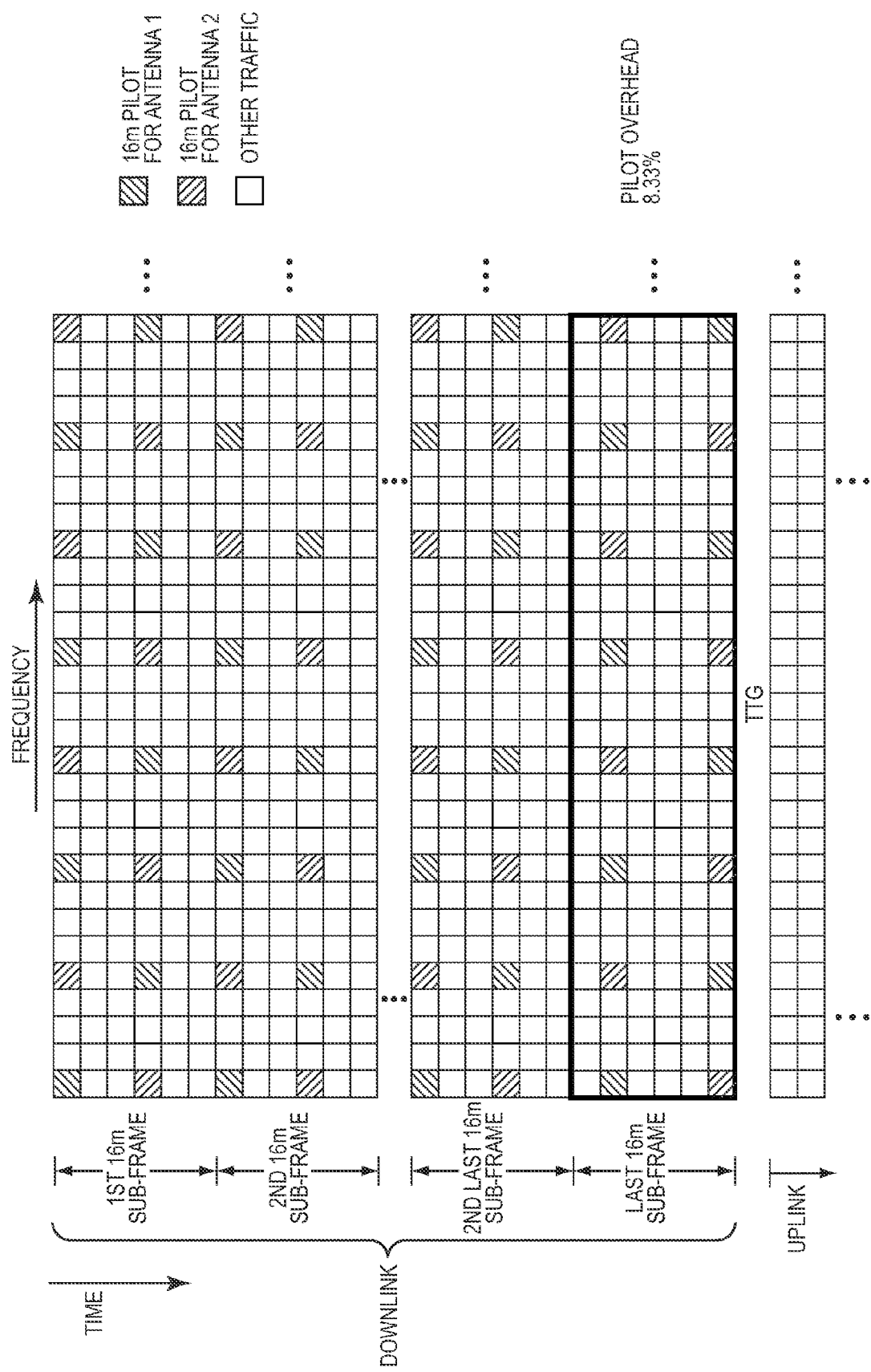
Figure 5E:
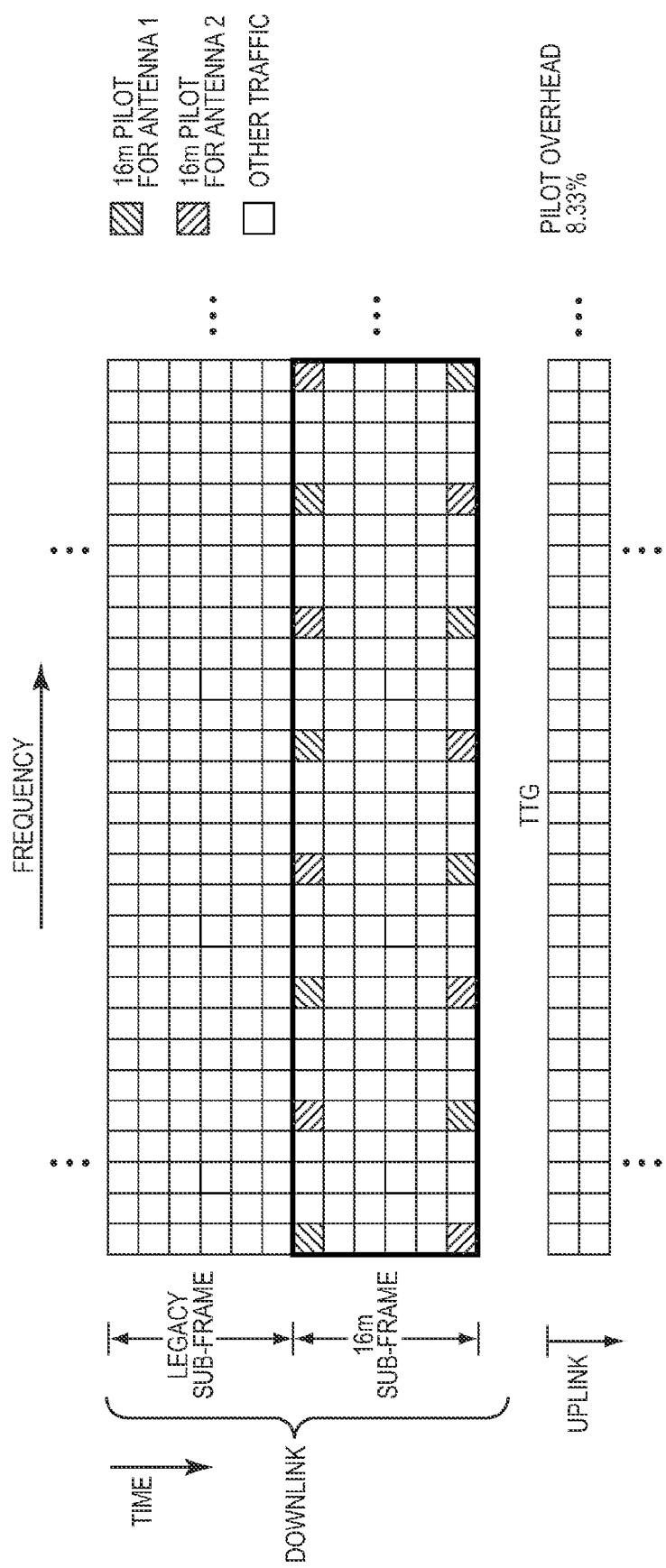

FIGS. 5D and 5E illustrate fourth and fifth exemplary staggered pilot symbol patterns that are similar to those illustrated in FIGS. 5A and 5C, respectively. However, rather than defining pilot symbol locations for a single transmit antenna, the staggered pilot symbol patterns of FIGS. 5D and 5E define pilot symbol locations for two transmit antennas. Each transmit antenna is allocated different pilot symbol locations. However, in an alternative embodiment, the pilot symbol locations for the two transmit antennas may be the same, and Code Division Multiplexing (CDM) may be used to differentiate the pilot symbols for the different antennas (i.e., a different spreading code may be used for each antenna). Again, in both FIGS. 5D and 5E, for each transmit antenna, the pilot symbol locations in the last sub-frame are adjusted such that (1) there are pilot symbol locations at or near an ending time boundary of the last sub-frame of the downlink frame and (2) the pilot symbol locations in the last sub-frame remain substantially uniform in time with respect to the pilot symbol locations in the other sub-frames of the downlink frame.

Figure 5F:
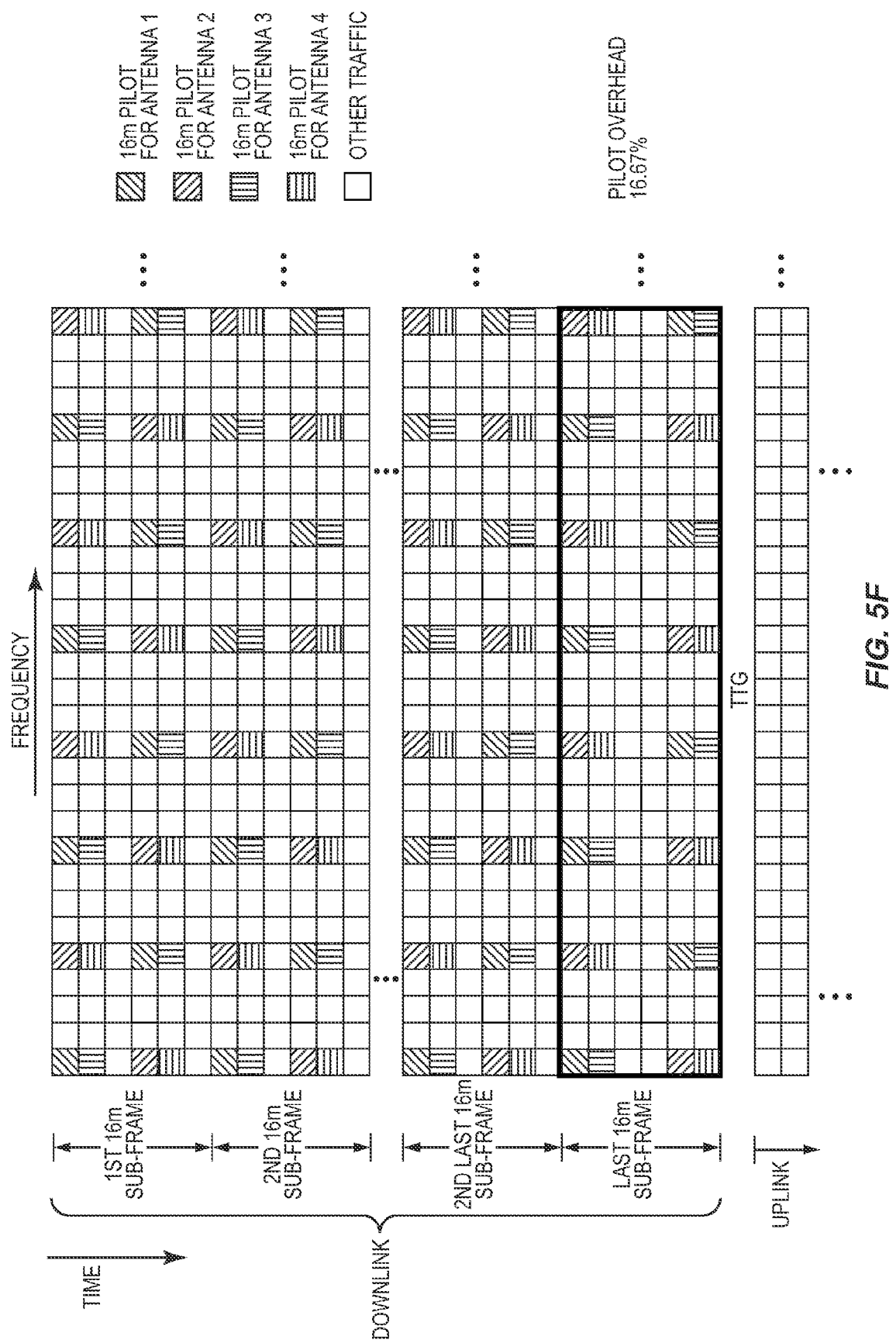
Figure 5G:
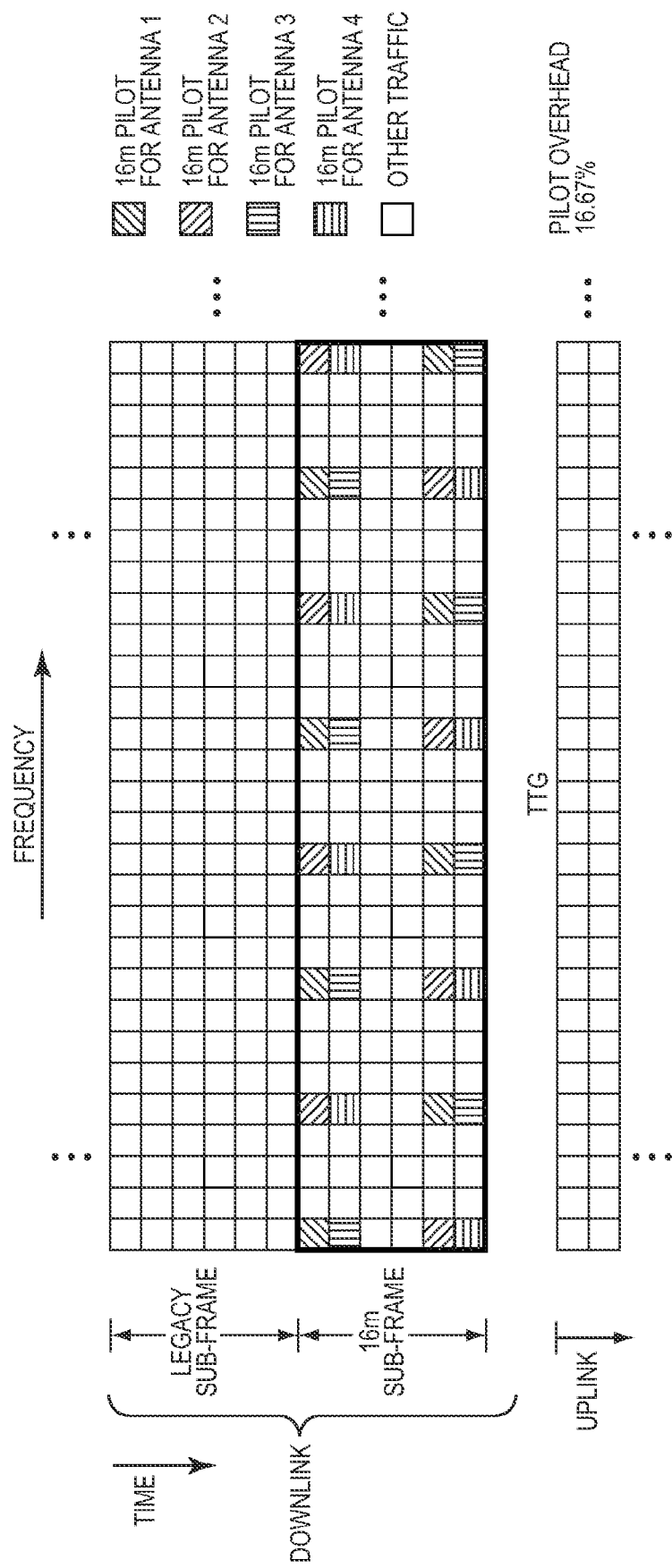

FIGS. 5F and 5G illustrates sixth and seventh exemplary staggered pilot symbol patterns that are similar to those illustrated in FIGS. 5A and 5C, respectively. However, in this embodiment, the staggered pilot symbol pattern defines pilot symbol locations for four transmit antennas rather than one transmit antenna. Each transmit antenna is allocated different pilot symbol locations. However, in an alternative embodiment, the pilot symbol locations for the four transmit antennas may be the same, and CDM may be used to differentiate the pilot symbols for the different antennas (i.e., a different spreading code may be used for each antenna). Again, for each transmit antenna, the pilot symbol locations in the last sub-frame are adjusted such that (1) there are pilot symbol locations at or near an ending time boundary of the last sub-frame of the downlink frame and (2) the pilot symbol locations in the last sub-frame remain substantially uniform in time with respect to the pilot symbol locations in the other sub-frames of the downlink frame.

Figure 5H:
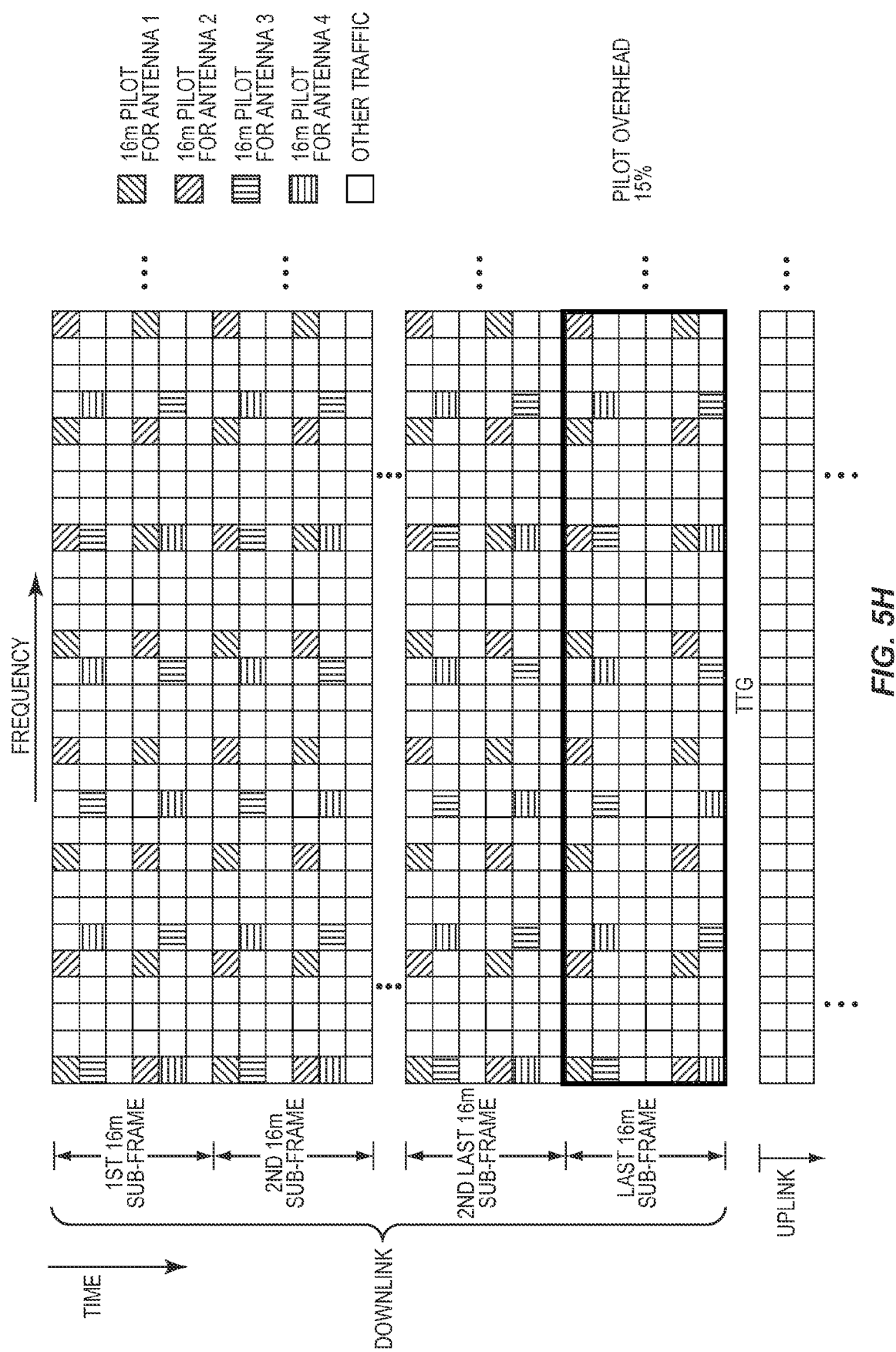
Figure 5L:
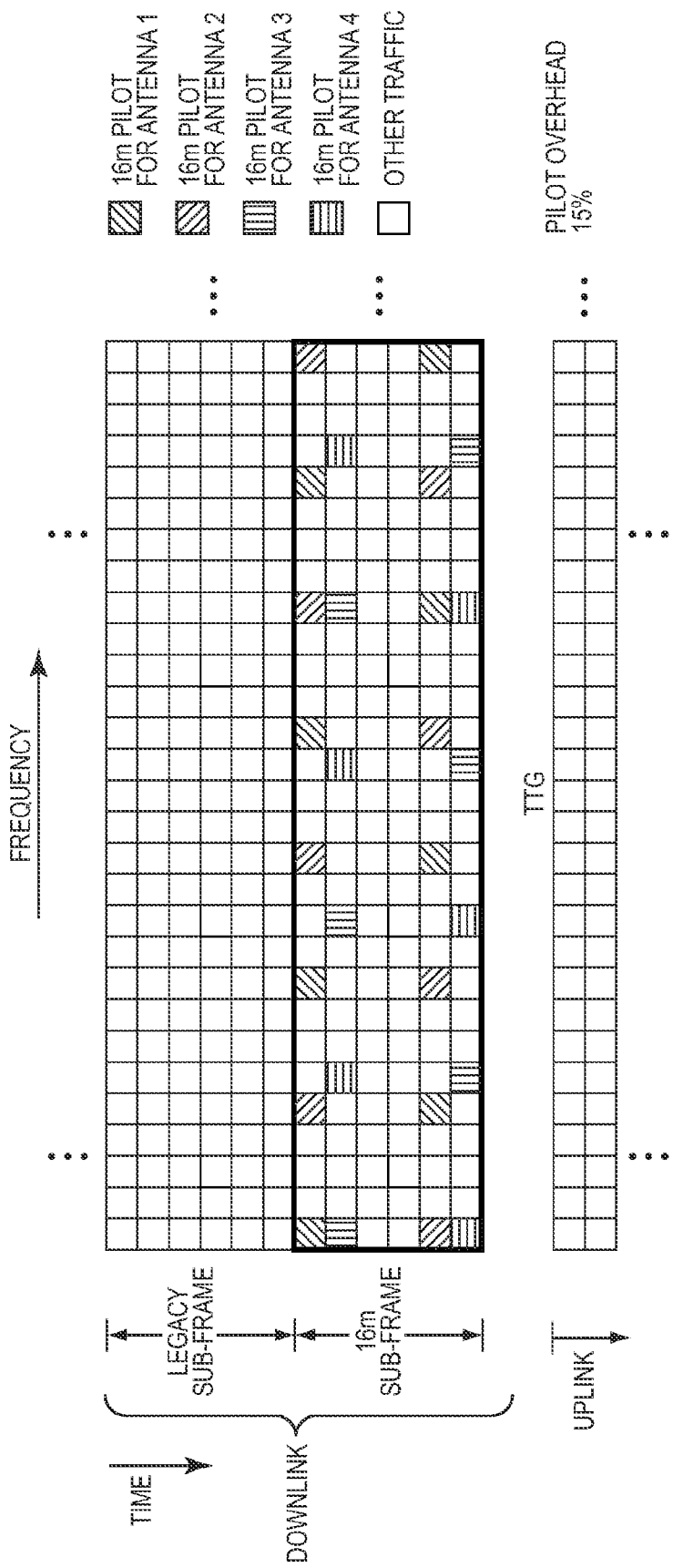

FIGS. 5H and 5I illustrates eighth and ninth exemplary staggered pilot symbol patterns that are similar to those illustrated in FIG. 5F and 5G, respectively, in that they define pilot symbol locations for four transmit antennas. However, the exemplary embodiments of FIGS. 5H and 5I illustrate the concept that the spacing in frequency between pilot symbol locations in the pilot symbol patterns for the antennas does not have to be the same. Specifically, in this example, the pilot symbol patterns for transmit antennas 1 and 2 have the same spacing in frequency, and the pilot symbol patterns for the transmit antennas 3 and 4 have the same spacing in frequency. However, the spacing in frequency for transmit antennas 1 and 2 is different than the spacing in frequency for the transmit antennas 3 and 4. However, again, for each transmit antenna, the pilot symbol locations in the last sub-frame are adjusted such that (1) there are pilot symbol locations at or near an ending time boundary of the last sub-frame of the downlink frame and (2) the pilot symbol locations in the last sub-frame remain substantially uniform in time with respect to the pilot symbol locations in the other sub-frames of the downlink frame.

Figure 5J:
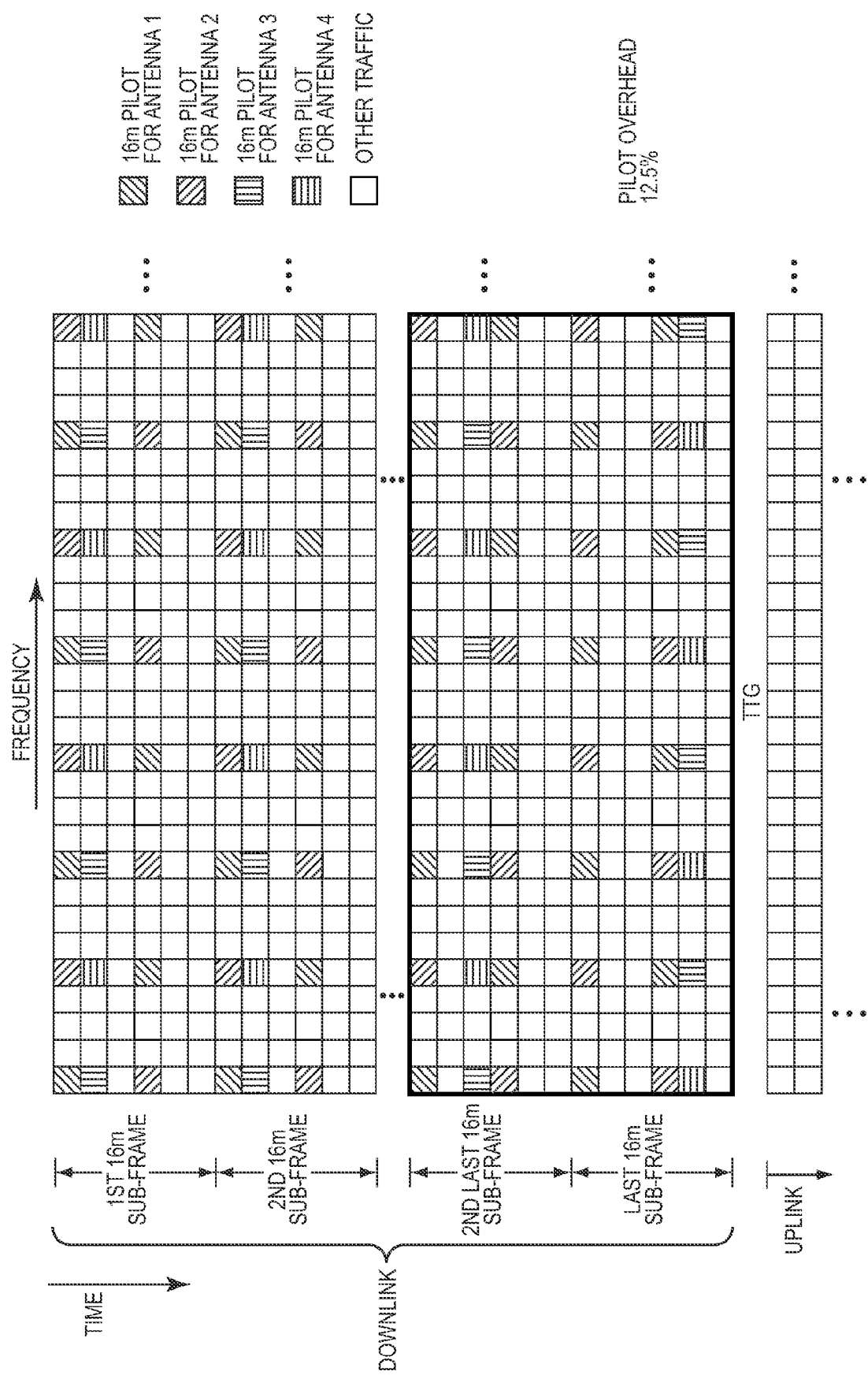

FIG. 5J illustrates a tenth exemplary staggered pilot symbol pattern for four transmit antennas. Specifically, FIG. 5J illustrates an alternative embodiment where the pilot symbol locations in the last two sub-frames, rather than the pilot symbol locations in only the last sub-frame, are adjusted such that (1) there are pilot symbol locations at or near an ending time boundary of the last sub-frame of the downlink frame and (2) the pilot symbol locations in the last two sub-frames remain substantially uniform in time with respect to the pilot symbol locations in the other sub-frames of the downlink frame. In another alternative embodiment, the pilot symbol locations in the first two sub-frames, rather than the pilot symbol locations in only the first sub-frame, may be adjusted.

Figure 6:
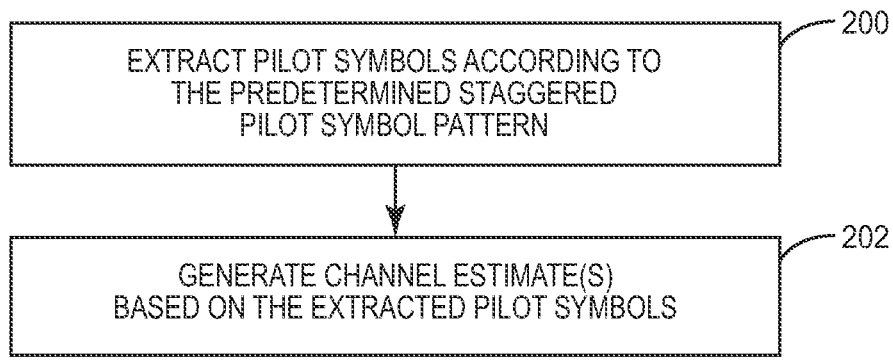
FIG. 6 is a flow chart illustrating the operation of the channel estimator of the OFDM receiver of FIG. 2 according to one embodiment of this disclosure.

FIG. 6 is a flow chart illustrating the operation of the channel estimator 76 of FIG. 2 according to one embodiment of this disclosure. This discussion is equally applicable to the channel estimator of the second OFDM component 58 of the OFDM receiver 50 of FIG. 2. In this embodiment, the OFDM receiver 50 receives a downlink frame including one or more modern sub-frames where only common pilots are used throughout the one or more modern sub-frames, which for this discussion are simply referred to as sub-frames. In operation, the channel estimator 76 extracts the pilot symbols from the symbols, or more specifically symbol estimates, received from the FFT processor 70 according to the predetermined staggered pilot symbol pattern for the one or more sub-frames (step 200). If the pilot symbol pattern varies as a function of the number of sub-frames, the channel estimator 76 may first determine the number of sub-frames in the downlink frame and then extract the pilot symbols according to the predetermined staggered pilot symbol pattern used for that number of sub-frames.

The channel estimator 76 then generates channel estimates for each sub-carrier frequency for each OFDM symbol in the one or more sub-frames based on the extracted pilot symbols using known channel estimation techniques (step 202). More specifically, for each extracted pilot symbol, the channel estimator 76 may directly determine the channel response for the corresponding sub-carrier and OFDM symbol based on a comparison of the extracted pilot symbol and an expected pilot symbol known to be transmitted by the OFDM transmitter 10. Then, channel responses for the remaining sub-carrier and OFDM symbol combinations (i.e., the non-pilot symbol locations) in the one or more sub-frames are estimated using known interpolation and, if needed, extrapolation techniques. Note, however, that by adjusting the pilot symbol locations in the first or last sub-frame such that pilot symbols are included at or near the corresponding time boundary as discussed above, the number of extrapolations needed for channel estimation is substantially reduced, if not eliminated, as compared to the number of extrapolations needed for previous staggered pilot patterns.

Figure 7:
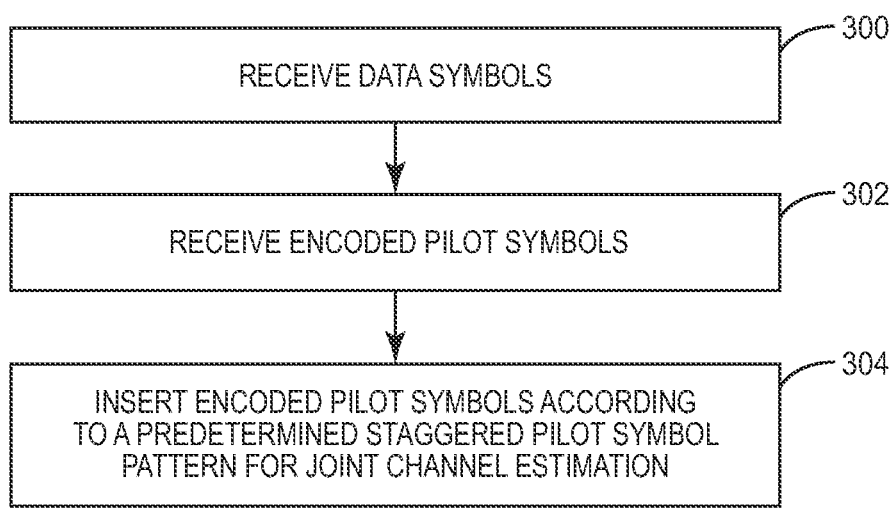
FIG. 7 is a flow chart illustrating the operation of the pilot inserter of the OFDM transmitter of FIG. 1 to insert pilot symbols for joint channel estimation according to another embodiment of this disclosure.

FIG. 7 is a flow chart illustrating the operation of each of the pilot inserters 24 and 46 of FIG. 1 to insert pilot symbols among the data symbols according to another embodiment of this disclosure. The method will be described with reference to the pilot inserter 24 in the first OFDM component 20; however, the method is equally applicable to the pilot inserter 46 of the second OFDM component 44. In this embodiment, the OFDM transmitter 10 is transmitting a downlink frame including one or more legacy sub-frames and one or more modern sub-frames where only common pilots are used throughout the one or more modern sub-frames. In general, the predetermined pilot symbol pattern defining the locations at which pilots are to be inserted into the one or more modern sub-frames takes into account pilots included in a neighboring legacy sub-frame. In this example, the neighboring legacy sub-frame is the last legacy sub-frame in the downlink frame. Further, as discussed below, the OFDM receiver 50 utilizes both pilots in the last legacy sub-frame and the pilots in the one or more modern sub-frames to generate the channel estimates for the one or more modern sub-frames in a process referred to herein as joint channel estimation.

In operation, the pilot inserter 24 receives data symbols from the demultiplexer 22 for the one or more modern sub-frames of the downlink frame (step 300), and receives encoded pilot symbols from the pilot STBC function 40 (step 302). The pilot STBC function 40 generates (or receives) two pilot symbols and applies STBC encoding to the pilot symbols so as to generate an STBC block of encoded pilot symbols. The encoded pilot symbols generated for the first transmitting antenna 38 will be one row of the STBC block and will have a number equal to the number of transmitting antennas in the OFDM transmitter 10. Thus, for the two antenna OFDM transmitter 10 of FIG. 1, a 2×2 STBC block is generated.

The pilot inserter 24 inserts the encoded pilot symbols into the one or more modern sub-frames according to a predetermined staggered pilot symbol pattern for joint channel estimation (step 304). In the case where the last legacy sub-frame precedes the first modern sub-frame in the downlink frame, the pilot symbols in the last legacy sub-frame are taken into account in the predetermined staggered pilot symbol pattern for the one or more modern sub-frames. Because at least some of the pilots from the last legacy sub-frame near the time boundary with the first modern sub-frame are to be used for joint channel estimation, there is no need for the predetermined staggered pilot symbol pattern for the one or more modern sub-frames to include common pilot symbol locations at or near the starting time boundary of the first modern sub-frame. As a result, the staggered pilot symbol pattern for the one or more modern sub-frames may begin at a time offset from the starting time boundary of the first modern sub-frame. In one embodiment, the staggered pilot symbol pattern is uniform in time starting at the time offset from the starting time boundary of the first modern sub-frame and continuing through the last modern sub-frame, where the time offset is such that the last pilot symbol locations in the staggered pilot symbol pattern are at or near an ending time boundary of the last modern sub-frame. In some embodiments, the pilot symbol locations at or near the ending time boundary of the last modern sub-frame are pilot symbol locations in the last or next-to-last OFDM symbol of the last modern sub-frame.

Figure 8A:
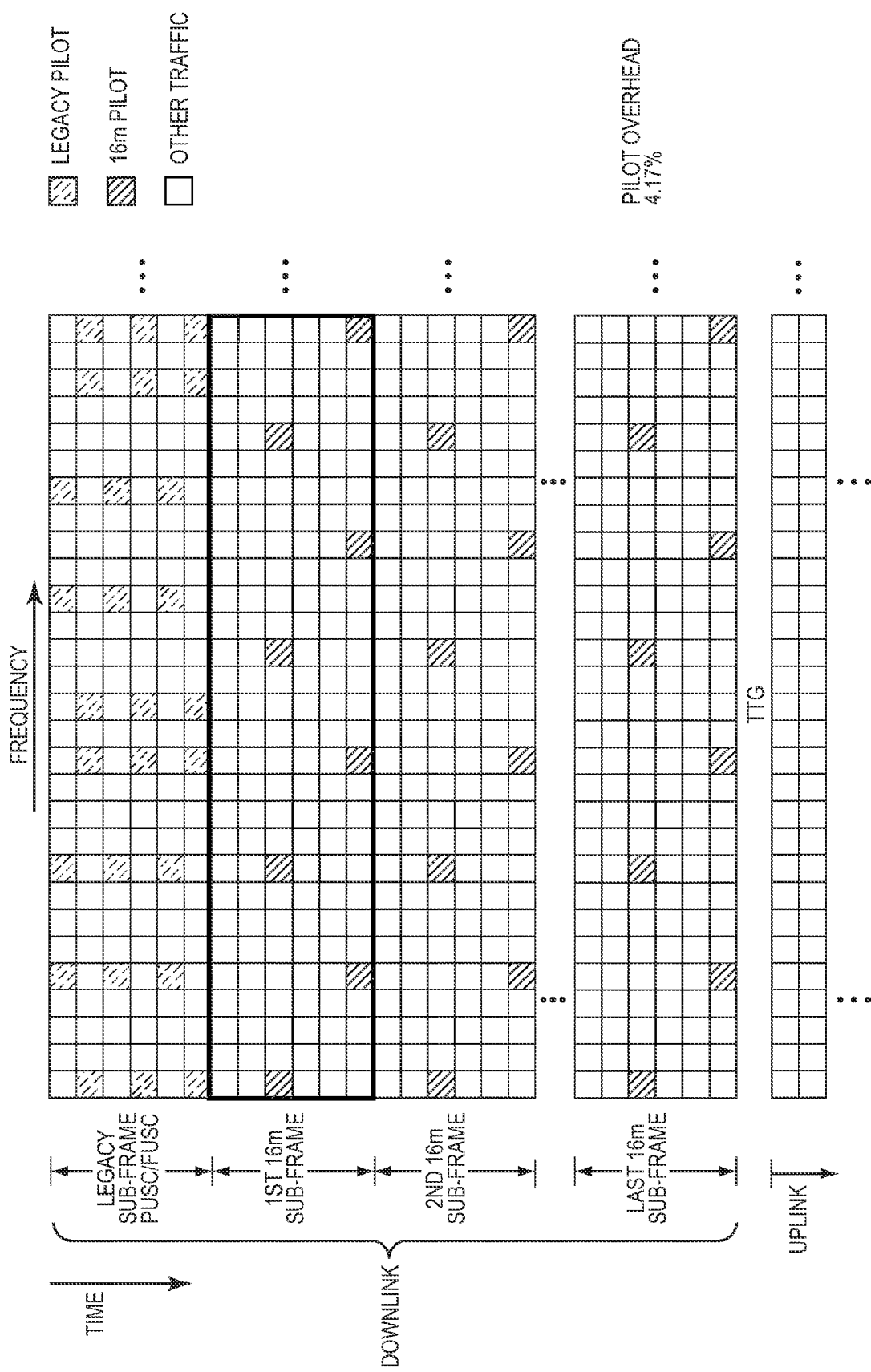
FIGS. 8A through 8E illustrate exemplary pilot symbol patterns that may be utilized by the pilot inserter according to the process of FIG. 7.

FIGS. 8A through 8E illustrate a number of exemplary staggered pilot symbol patterns that may be used by the pilot inserter 24 when operating according to the process of FIG. 7. FIG. 8A illustrates a first exemplary staggered pilot symbol pattern for joint channel estimation. As illustrated, the staggered pilot symbol pattern is uniform in time and begins at a time offset from a starting time boundary of the first modern sub-frame. In this example, the time offset is such that the staggered pilot symbol pattern for the modern sub-frames begins in the third OFDM symbol of the first modern sub-frame. However, a different time offset may be used. In some embodiments, the time offset is greater than two OFDM symbols. The time offset is such that the final pilot symbol locations in time are at or near the ending time boundary of the last modern sub-frame. In this example, the final pilot symbol locations in time are at the last OFDM symbol of the last modern sub-frame. By using the pilot symbols in the last legacy sub-frame and because the final pilot symbol locations are at or near the ending time boundary of the last sub-frame, extrapolations needed for channel estimation are optimized.

Figure 8B:
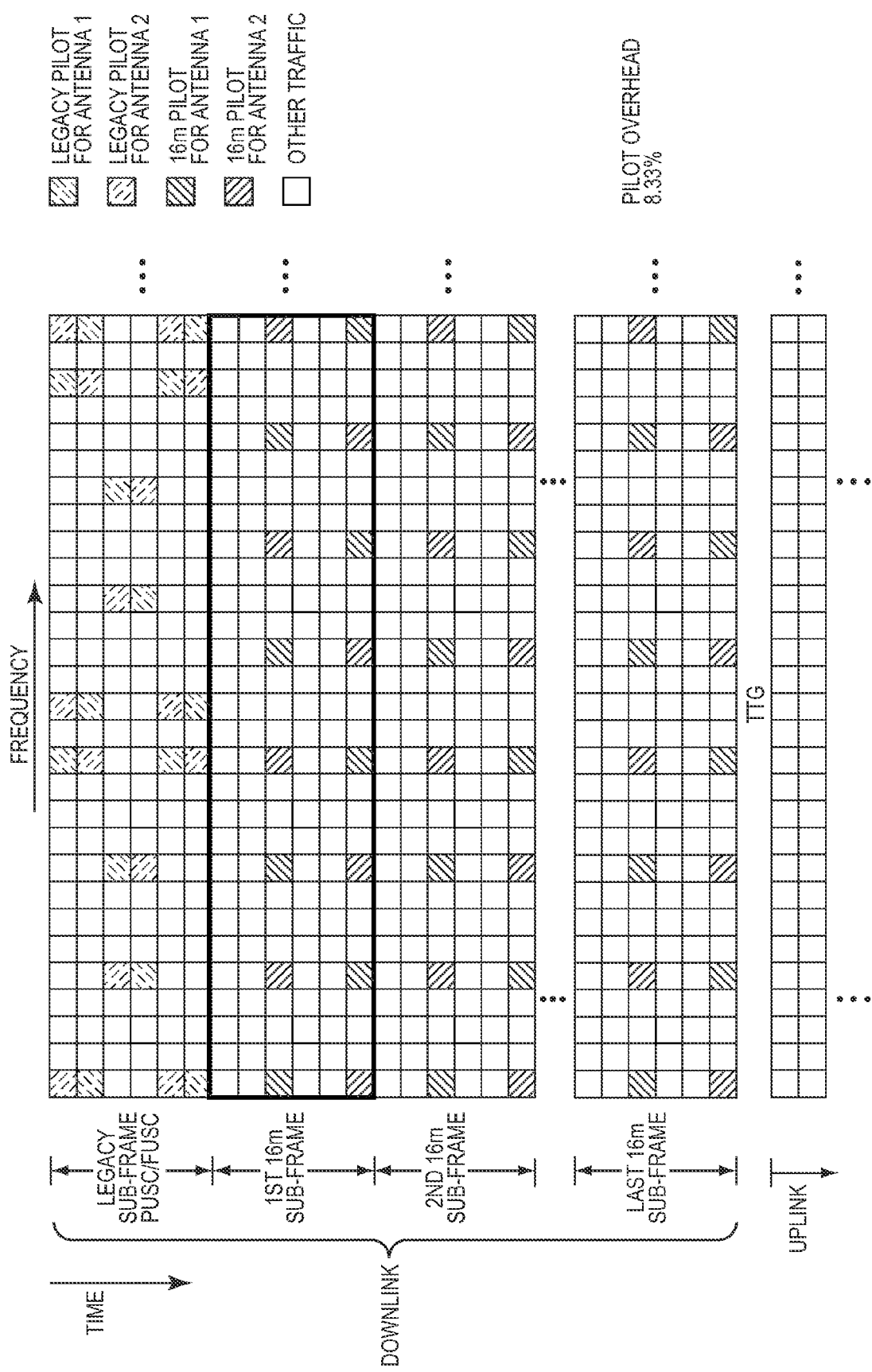
Figure 8C:
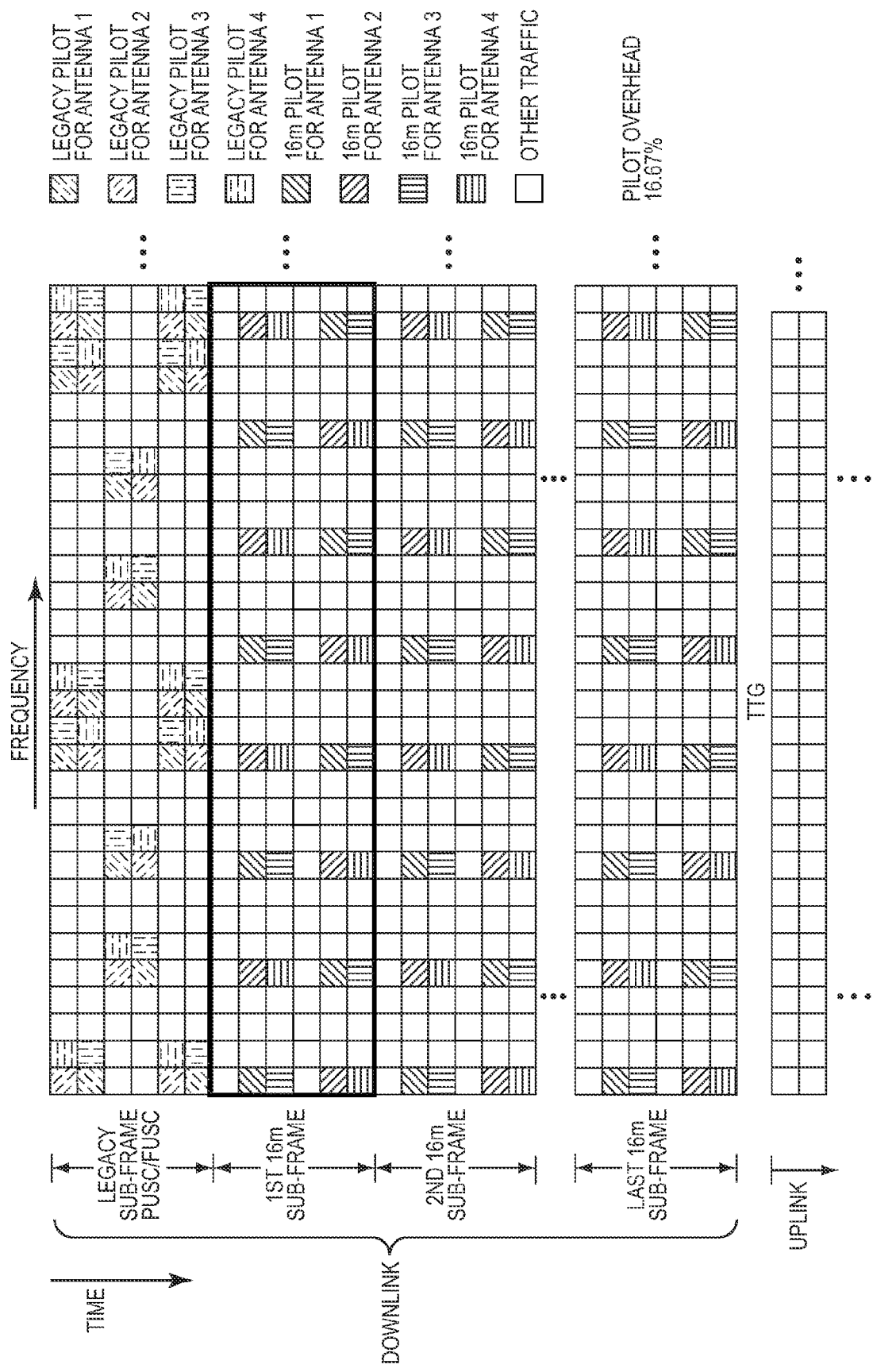

FIGS. 8B and 8C illustrate second and third exemplary staggered pilot symbol patterns for joint channel estimation. The embodiments of FIGS. 8B and 8C are similar to that of FIG. 8A. However, rather than illustrating a staggered pilot symbol pattern for a single transmit antenna, FIGS. 8B and 8C illustrate exemplary staggered pilot symbol patterns for joint channel estimation for two and four transmit antennas, respectively. In an alternative embodiment, the pilot symbol locations for the different transmit antennas may be the same, and CDM may be used to differentiate the pilot symbols for the different antennas (i.e., a different spreading code may be used for each antenna).

Figure 8D:
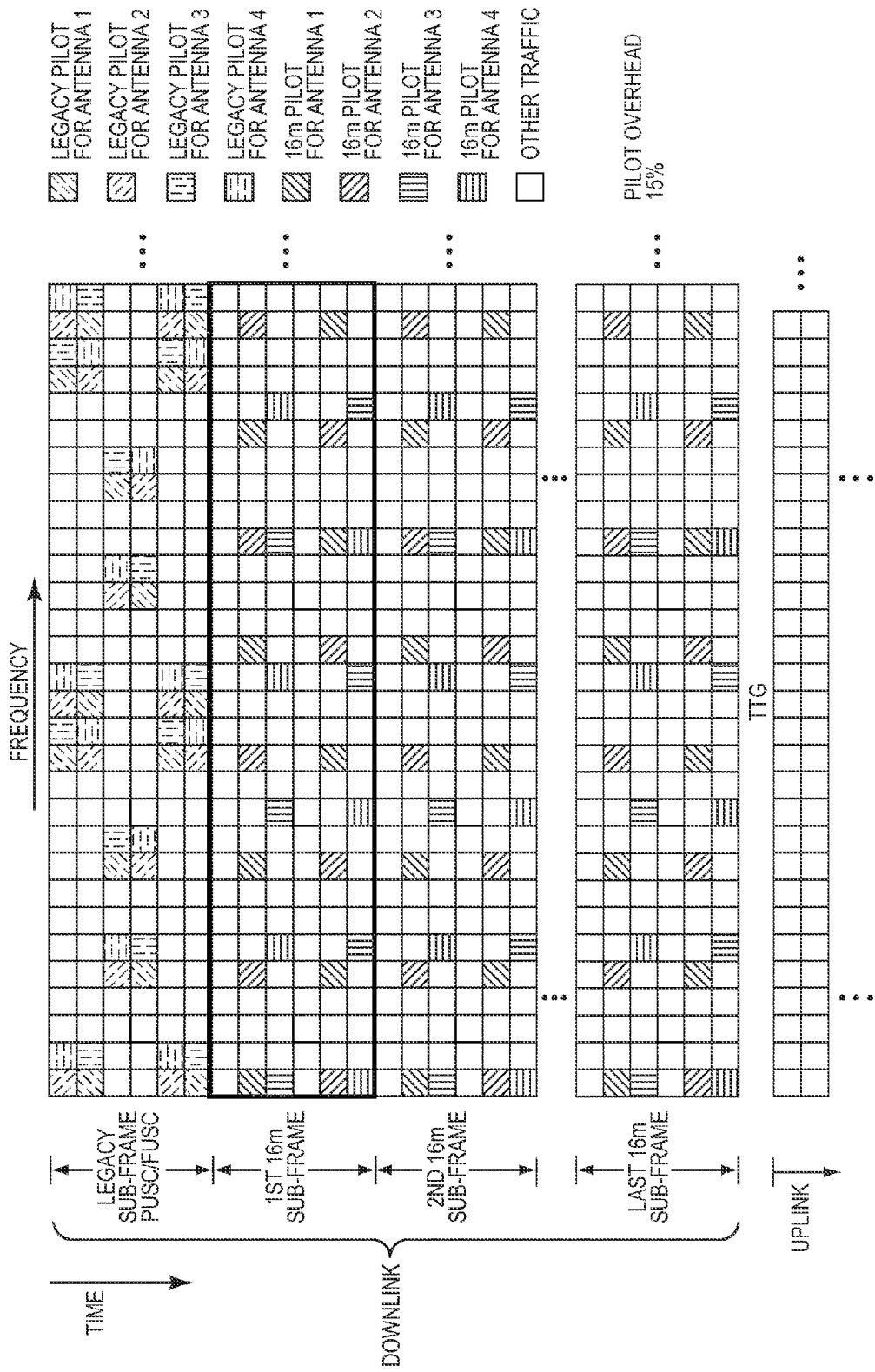

FIG. 8D illustrates a fourth exemplary staggered pilot symbol pattern for joint channel estimation that is similar to that illustrated in FIG. 8C in that it defines pilot symbol locations for four transmit antennas. However, the exemplary embodiment of FIG. 8D illustrates the concept that the spacing in frequency between pilot symbol locations in the pilot symbol patterns for the antennas does not have to be the same. Specifically, in this example, the pilot symbol patterns for transmit antennas 1 and 2 have the same spacing in frequency, and the pilot symbol patterns for transmit antennas 3 and 4 have the same spacing in frequency. However, the spacing in frequency for the transmit antennas 1 and 2 is different than the spacing in frequency for the transmit antennas 3 and 4.

Figure 8E:
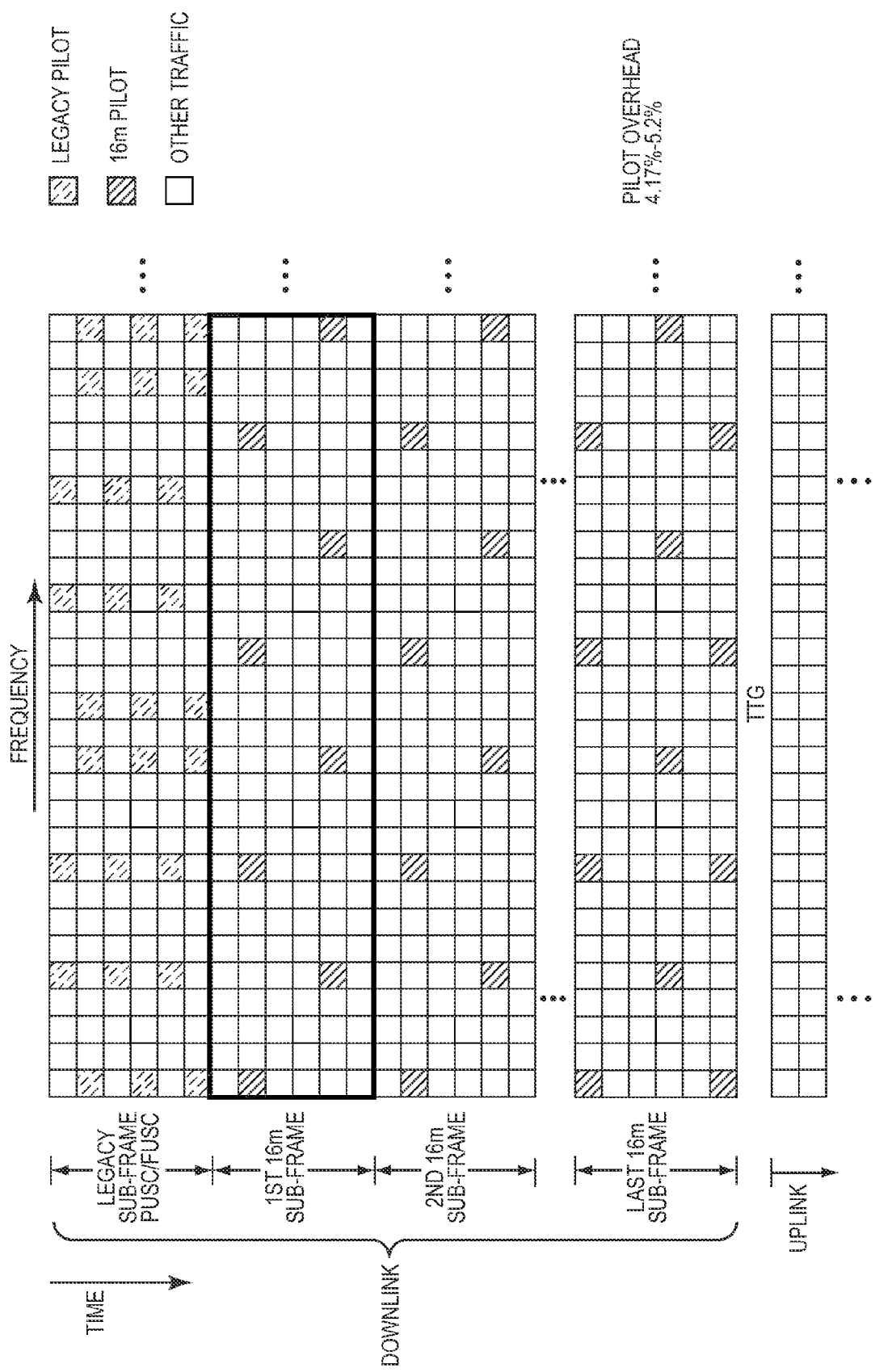

FIG. 8E illustrates a fifth exemplary staggered pilot symbol pattern for joint channel estimation that is similar to that in FIG. 8A. However, FIG. 8E illustrates an alternative embodiment where in addition to having a time offset between the end of the last legacy sub-frame and the start of the staggered pilot symbol pattern in the first modern sub-frame, the pilot symbol locations in the last modern sub-frame are adjusted such that the final pilot symbol locations for the last modern sub-frame are at or near the ending time boundary of the last modern sub-frame. Specifically, in this example, additional pilot symbol locations have been added in the last OFDM symbol of the last modern sub-frame. In another alternative embodiment, rather than adding additional pilot symbol locations, the time spacing between the pilot symbol locations in the first and fourth OFDM symbols of the last modern sub-frame may be increased by one or two OFDM symbol times such that the pilot symbol locations in the fourth OFDM symbol of the last modern sub-frame are shifted to the next-to-last or last OFDM symbol of the last sub-frame.

Figure 9:
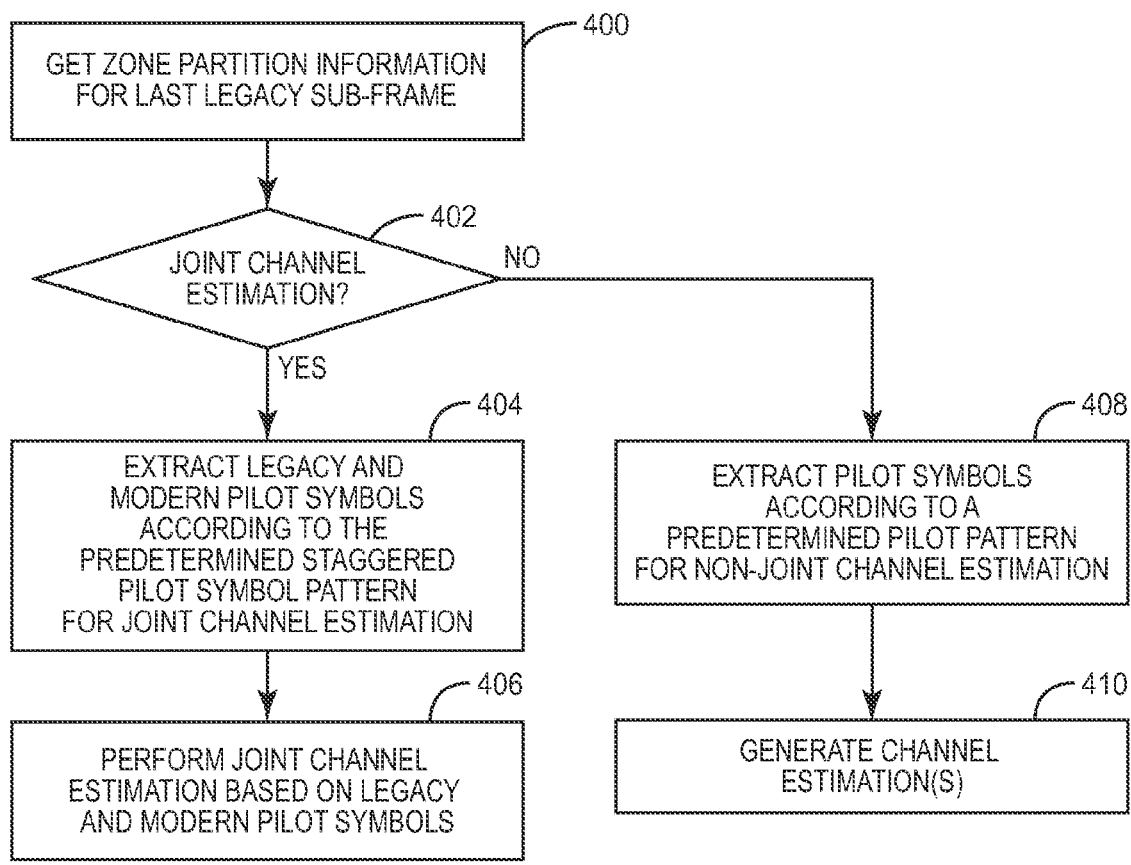
FIG. 9 illustrates the operation of the channel estimator of the OFDM receiver of FIG. 2 to perform joint channel estimation according to another embodiment of this disclosure.

FIG. 9 illustrates the operation of the channel estimator 76 of the OFDM receiver 50 to perform joint channel estimation according to one embodiment of this disclosure. This discussion is equally applicable to the channel estimator of the second OFDM component 58 of the OFDM receiver 50 of FIG. 2. In operation, the channel estimator 76 gets zone partition information for the last legacy sub-frame of a received downlink frame (step 400). Step 400 is specific to IEEE 802.16m. A similar step may be performed in other OFDM communication systems to determine whether the last legacy sub-frame includes pilot symbols that are to be used for joint channel estimation. The channel estimator 76 then determines whether to perform joint channel estimation (step 402). For IEEE 802.16m, the channel estimator 76 makes a determination that joint channel estimation is to be performed if the zone partition for the last legacy sub-frame is Partial Usage of Sub-Channels (PUSC) or Full Usage of Sub-Channels (FUSC).

If joint channel estimation is to be performed, the channel estimator 76 extracts pilot symbols from the last legacy sub-frame and pilot symbols from the one or more modern sub-frames according to a predetermined staggered pilot symbol pattern for joint channel estimation (step 404). The predetermined pilot symbol pattern may be a function of the number of modern sub-frames in the downlink frame. For example, the density of the pilot symbol pattern may be inversely related to the number of modern sub-frames in the downlink frame. The channel estimator 76 then performs joint channel estimation based on at least some of the pilot symbols from the last legacy sub-frame and the pilot symbols in the one or more modern sub-frames (step 406). By using pilot symbols in the last legacy sub-frame, the channel responses for channels (i.e., sub-carrier/OFDM symbol pairs) near the starting time boundary of the first modern sub-frame may be estimated using interpolation, rather than extrapolation, thereby improving the accuracy of the estimates of the channel responses.

Returning to step 402, if joint channel estimation is not to be performed, the channel estimator 76 extracts pilot symbols from the one or more modern sub-frames according to a predetermined pilot symbol pattern (step 408). For example, when joint channel estimation is not to be performed, the predetermined pilot symbol pattern used for pilot insertion at the OFDM transmitter 10 and pilot extraction at the OFDM receiver 50 may be a staggered pilot symbol pattern such as that discussed above with respect to FIGS. 4, 5A-5J, and 6. The channel estimator 76 then generates the channel estimates for each sub-carrier/OFDM symbol pair based on the extracted pilot symbols using known techniques (step 410).

Figure 10:
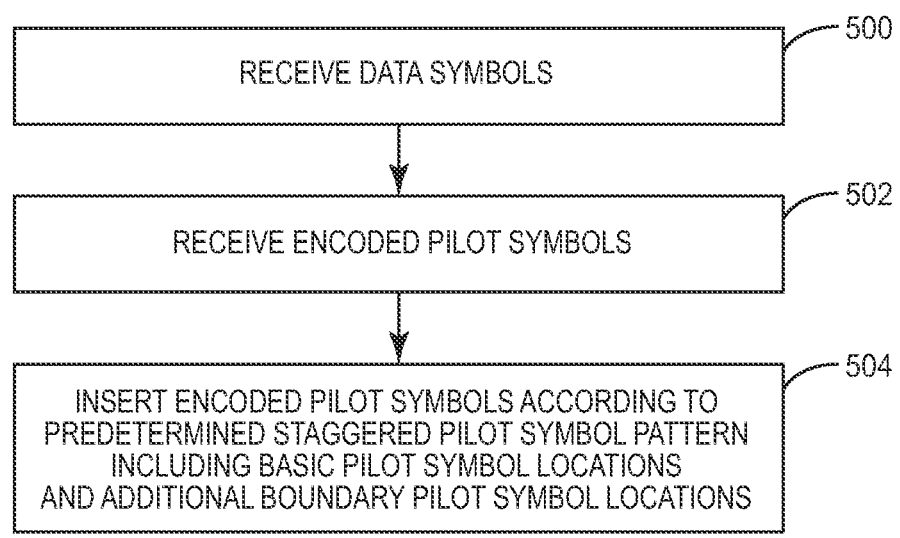
FIG. 10 is a flow chart illustrating the operation of the pilot inserter of the OFDM transmitter of FIG. 1 according to another embodiment of this disclosure.

FIG. 10 is a flow chart illustrating the operation of each of the pilot inserters 24 and 46 of FIG. 1 to insert pilot symbols among the data symbols according to yet another embodiment of this disclosure. The method will be described with reference to the pilot inserter 24 in the first OFDM component 20; however, the method is equally applicable to the pilot inserter 46 of the second OFDM component 44. In this embodiment, the OFDM transmitter 10 is transmitting a downlink frame including one or more modern sub-frames, wherein only common pilots are used throughout the one or more modern sub-frames. In general, the predetermined pilot symbol pattern defining the locations at which pilots are to be inserted into the one or more modern sub-frames, which for this discussion are simply referred to as sub-frames, includes basic pilot symbol locations defining a basic staggered pilot symbol pattern that is uniform in time and a number of additional boundary pilot symbol locations at or near time and/or frequency boundaries of the one or more sub-frames.

In operation, the pilot inserter 24 receives data symbols from the demultiplexer 22 for the one or more modern sub-frames of the downlink frame (step 500), and receives encoded pilot symbols from the pilot STBC function 40 (step 502). The pilot STBC function 40 generates (or receives) two pilot symbols and applies STBC encoding to the pilot symbols so as to generate an STBC block of encoded pilot symbols. The encoded pilot symbols generated for the first transmitting antenna 38 will be one row of the STBC block and will have a number equal to the number of transmitting antennas in the OFDM transmitter 10. Thus, for the two antenna OFDM transmitter 10 of FIG. 1, a 2×2 STBC block is generated.

The pilot inserter 24 inserts the encoded pilot symbols into the one or more sub-frames according to a predetermined staggered pilot symbol pattern including basic pilot symbol locations defining a uniform pilot symbol pattern and a number of additional boundary pilot symbol locations at or near time and/or frequency boundaries of the one or more sub-frames (step 504). Note that the staggered pilot symbol pattern may be a function of the number of sub-frames in the one or more sub-frames. For instance, the density of the staggered pilot symbol pattern may be inversely related to the number of sub-frames in the one or more sub-frames. In some cases, additional boundary pilot symbol locations at or near the time boundaries of the one or more sub-frames include pilot symbol locations in the first or near the first OFDM symbol of the first sub-frame, pilot symbol locations in the last or next-to-last OFDM symbol of the last sub-frame, or both. Likewise, additional boundary pilot symbol locations at or near the frequency boundaries of the one or more sub-frames can include pilot symbol locations at a first, second, or third sub-carrier frequency within at least some of the one or more sub-frames, pilot symbol locations at a last sub-carrier, next-to-last sub-carrier, or second-to-last sub-carrier frequency within at least some of the one or more sub-frames, or both.

Note that, in one embodiment, a power boost may be applied to the pilot symbols. In order to avoid interference between these power boosted pilot symbols in neighboring sectors of the communication system, each sector may apply a different frequency offset to the predetermined staggered pilot symbol location. In another embodiment, a power boost may be applied to all pilot symbols except pilot symbols in any additional frequency boundary pilot symbol locations. As such, each sector may apply a different frequency offset to all pilot symbol locations within the predetermined staggered pilot symbol pattern other than the pilot symbols in the additional frequency boundary pilot symbol locations.

Figure 11A:
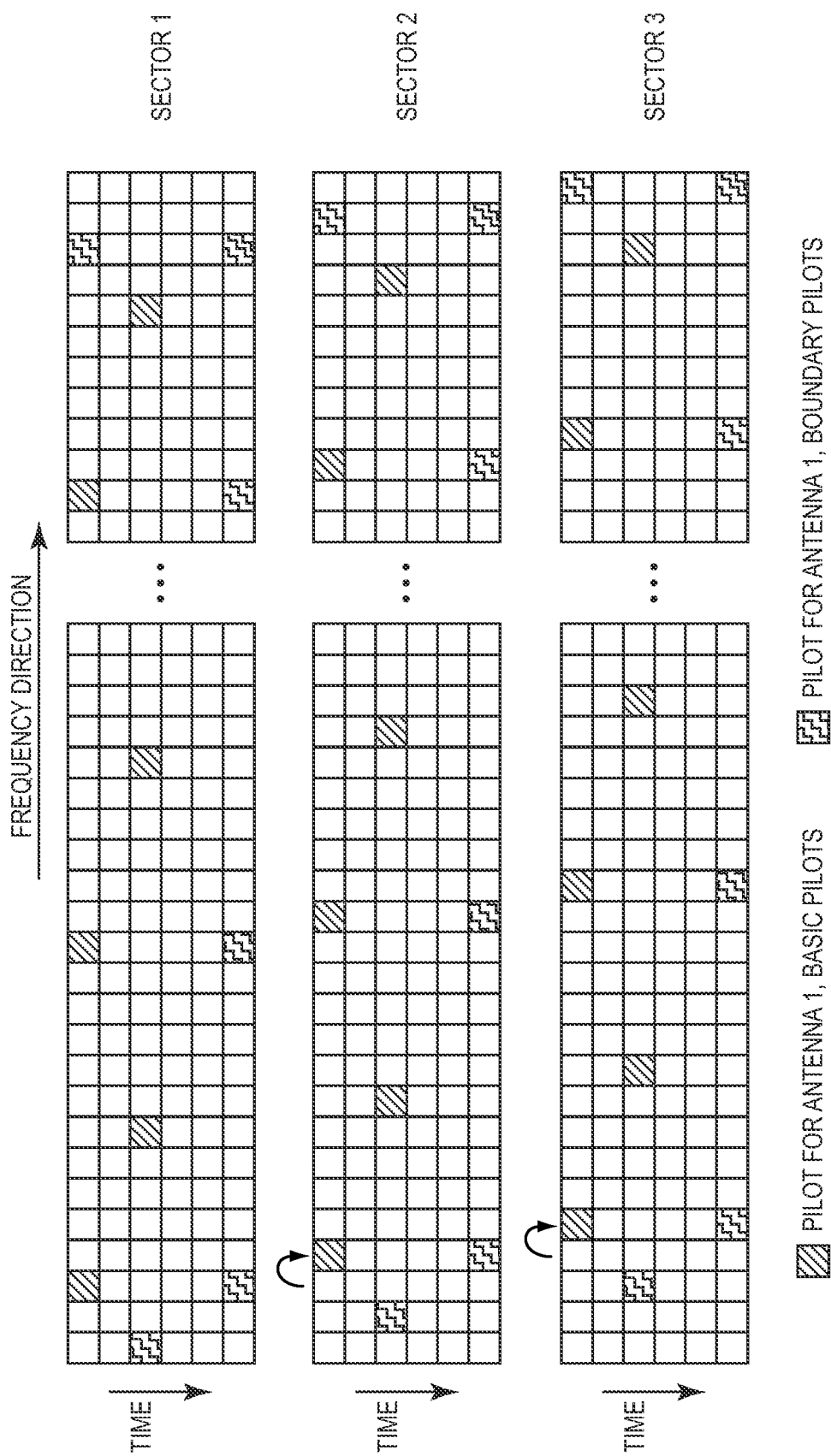
FIGS. 11A through 11F illustrate exemplary pilot symbol patterns that may be utilized by the pilot inserter according to the process of FIG. 10.

FIGS. 11A through 11F illustrate a number of exemplary staggered pilot symbol patterns that may be used by the pilot inserter 24 when operating according to the process of FIG. 10. FIG. 11A illustrates a first exemplary staggered pilot symbol pattern including basic pilot symbol locations defining a uniform staggered pilot symbol pattern and additional boundary pilot symbol locations at or near time and frequency boundaries of a sub-frame. The additional boundary pilot symbol locations are at or near time and frequency boundaries of the sub-frame. As a result of the additional boundary pilot locations, the number of extrapolations needed for channel estimation is substantially reduced if not eliminated.

FIG. 11A also illustrates the concept that the pilot symbol patterns for different sectors of a cell in an IEEE 802.16m communications system, or the like, may be offset in frequency. Thus, in this example, the pilot symbol locations for the second sector are offset by one sub-carrier from the pilot symbol locations for the first sector, and the pilot symbol locations for the third sector are offset by one sub-carrier from the pilot symbol locations for the second sector.

Figure 11B:
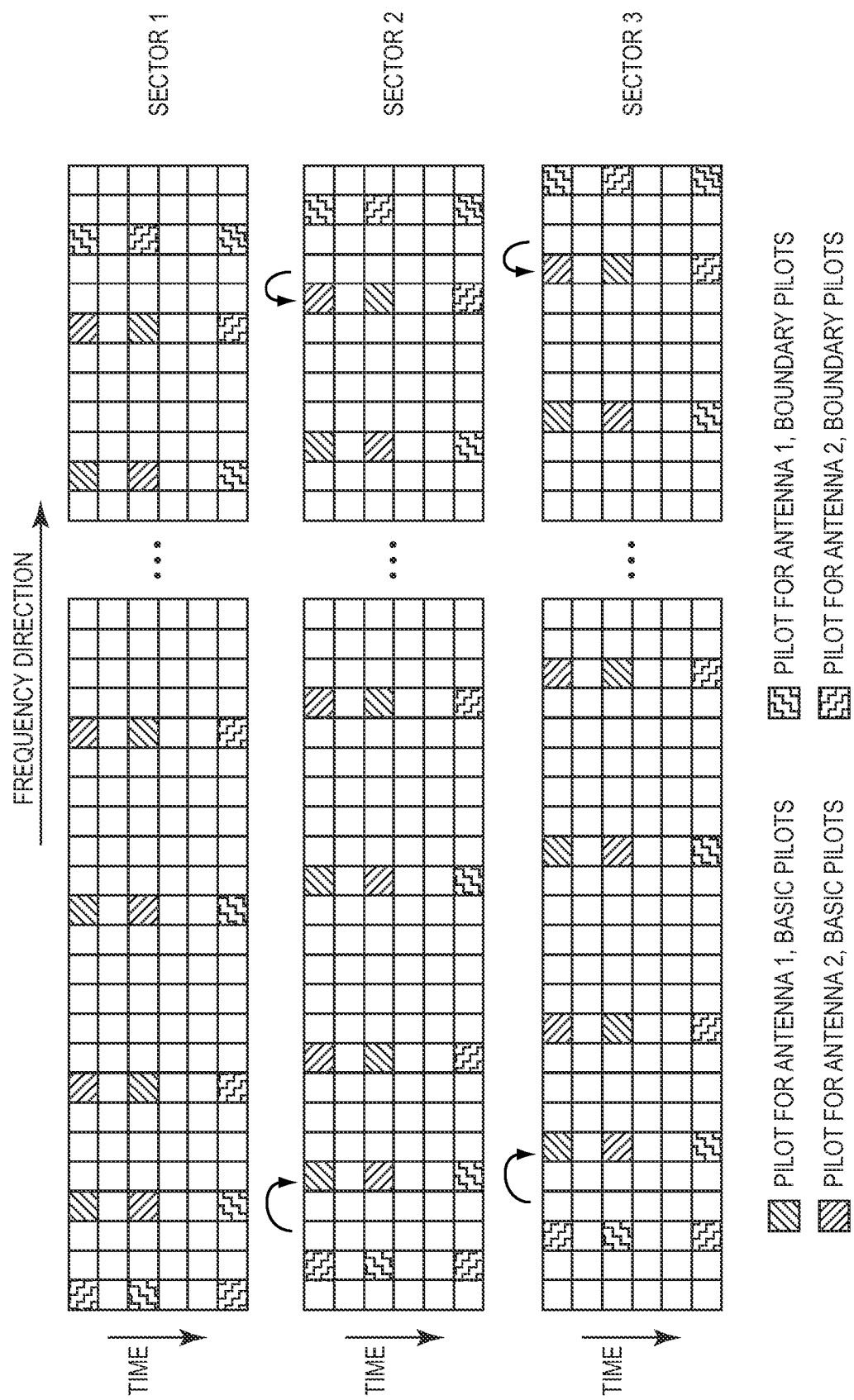
Figure 11C:
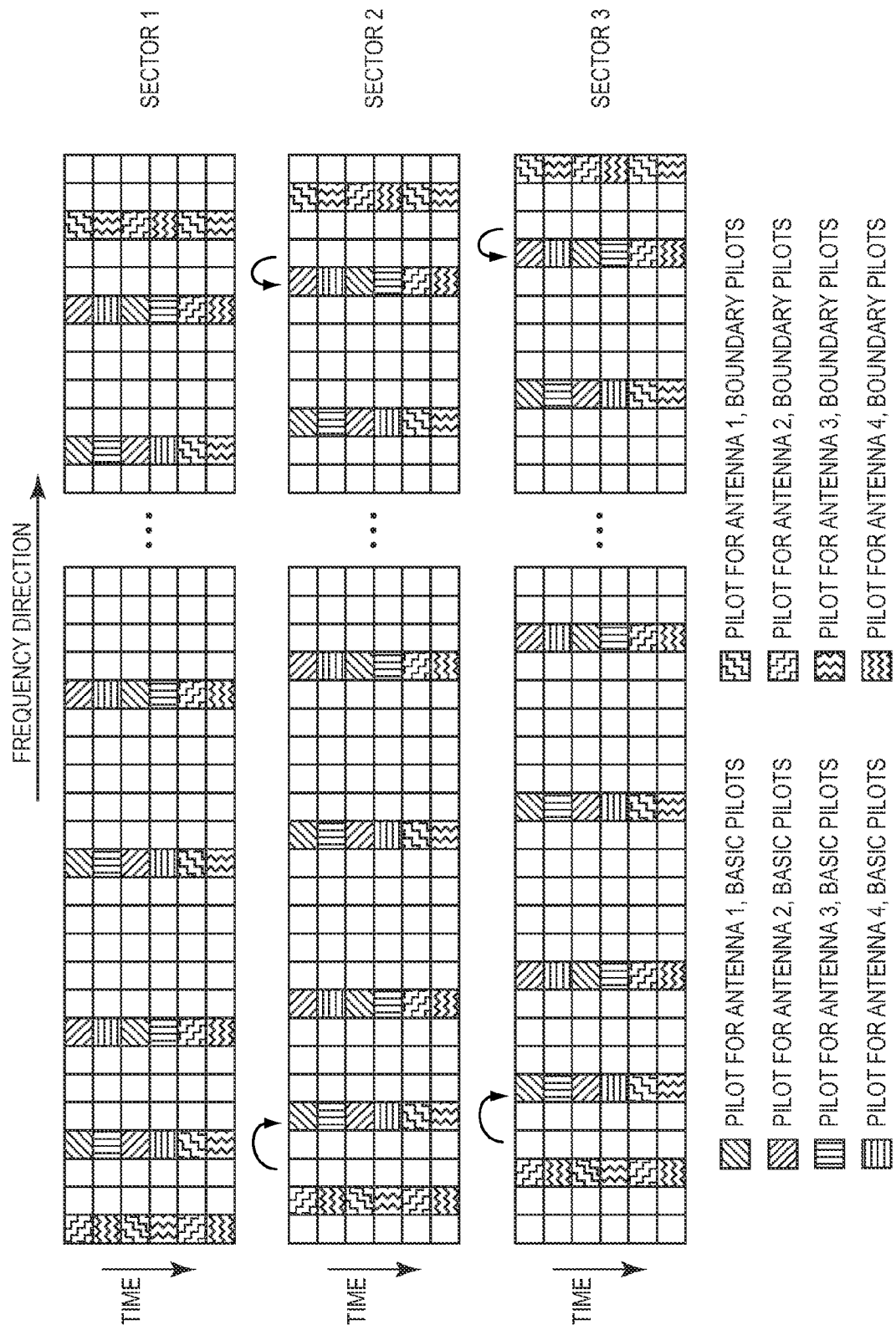

FIGS. 11B and 11C illustrate second and third exemplary staggered pilot symbol patterns including basic pilot symbol locations defining a uniform staggered pilot symbol pattern and additional boundary pilot symbol locations at or near time and frequency boundaries of a sub-frame. The embodiments of FIGS. 11B and 11C are similar to that of FIG. 11A. However, rather than illustrating a staggered pilot symbol pattern for a single transmit antenna, FIGS. 11B and 11C illustrate exemplary staggered pilot symbol patterns for two and four transmit antennas, respectively. In an alternative embodiment, the pilot symbol locations for the different transmit antennas may be the same, and CDM may be used to differentiate the pilot symbols for the different antennas (i.e., a different spreading code may be used for each antenna).

Figure 11D:
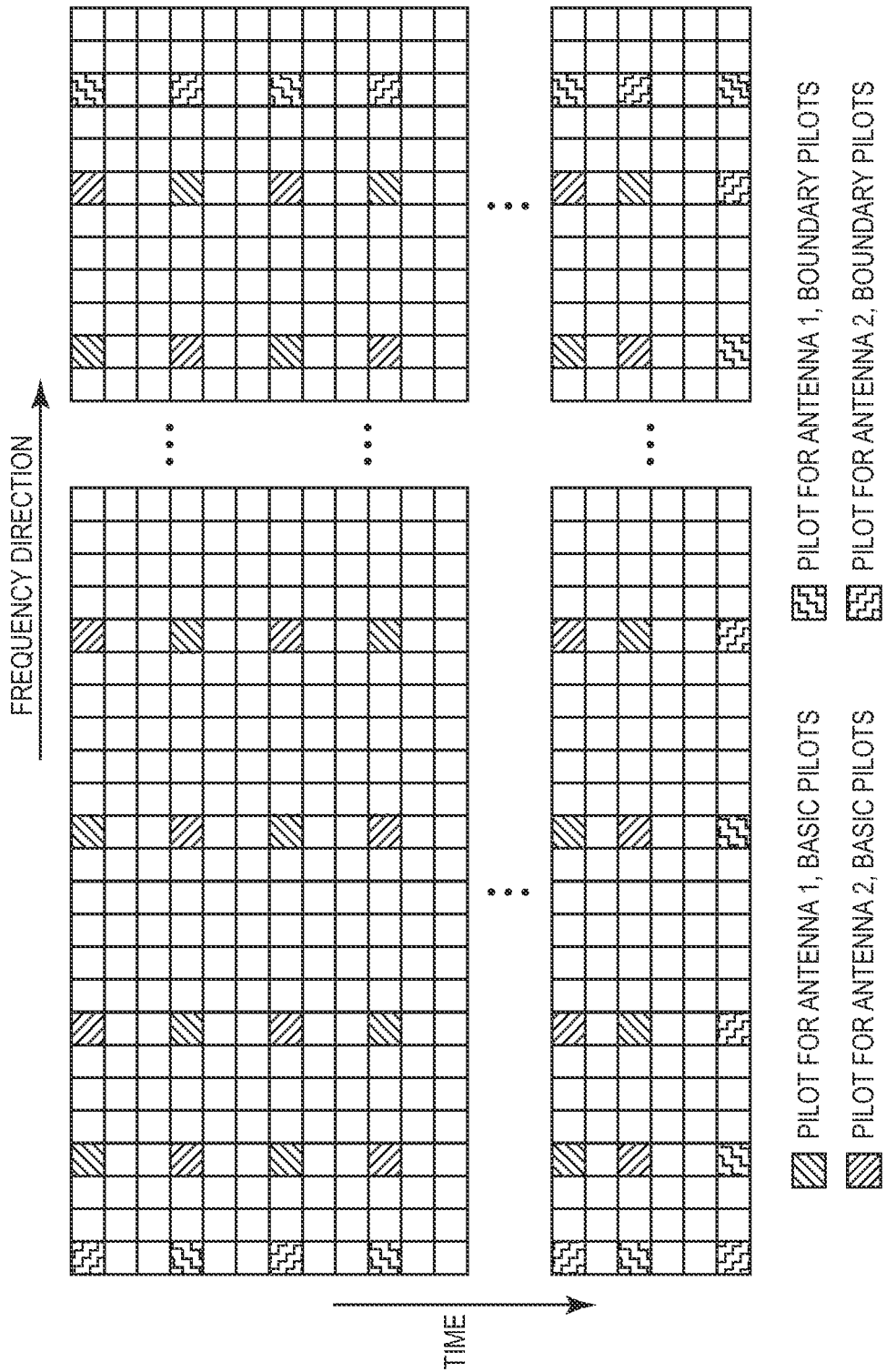

FIG. 11D illustrates a fourth exemplary staggered pilot symbol pattern including basic pilot symbol locations defining a uniform staggered pilot symbol pattern and additional boundary pilot symbol locations at or near time and frequency boundaries of a number of sub-frames. The embodiment of FIG. 11D is similar to that of FIG. 11A. However, rather than illustrating a staggered pilot symbol pattern for a single sub-frame, FIG. 11D illustrates an exemplary staggered pilot symbol pattern for multiple sub-frames for two transmit antennas. This may particularly be beneficial for a downlink frame including one or more modern sub-frames having common pilot symbols.

Figure 11E:
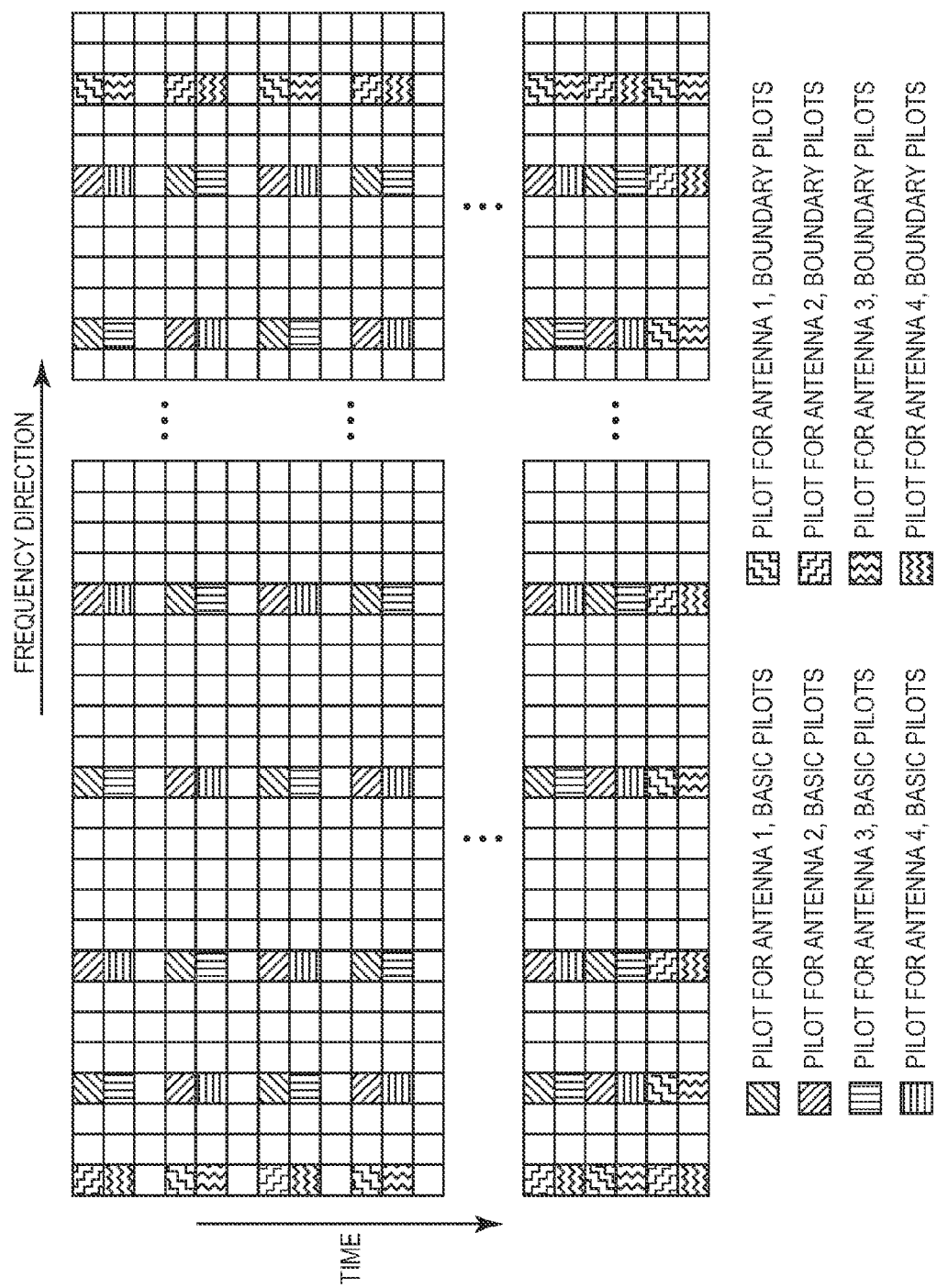

FIG. 11E illustrates a fifth exemplary staggered pilot symbol pattern including basic pilot symbol locations defining a uniform staggered pilot symbol pattern and additional boundary pilot symbol locations at or near time and frequency boundaries of a number of sub-frames. The embodiment of FIG. 11E is similar to that of FIG. 11D. However, rather than illustrating a staggered pilot symbol pattern for two transmit antennas, FIG. 11E illustrates an exemplary staggered pilot symbol pattern for four transmit antennas. Again, in an alternative embodiment, the pilot symbol locations for the four transmit antennas may be the same, and CDM may be used to differentiate the pilot symbols for the different antennas (i.e., a different spreading code may be used for each antenna).

Figure 11F:
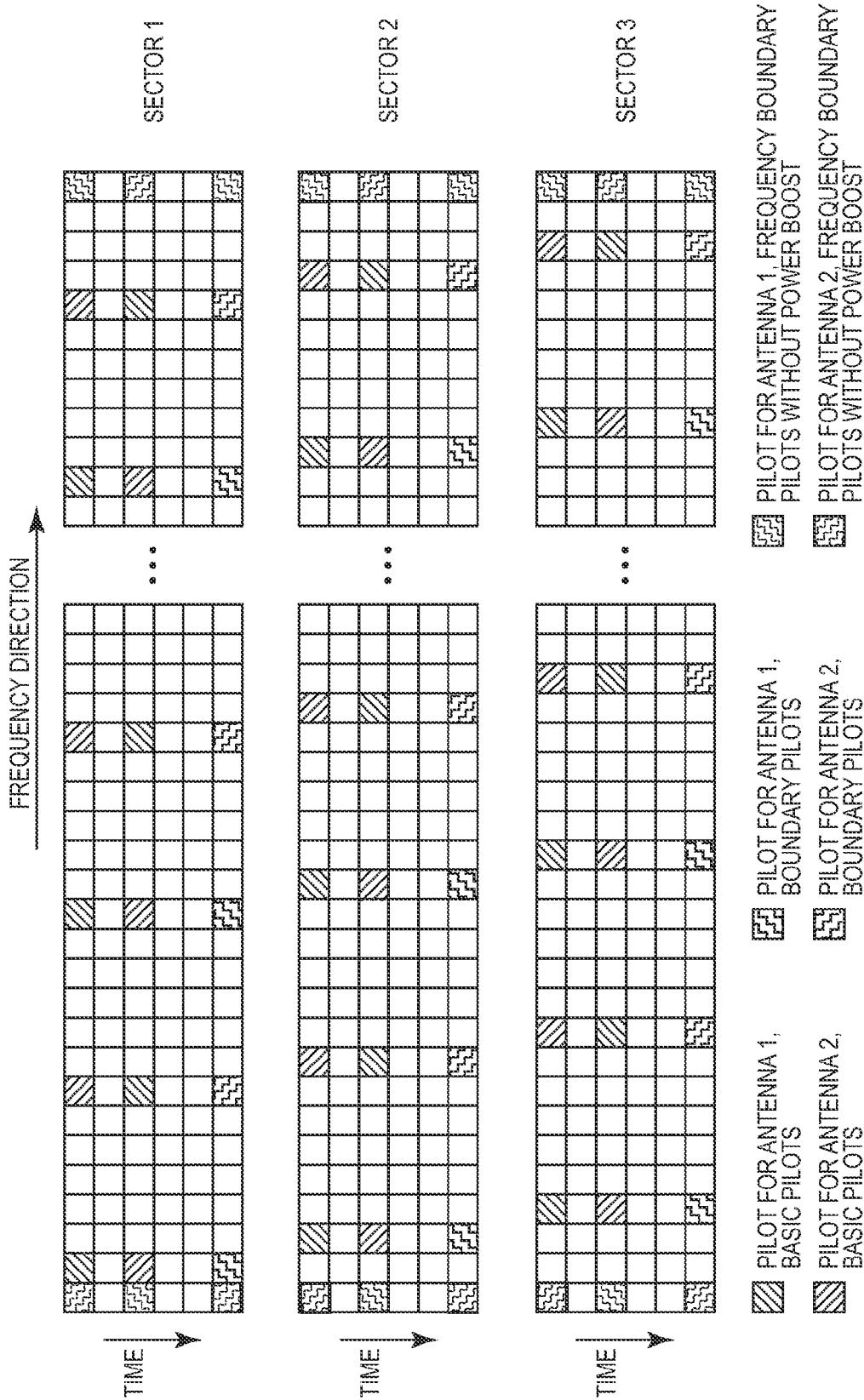

FIG. 11F illustrates a sixth exemplary staggered pilot symbol pattern including basic pilot symbol locations defining a uniform staggered pilot symbol pattern and additional boundary pilot symbol locations at or near time and frequency boundaries of the number of sub-frames. This embodiment similar to that of FIG. 11B. However, in this embodiment, a power boost is applied to all pilot symbols except those in the additional frequency boundary pilot symbol locations. As such, each sector has the same frequency boundary pilot symbol locations (i.e., there is not need for each sector to apply a different frequency offset to the frequency boundary pilot symbol locations).

Figure 12:
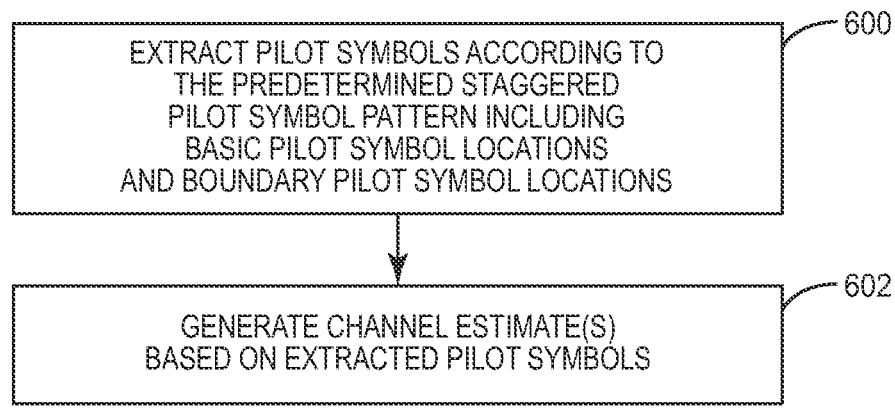
FIG. 12 is a flow chart illustrating the operation of the channel estimator of the OFDM receiver of FIG. 2 according to another embodiment of this disclosure.

FIG. 12 is a flow chart illustrating the operation of the channel estimator 76 of FIG. 2 according to yet another embodiment of this disclosure. This discussion is equally applicable to the channel estimator of the second OFDM component 58 of the OFDM receiver 50 of FIG. 2. In this embodiment, the OFDM receiver 50 receives a downlink frame including one or more sub-frames having pilots inserted therein based on a staggered pilot symbol pattern including basic pilot symbol locations defining a uniform basic pilot symbol pattern and additional boundary pilot symbol locations at or near time and/or frequency boundaries of the one or more sub-frames.

In operation, the channel estimator 76 extracts the pilot symbols from the symbols, or more specifically symbol estimates, received from the FFT processor 70 according to the predetermined staggered pilot symbol pattern for the one or more sub-frames (step 600). If the pilot symbol pattern varies as a function of the number of sub-frames, the channel estimator 76 may first determine the number of sub-frames and then extract the pilot symbols according to the predetermined staggered pilot symbol pattern used for that number of sub-frames.

The channel estimator 76 then generates channel estimates for each sub-carrier frequency and OFDM symbol pair in the one or more sub-frames based on the extracted pilot symbols using known channel estimation techniques (step 602). More specifically, for each extracted pilot symbol, the channel estimator 76 may directly determine the channel response for the corresponding sub-carrier and OFDM symbol based on a comparison of the extracted pilot symbol and an expected pilot symbol known to be transmitted by the OFDM transmitter 10. Then, channel responses for the remaining sub-carrier and OFDM symbol combinations (i.e., the non-pilot symbol locations) in the one or more sub-frames are estimated using known interpolation and, if needed, extrapolation techniques. Note, however, that the number of extrapolations needed for channel estimation is substantially reduced, if not eliminated, as compared to the number of extrapolations needed for previous staggered pilot patterns as a result of the additional boundary pilot symbol locations.

Figure 13:
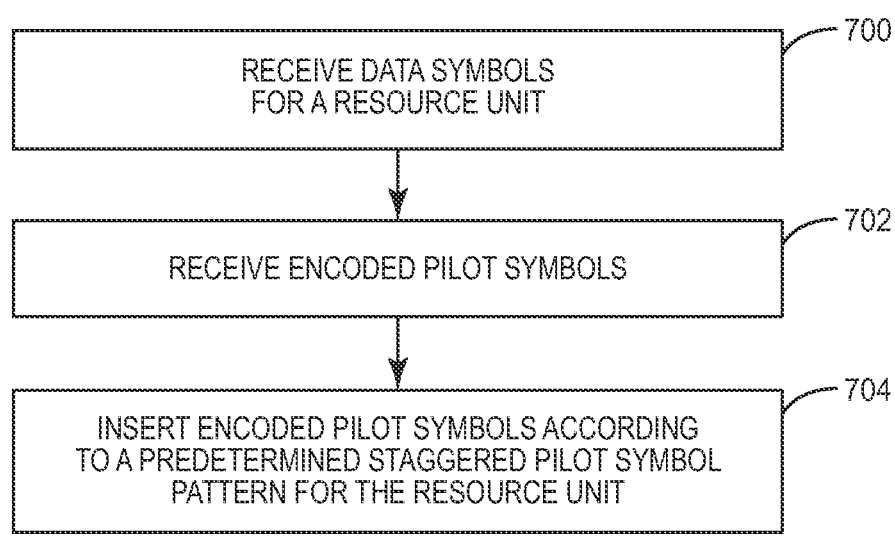
FIG. 13 is a flow chart illustrating the operation of the pilot inserter of the OFDM transmitter of FIG. 1 according to another embodiment of this disclosure.

FIG. 13 is a flow chart illustrating the operation of each of the pilot inserters 24 and 46 of FIG. 1 to insert pilot symbols among the data symbols in a resource unit according to yet another embodiment of this disclosure. The method will be described with reference to the pilot inserter 24 in the first OFDM component 20; however, the method is equally applicable to the pilot inserter 46 of the second OFDM component 44. In this embodiment, the OFDM transmitter 10 is transmitting data in a resource unit of either a downlink or uplink frame (generally referred to herein as a transmit frame). The resource unit is a portion of the transmit frame. More specifically, the resource unit may be a sub-frame, a portion of one sub-frame, or contiguous portions of one or more neighboring sub-frames. Pilot symbols inserted into the resource unit may be common pilots or dedicated pilots.

In operation, the pilot inserter 24 receives data symbols from the demultiplexer 22 for the resource unit of the transmit frame (step 700), and receives encoded pilot symbols from the pilot STBC function 40 (step 702). The pilot STBC function 40 generates (or receives) two pilot symbols and applies STBC encoding to the pilot symbols so as to generate an STBC block of encoded pilot symbols. The encoded pilot symbols generated for the first transmitting antenna 38 will be one row of the STBC block and will have a number equal to the number of transmitting antennas in the OFDM transmitter 10. Thus, for the two antenna OFDM transmitter 10 of FIG. 1, a 2×2 STBC block is generated.

The pilot inserter 24 inserts the encoded pilot symbols into the resource unit according to a predetermined staggered pilot symbol pattern for the resource unit (step 704). The predetermined staggered pilot symbol pattern includes pilot symbol locations at or near time boundaries of the resource unit, at or near both frequency boundaries of the resource unit, or pilot symbol locations at or near both the time boundaries and the frequency boundaries of the resource unit. In this embodiment, a pilot symbol location can be at or near a time boundary of the resource unit if the pilot symbol location is in the first or near the first OFDM symbol from the time boundary, and a pilot symbol location is at or near a frequency boundary of the resource unit if the pilot symbol location is in the first or near the first sub-carrier from the frequency boundary. For example, a pilot symbol location may be considered to be at or near a time boundary of the resource unit if the pilot symbol location is in the first or second OFDM symbol from the time boundary. Likewise, for example, a pilot symbol location may be considered to be at or near a frequency boundary of the resource unit if the pilot symbol location is in the first or second sub-carrier from the frequency boundary.

In one embodiment, the size of the resource unit may vary, and the predetermined staggered pilot symbol pattern is a function of the size of the resource unit. For instance, a density of the staggered pilot symbol pattern can be inversely related to the size of the resource unit. The size of the resource unit is related to a number of symbol locations within the resource unit. In one embodiment, a basic resource block corresponding to a minimum allocable resource unit may be defined. For example, the basic resource block may be a 6 symbol by 4 sub-carrier block of symbol locations. The size of the resource unit may then be defined as a number of basic resource blocks. For example, the resource unit may be one resource block, two resource blocks, etc. A different staggered pilot symbol pattern may be defined for each of a number of resource unit sizes. Then, the pilot inserter 24 determines the staggered pilot symbol pattern to be used based on the size of the resource unit.

Figure 14A:
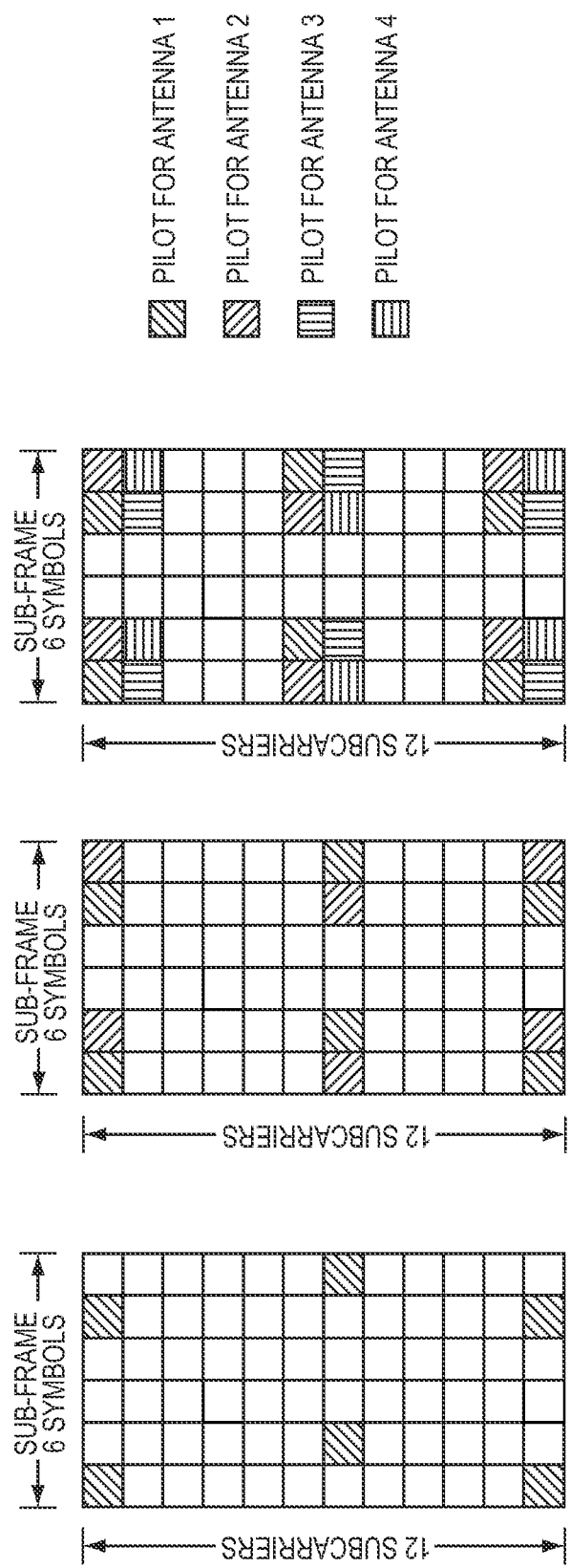

FIGS. 14A through 14H illustrate a number of exemplary staggered pilot symbol patterns that may be used by the pilot inserter 24 when operating according to the process of FIG. 13. FIG. 14A illustrates first exemplary staggered pilot symbol patterns for a resource unit for one transmit antenna, two transmit antennas, and four transmit antennas. As illustrated, the staggered pilot symbol patterns include pilot symbol locations at or near the time and frequency boundaries of the resource unit for each transmit antenna. Note that, in an alternative embodiment, the pilot symbol locations for the different transmit antennas may be the same, and CDM may be used to differentiate the pilot symbols for the different antennas (i.e., a different spreading code may be used for each antenna).

Figure 14B:
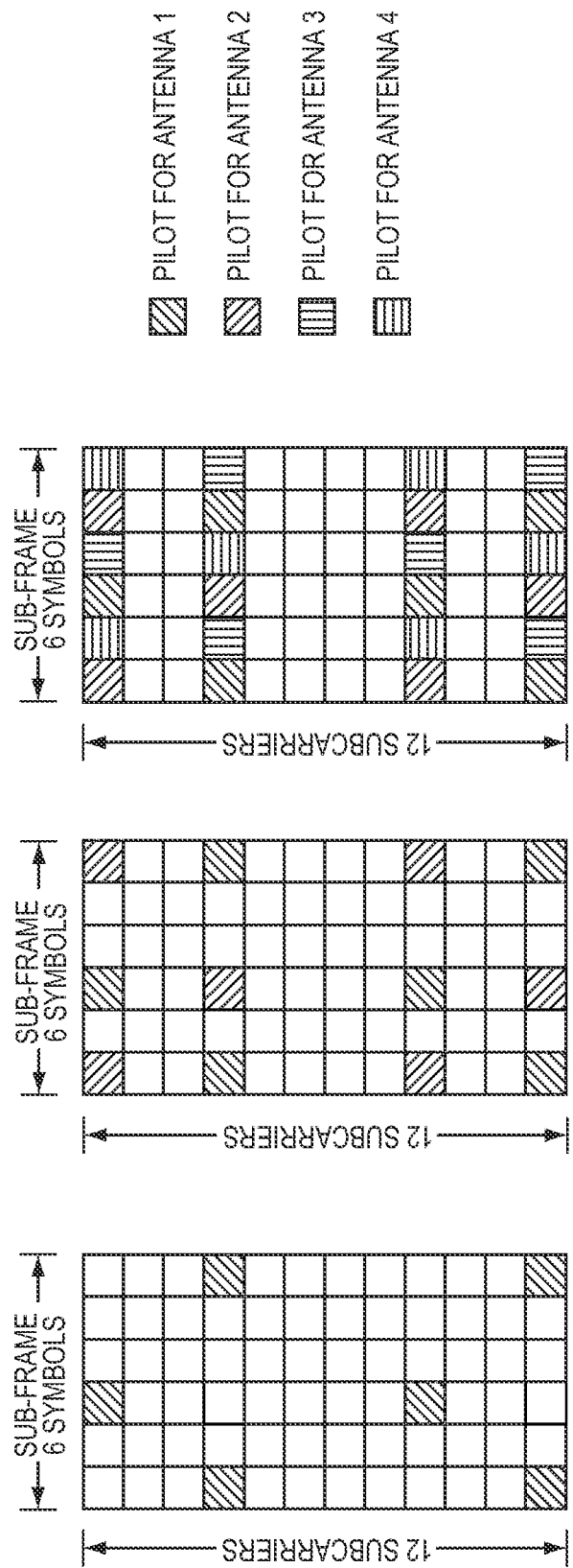

FIG. 14B illustrates second exemplary staggered pilot symbol patterns for a resource unit for one transmit antenna, two transmit antennas, and four transmit antennas. Again, the staggered pilot symbol patterns include pilot symbol locations at or near the time and frequency boundaries of the resource unit for each transmit antenna. FIG. 14C illustrates third exemplary staggered pilot symbol patterns for a resource unit for one transmit antenna, two transmit antennas, and four transmit antennas. Again, the staggered pilot symbol patterns include pilot symbol locations at or near the time and frequency boundaries of the resource unit for each transmit antenna.

Figure 14D:
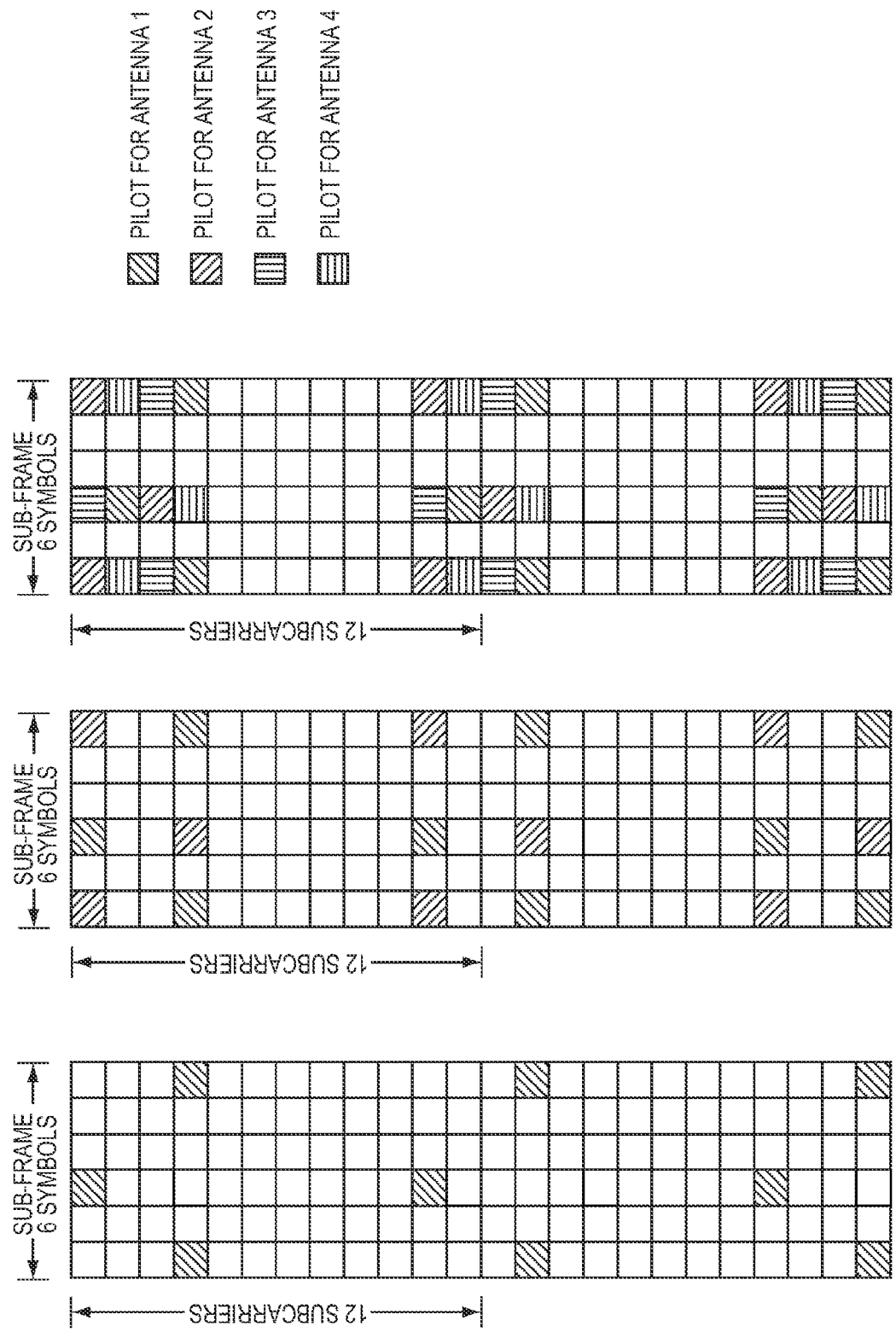

FIG. 14D illustrates exemplary staggered pilot symbol patterns for one, two, and four transmit antennas for a resource unit that is twice the size of the resource unit of FIGS. 14A through 14C. Specifically, the resource unit of FIGS. 14A through 14C is a 6 symbol by 12 sub-carrier block of symbol locations. In contrast, the resource unit of FIG. 14D is 6 symbols by 24 sub-carriers. Note that because the size of the resource unit has increased as compared to that of FIGS. 14A through 14C, the density of the staggered pilot symbol pattern of FIG. 14D has decreased.

Figure 14E:
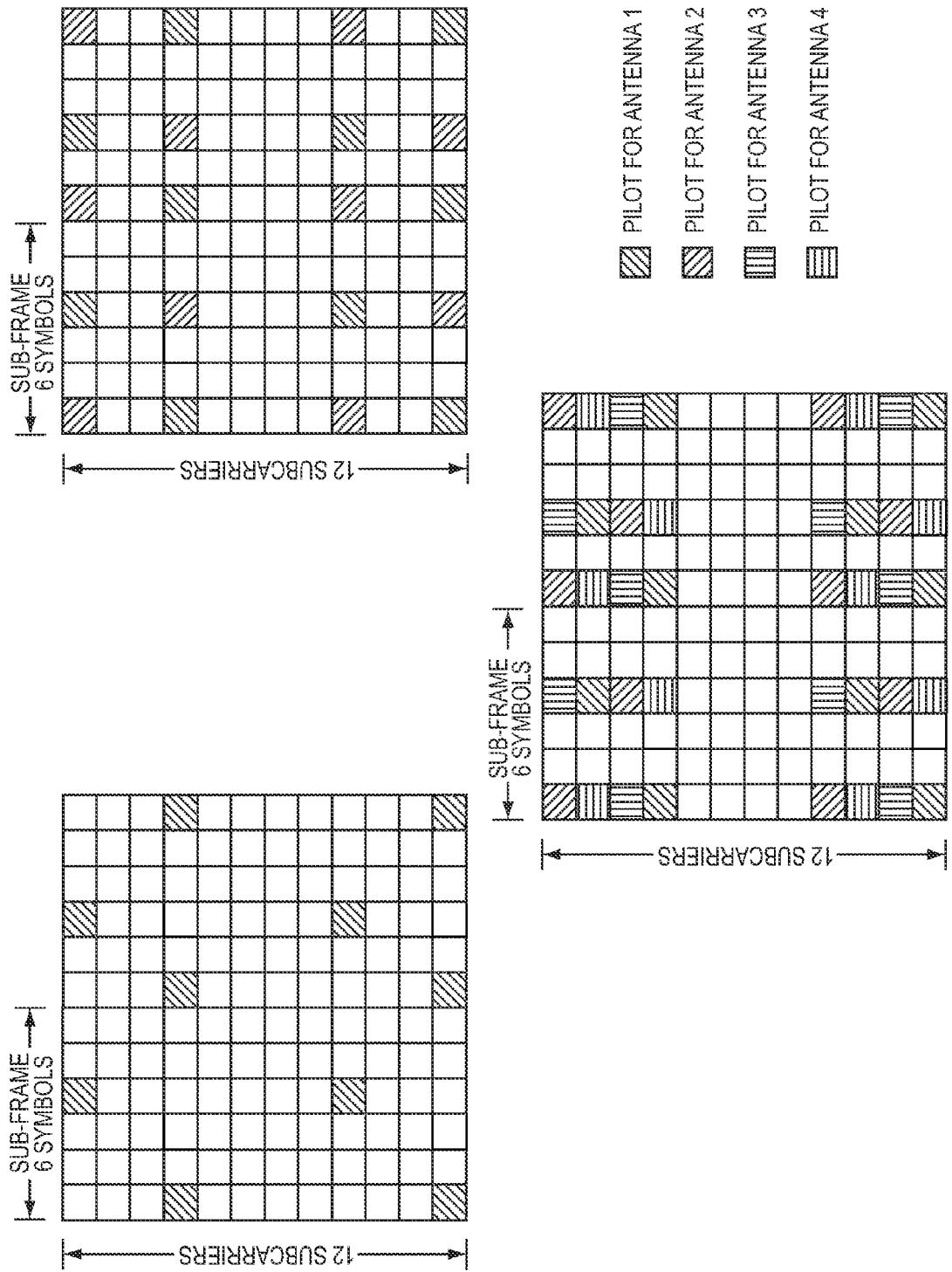

FIG. 14E illustrates exemplary staggered pilot symbol patterns for one, two, and four transmit antennas for a resource unit that is twice the size of the resource unit of FIGS. 14A through 14C. Specifically, the resource unit of FIGS. 14A through 14C is a 6 symbol by 12 sub-carrier block of symbol locations. In contrast, the resource unit of FIG. 14E is 12 symbols by 12 sub-carriers. As such, if a sub-frame of the transmit frame is 6 symbols, the resource unit of FIG. 14E is a contiguous resource unit that spans two neighboring sub-frames. Note that because the size of the resource unit has increased as compared to that of FIGS. 14A through 14C, the density of the staggered pilot symbol pattern of FIG. 14E has decreased.

Figure 14F:
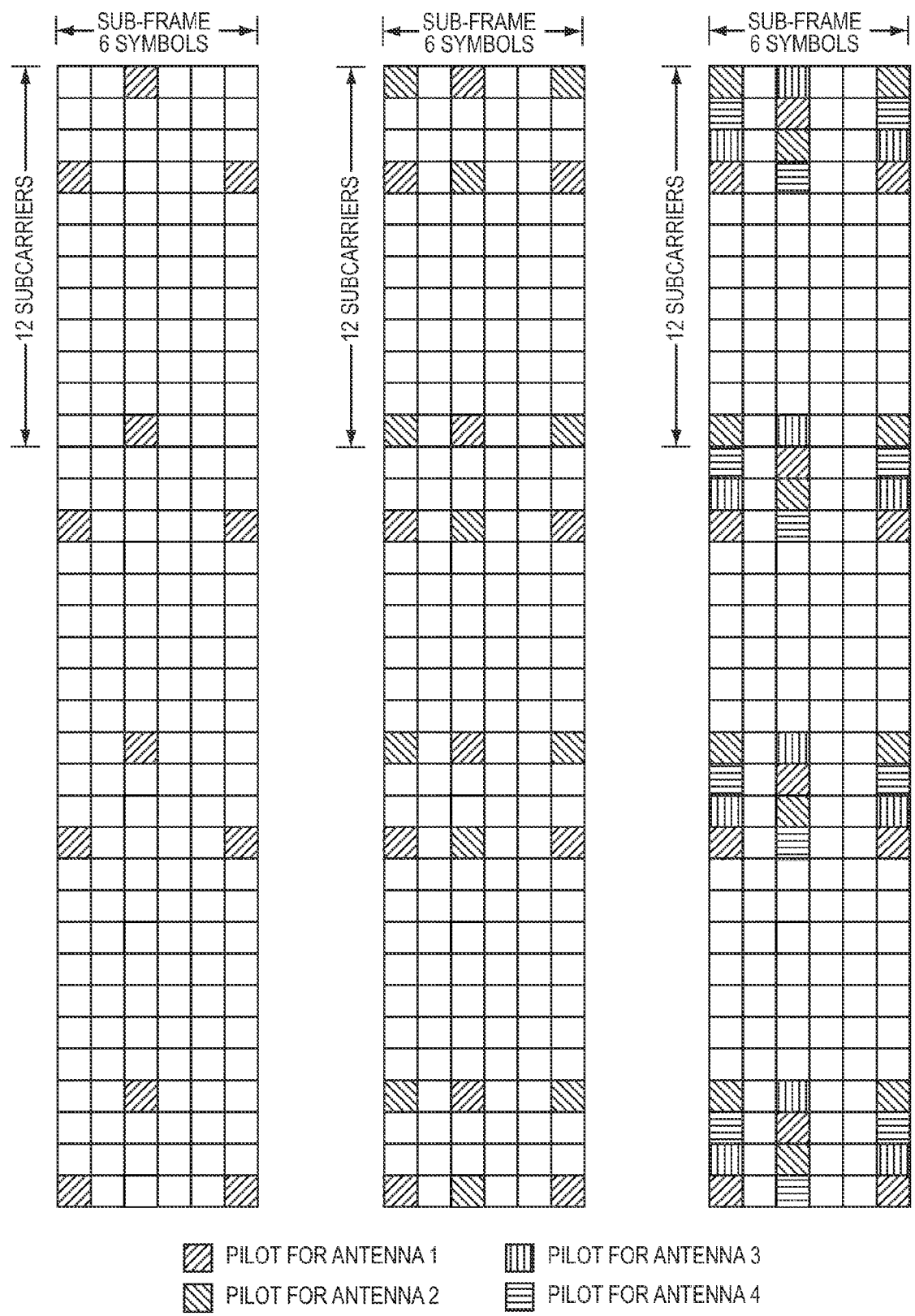

FIG. 14F illustrates exemplary staggered pilot symbol patterns for one, two, and four transmit antennas for a resource unit that is three times the size of the resource unit of FIGS. 14A through 14C. Specifically, the resource unit of FIGS. 14A through 14C is a 6 symbol by 12 sub-carrier block of symbol locations. In contrast, the resource unit of FIG. 14F is 6 symbols by 36 sub-carriers. Note that because the size of the resource unit has increased as compared to that of FIG. 14D, the density of the staggered pilot symbol pattern of FIG. 14F has further decreased.

Figure 14G:
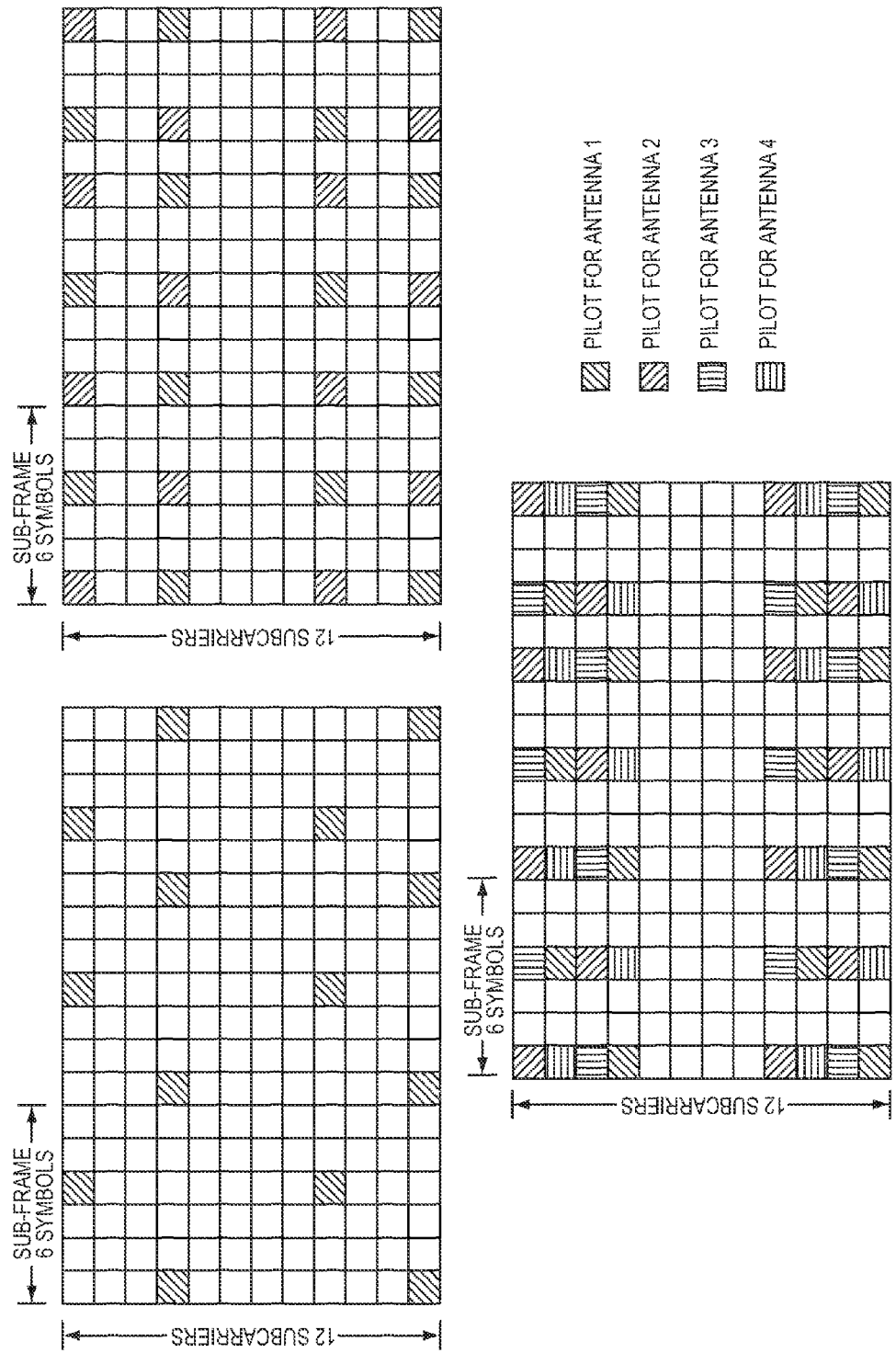

FIG. 14G illustrates exemplary staggered pilot symbol patterns for one, two, and four transmit antennas for a resource unit that is three times the size of the resource unit of FIGS. 14A through 14C. Specifically, the resource unit of FIGS. 14A through 14C is a 6 symbol by 12 sub-carrier block of symbol locations. In contrast, the resource unit of FIG. 14G is 18 symbols by 12 sub-carriers. As such, if a sub-frame of the transmit frame is 6 symbols, the resource unit of FIG. 14G is a contiguous resource unit that spans three neighboring sub-frames. Note that because the size of the resource unit has increased as compared to that of FIGS. 14E, the density of the staggered pilot symbol pattern of FIG. 14G has further decreased.

Figure 14H:
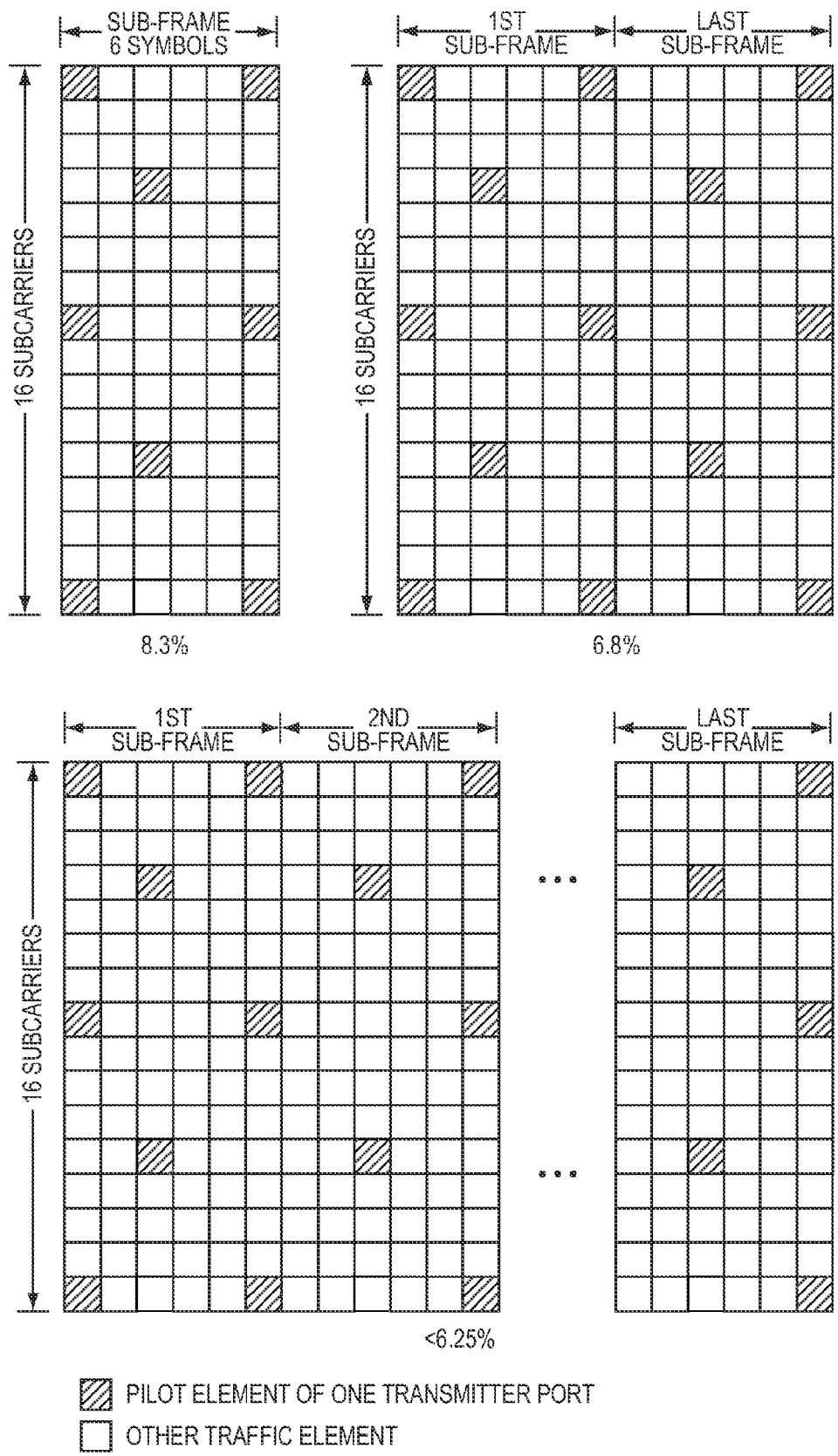

FIG. 14H illustrates exemplary staggered pilot symbol patterns for a 6 symbol by 16 sub-carrier resource unit, a 12 symbol by 16 sub-carrier resource unit, and a 6N by 16 sub-carrier resource unit. This may particularly be the case for an uplink frame where an OFDM transmitter 10 of a particular mobile station, or user equipment device, is allocated continuous resources in one or more sub-frames of the uplink frame. Note that, in this case, the pilots inserted into the resource block may be dedicated pilot symbols specific to the OFDM transmitter 10. As illustrated in FIG. 14H, as the size of the resource unit increases, the density of the staggered pilot symbol pattern decreases.

Figure 15A:
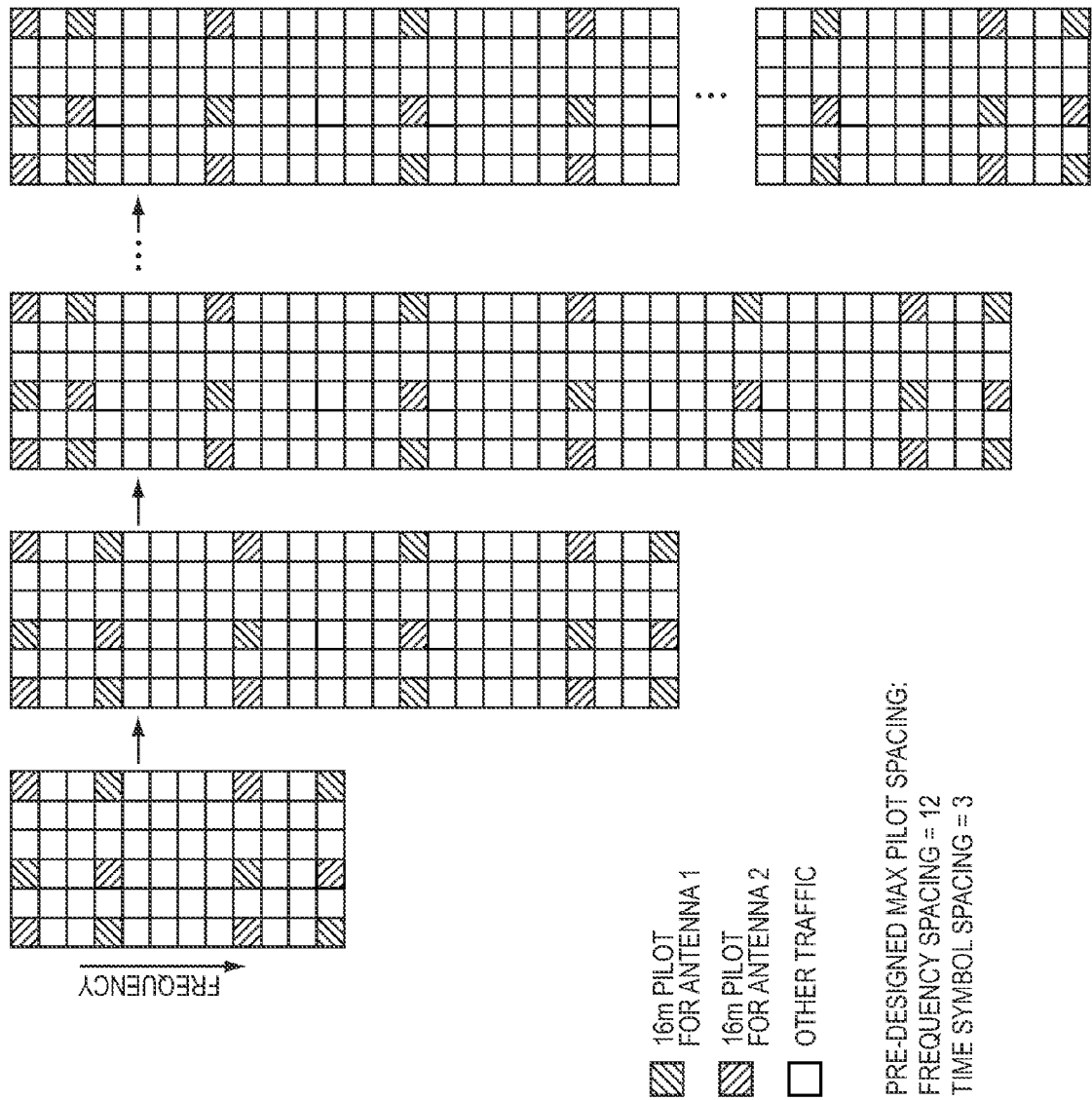
FIGS. 15A and 15B graphically illustrate the design of exemplary pilot symbol patterns that may be used for pilot insertion according to the process of FIG. 13.
Figure 15B:
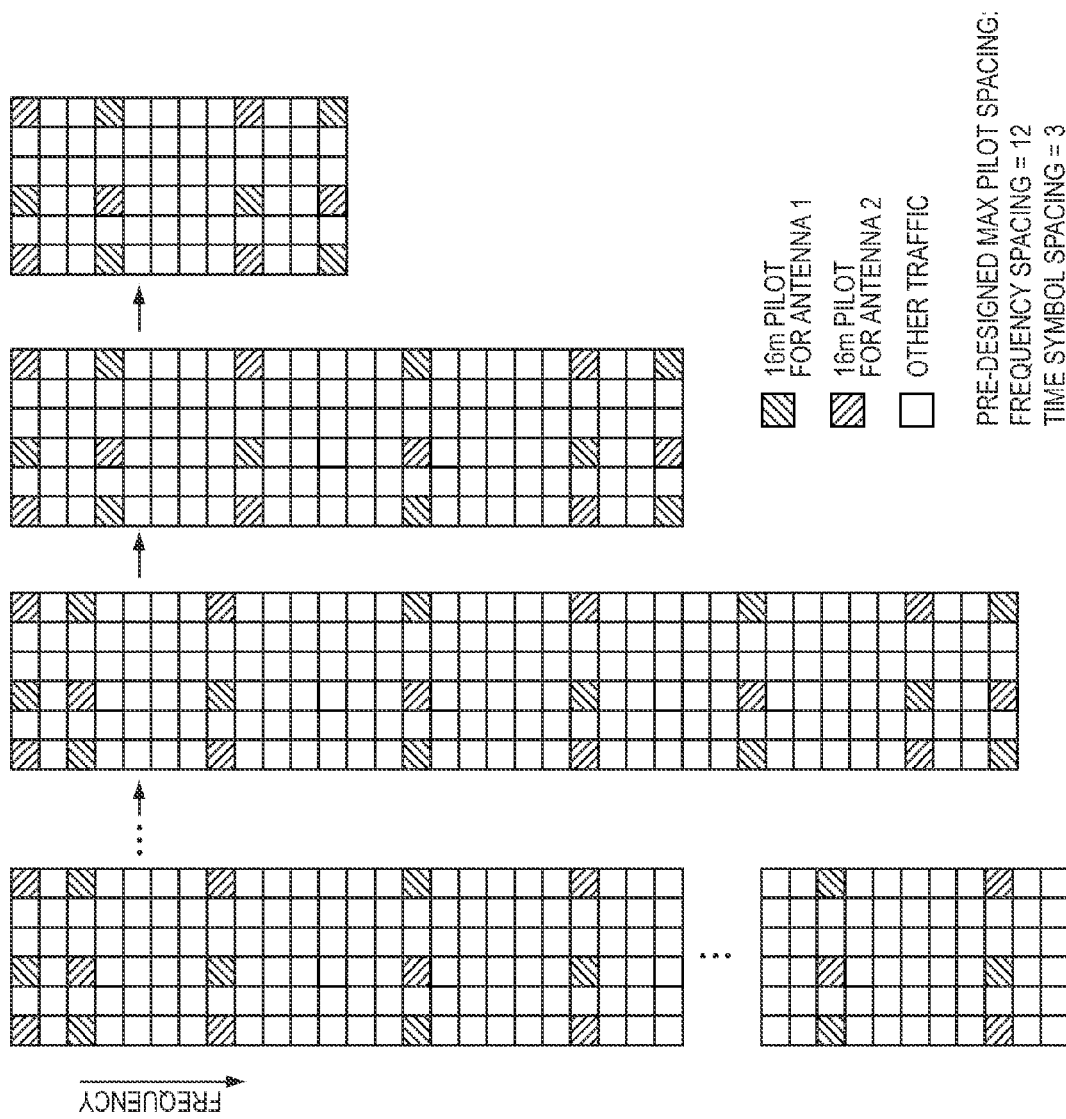

FIGS. 15A and 15B graphically illustrate the design of the predetermined staggered pilot symbol patterns for a number of different resource unit sizes according to an exemplary embodiment of this disclosure. As illustrated in FIG. 15A, a staggered pilot symbol pattern is defined for a first resource unit size, which may be the smallest resource unit size. Next, the staggered pilot symbol pattern is extended for a second resource unit size that is twice that of the first resource unit size, wherein redundant or unnecessary pilot symbol locations are removed while keeping the staggered pilot symbol pattern substantially uniform. Then, the staggered pilot symbol pattern is further extended for a third resource unit size that is three times that of the first resource unit size, wherein redundant or unnecessary pilot symbols are removed while keeping the staggered pilot symbol pattern substantially uniform. The process continues such that staggered pilot symbol patterns are defined for each of a number of resource unit sizes. FIG. 15B illustrates a similar process that begins with a staggered pilot symbol pattern for a largest resource unit size, rather than the smallest resource unit size.

Figure 16:
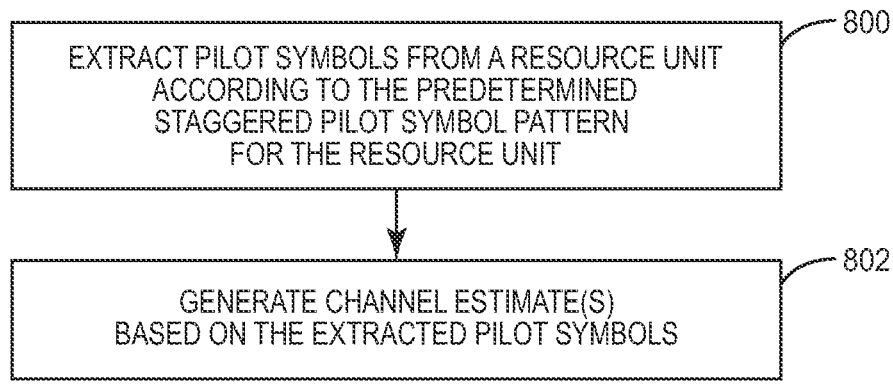
FIG. 16 is a flow chart illustrating the operation of the channel estimator of the OFDM receiver of FIG. 2 according to another embodiment of this disclosure.

FIG. 16 is a flow chart illustrating the operation of the channel estimator 76 of FIG. 2 according to yet another embodiment of this disclosure. This discussion is equally applicable to the channel estimator of the second OFDM component 58 of the OFDM receiver 50 of FIG. 2. In this embodiment, the OFDM receiver 50 receives a transmit frame including a resource unit having pilots inserted therein based on a staggered pilot symbol pattern for the resource unit.

In operation, the channel estimator 76 extracts the pilot symbols inserted into the resource unit from the symbols, or more specifically symbol estimates, received from the FFT processor 70 according to the predetermined staggered pilot symbol pattern for the resource unit (step 800). If the resource unit varies in size, the channel estimator 76 may determine the size of the resource unit and then extract the pilot symbols from the resource unit according to the predetermined staggered pilot symbol pattern for a resource unit of that size. The channel estimator 76 then generates channel estimates for each sub-carrier frequency for each OFDM symbol in the resource unit based on the extracted pilot symbols using known channel estimation techniques (step 802). More specifically, for each extracted pilot symbol, the channel estimator 76 may directly determine the channel response for the corresponding sub-carrier and OFDM symbol based on a comparison of the extracted pilot symbol and an expected pilot symbol known to be transmitted by the OFDM transmitter 10. Then, channel responses for the remaining sub-carrier and OFDM symbol combinations (i.e., the non-pilot symbol locations) in the resource unit are estimated using known interpolation and, if needed, extrapolation techniques. Since the staggered pilot symbol pattern for the resource unit is designed to have pilot symbol locations at or near the time and/or frequency boundaries of the resource unit, the number of extrapolations needed for channel estimation is substantially reduced, if not eliminated, as compared to that needed for previous pilot patterns.

FIGS. 17-21 describe an embodiment of the disclosure that is similar to that described above with respect to FIGS. 13-16. However, the embodiment of FIGS. 17-21 relate to pilot symbol patterns for an uplink frame in IEEE 802.16m1 having Frequency Division Multiplexing (FDM) legacy support. In an uplink frame having FDM legacy support, legacy resource units are first allocated in the uplink frame. Then, modern resource units, which in this embodiment are IEEE 802.16m resource units, are allocated using the remaining resources of the uplink frame.

Figure 17:
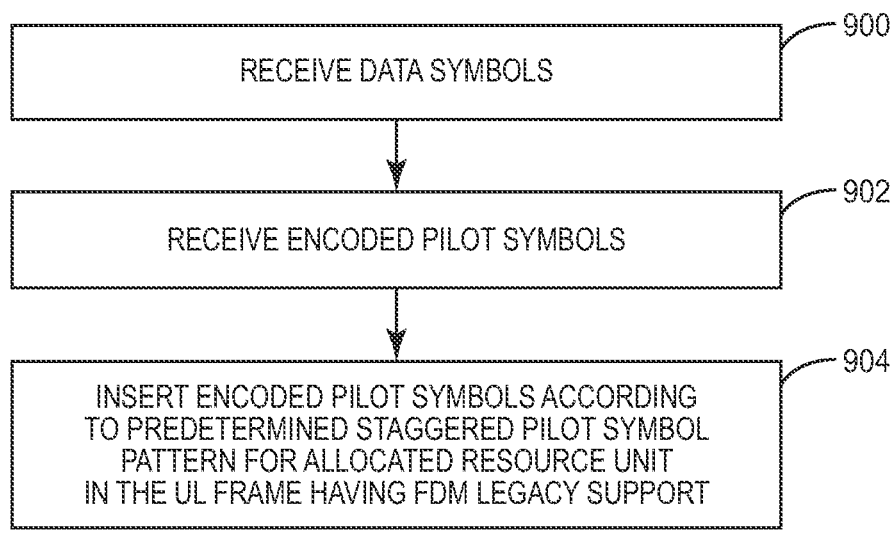
FIG. 17 is a flow chart illustrating the operation of the pilot inserter of the OFDM transmitter of FIG. 1 according to another embodiment of this disclosure.

FIG. 17 is a flow chart illustrating the operation of each of the pilot inserters 24 and 46 of FIG. 1 to insert pilot symbols among the data symbols in a resource unit allocated in an IEEE 802.16m uplink frame having legacy FDM support according to yet another embodiment of this disclosure. The method will be described with reference to the pilot inserter 24 in the first OFDM component 20. However, the method is equally applicable to the pilot inserter 46 of the second OFDM component 44. Further, while this discussion focuses on the uplink frame having legacy FDM support for IEEE 802.16m, this process is also applicable to any transmit frame in an OFDM communication system having legacy FDM support. The resource unit is a portion of the uplink frame allocated to the OFDM transmitter 10. More specifically, the resource unit may be a sub-frame, a portion of one sub-frame, or contiguous portions of one or more neighboring sub-frames. In this embodiment, the pilot symbols inserted into the resource unit are dedicated pilot symbols.

In operation, the pilot inserter 24 receives data symbols from the demultiplexer 22 for the resource unit of the transmit frame (step 900), and receives encoded pilot symbols from the pilot STBC function 40 (step 902). The pilot STBC function 40 generates (or receives) two pilot symbols and applies STBC encoding to the pilot symbols so as to generate an STBC block of encoded pilot symbols. The encoded pilot symbols generated for the first transmitting antenna 38 will be one row of the STBC block and will have a number equal to the number of transmitting antennas in the OFDM transmitter 10. Thus, for the two antenna OFDM transmitter 10 of FIG. 1, a 2×2 STBC block is generated.

The pilot inserter 24 inserts the encoded pilot symbols into the resource unit according to a predetermined staggered pilot symbol pattern for the resource unit in the uplink frame having legacy FDM support (step 904). The predetermined staggered pilot symbol pattern includes pilot symbol locations at or near both time boundaries of the resource unit, at or near both frequency boundaries of the resource unit, or pilot symbol locations at or near both the time boundaries and the frequency boundaries of the resource unit. In some cases, a pilot symbol location is at or near a time boundary of the resource unit if the pilot symbol location is in the first or near the first OFDM symbol from the time boundary, and a pilot symbol location is at or near a frequency boundary of the resource unit if the pilot symbol location is in the first or near the first sub-carrier from the frequency boundary. Again, for example, a pilot symbol location may be considered to be at or near a time boundary of the resource unit if the pilot symbol location is in the first or second OFDM symbol from the time boundary. Likewise, for example, a pilot symbol location may be considered to be at or near a frequency boundary of the resource unit if the pilot symbol location is in the first or second sub-carrier from the frequency boundary.

In one embodiment, the size of the resource unit may vary, and the predetermined staggered pilot symbol pattern is a function of the size of the resource unit. At times, a density of the staggered pilot symbol pattern is inversely related to the size of the resource unit. The size of the resource unit is related to a number of symbol locations within the resource unit. In one embodiment, for an uplink frame having legacy FDM support, the size of the resource unit is a multiple of a size of a legacy resource unit. For example, the resource unit may be the same size as the legacy resource unit, two times the size of the legacy resource unit, etc. A different staggered pilot symbol pattern may be defined for each of a number of sizes of resource units. Then, the pilot inserter 24 determines the staggered pilot symbol pattern to be used based on the size of the resource unit for the transmission.

Figure 18B:
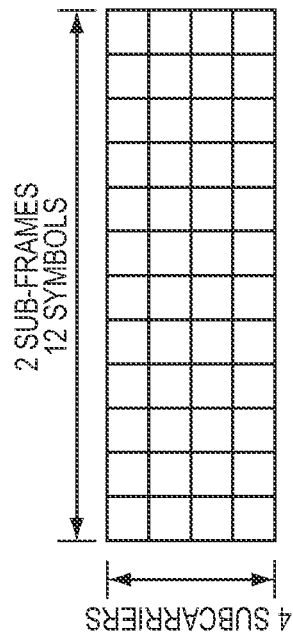
FIGS. 18A and 18B illustrate exemplary modern resource blocks.
Figure 18A:
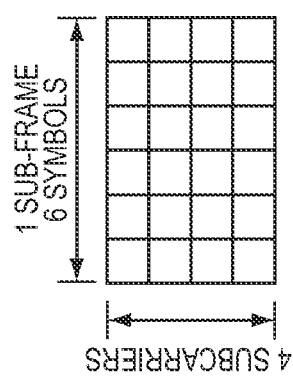

In one embodiment, the legacy resource unit is a 3 symbol by 4 sub-carrier block within the uplink frame. FIG. 18A illustrates an exemplary modern resource unit, or resource unit, that is two times the size of the legacy resource unit. FIG. 18B illustrates an exemplary modern resource unit, or resource unit, that is three times the size of the legacy resource unit. While only the exemplary resource units of FIGS. 18A and 18B are illustrated, resource units having sizes of larger multiples of the size of the legacy sub-frame may be used.

Figure 19:
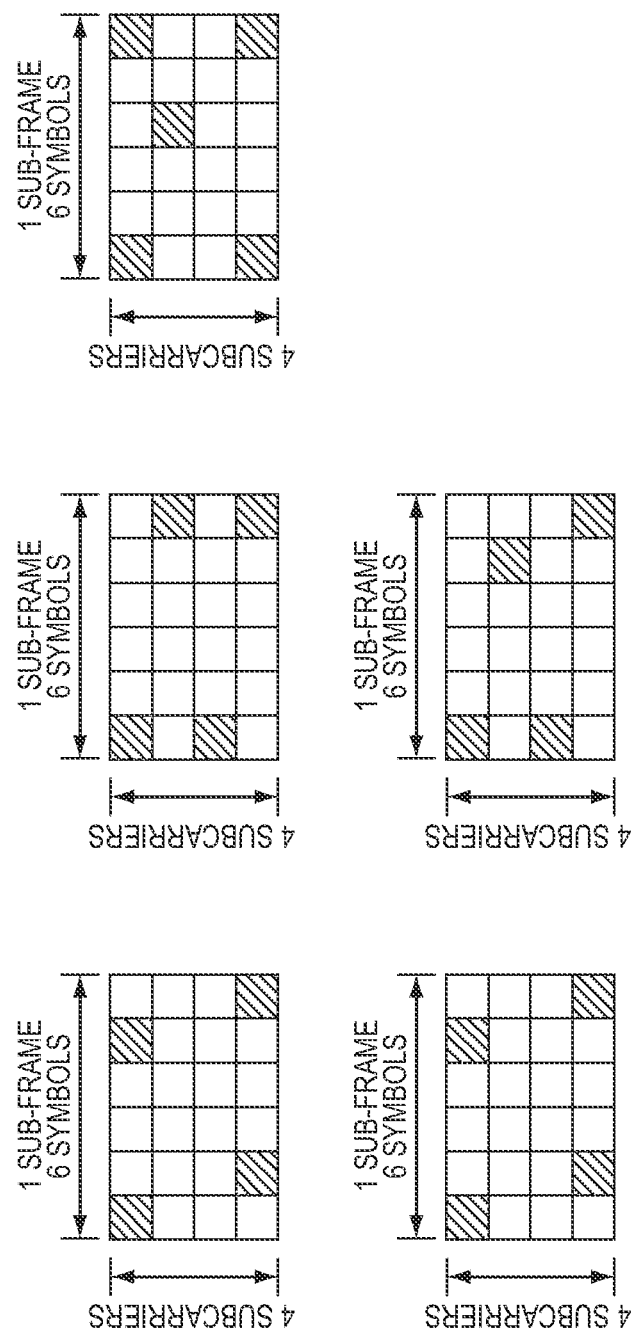
FIG. 19 illustrates exemplary pilot symbol patterns for the resource block of FIG. 18A.
Figure 20:
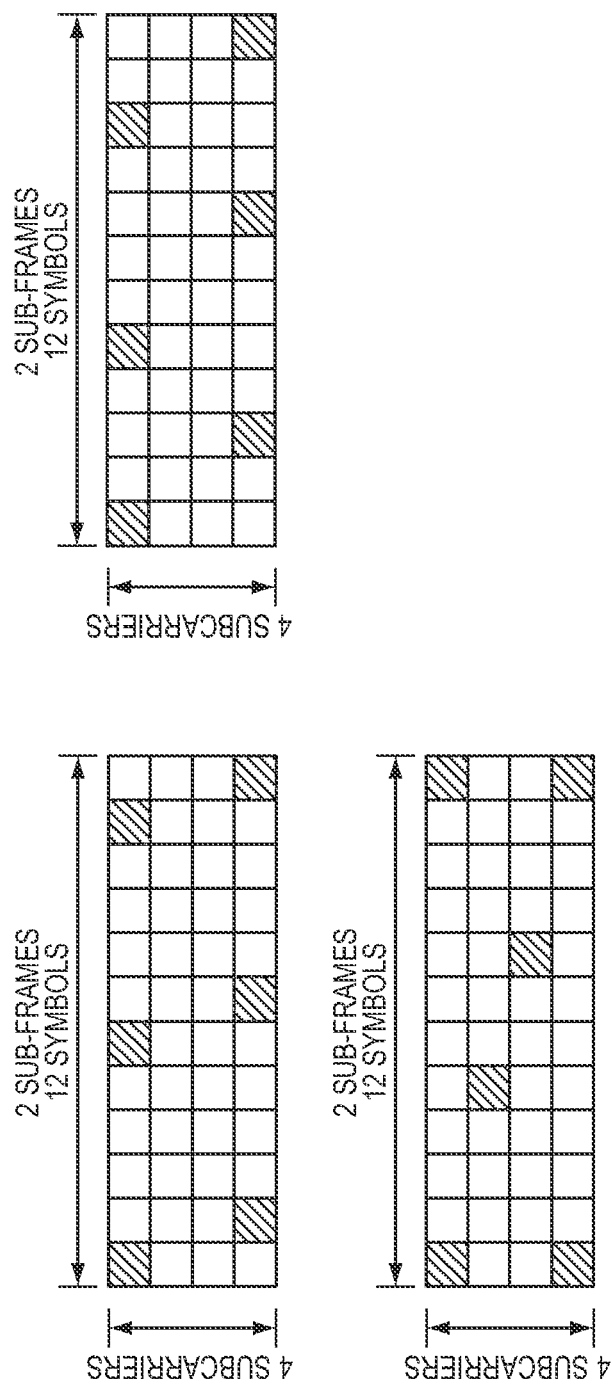
FIG. 20 illustrates exemplary pilot symbol patterns for the resource block of FIG. 18B.

FIG. 19 illustrates a number of exemplary pilot symbol patterns for the resource unit of FIG. 18A. Each of these exemplary pilot symbol patterns includes pilot symbol locations at or near the time and/or frequency boundaries of the resource unit, thereby reducing, if not eliminating, the need for extrapolations when performing channel estimation for the resource unit. FIG. 20 illustrates a number of exemplary pilot symbol patterns for the resource unit of FIG. 18B. Each of these exemplary pilot symbol patterns includes pilot symbol locations at or near the time and/or frequency boundaries of the resource unit, thereby reducing, if not eliminating, the need for extrapolations when performing channel estimation for the resource unit. Note that the density of the pilot patterns of FIG. 20 are reduced as a compared to the density of the pilot patterns of FIG. 19 as a result of the increase in the size of the resource unit.

Figure 21:
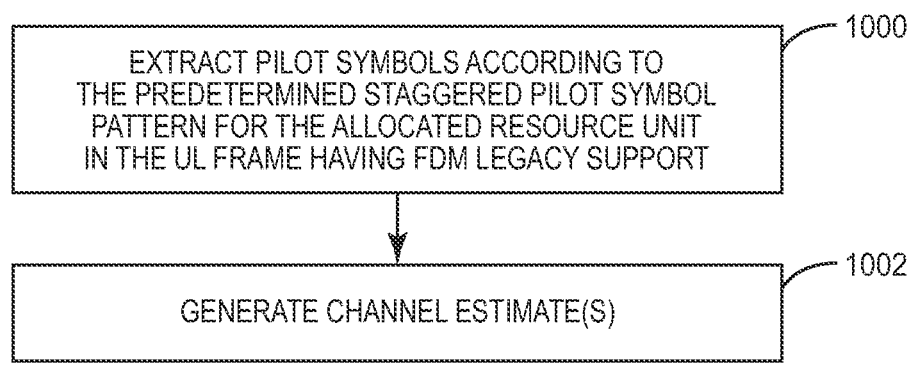
FIG. 21 is a flow chart illustrating the operation of the channel estimator of the OFDM receiver of FIG. 2 according to another embodiment of this disclosure.

FIG. 21 is a flow chart illustrating the operation of the channel estimator 76 of FIG. 2 according to yet another embodiment of this disclosure. This discussion is equally applicable to the channel estimator of the second OFDM component 58 of the OFDM receiver 50 of FIG. 2. In this embodiment, the OFDM receiver 50 receives an uplink frame having FDM legacy support as described above. For each modern resource unit in the uplink frame, the channel estimator 76 extracts the pilot symbols inserted into the resource unit from the symbols, and more specifically symbol estimates, received from the FFT processor 70 according to the predetermined staggered pilot symbol pattern for the resource unit (step 1000). If the resource unit varies in size, the channel estimator 76 may determine the size of the resource unit and then extract the pilot symbols from the resource unit according to the predetermined staggered pilot symbol pattern for a resource unit of that size.

The channel estimator 76 then generates channel estimates for each sub-carrier frequency for each OFDM symbol in the resource unit based on the extracted pilot symbols using known channel estimation techniques (step 1002). More specifically, for each extracted pilot symbol, the channel estimator 76 may directly determine the channel response for the corresponding sub-carrier and OFDM symbol based on a comparison of the extracted pilot symbol and an expected pilot symbol known to be transmitted by the OFDM transmitter 10. Then, channel responses for the remaining sub-carrier and OFDM symbol combinations (i.e., the non-pilot symbol locations) in the resource unit are estimated using known interpolation and, if needed, extrapolation techniques. Since the staggered pilot symbol pattern for the resource unit is designed to have pilot symbol locations at or near the time and/or frequency boundaries of the resource unit, the number of extrapolations needed for channel estimation is substantially reduced, if not eliminated, as compared to that needed for previous pilot patterns.

Those skilled in the art will recognize improvements and modifications to various embodiments described herein. All such improvements and modifications are considered within the scope of the concepts disclosed herein and the claims that follow.

What is claimed is:

1. A computer-implemented method comprising:
    receiving data symbols for a resource of a transmit frame, wherein the resource of the transmit frame is one or more sub-frames of a downlink frame;
    receiving one or more pilot symbols; and
    inserting the one or more pilot symbols into the resource of the transmit frame according to a predetermined staggered pilot symbol pattern including one or more of a group comprising:
        pilot symbol locations located at or near each time boundary of the resource; and
        pilot symbol locations located at or near each frequency boundary of the resource,
    wherein the predetermined staggered pilot symbol pattern includes pilot symbol locations in a last sub-frame of the one or more sub-frames that are adjusted with respect to pilot symbol locations for other sub-frames of the one or more sub-frames such that the predetermined staggered pilot symbol pattern includes pilot symbol locations at or near an ending time boundary of the last sub-frame of the one or more sub-frames.

2. The computer-implemented method of claim 1, wherein the one or more sub-frames are a plurality of sub-frames, the predetermined staggered pilot symbol pattern is uniform from a first sub-frame of the plurality of sub-frames through a next-to-last sub-frame of the plurality of sub-frames, and the pilot symbol locations in the last sub-frame are substantially uniform with pilot symbol locations in the first through next-to-last sub-frames.

3. The computer-implemented method of claim 2, wherein the predetermined staggered pilot symbol pattern starts at or near a starting time boundary of the first sub-frame.

4. The computer-implemented method of claim 1, wherein a time spacing between the pilot symbol locations in the last sub-frame is greater than a time spacing between the pilot symbol locations in the other sub-frames.

5. The computer-implemented method of claim 1, wherein the last sub-frame includes additional pilot symbol locations as compared to the other sub-frames.

6. The computer-implemented method of claim 1, wherein the computer comprises a mobile station.

7. The computer-implemented method of claim 1, wherein the transmit frame is associated with an Orthogonal Frequency Division Multiplexing (OFDM) transmitter.

8. One or more computer-readable hardware storage memory devices comprising processor-executable instructions which, responsive to execution by at least one processor, are configured to enable a transmitter device to:

receive data symbols for a resource of a transmit frame, wherein the resource of the transmit frame is one or more sub-frames of a downlink frame;

receive one or more pilot symbols; and insert the one or more pilot symbols into the resource of the transmit frame according to a predetermined staggered pilot symbol pattern including one or more of a group consisting of:

pilot symbol locations located at or near each time boundary of the resource; and pilot symbol locations located at or near each frequency boundary of the resource, wherein the predetermined staggered pilot symbol pattern includes pilot symbol locations in a first sub-frame of the one or more sub-frames that are adjusted with respect to pilot symbol locations for other sub-frames of the one or more sub-frames such that the predetermined staggered pilot symbol pattern includes pilot symbol locations at or near a starting time boundary of the first sub-frame of the one or more sub-frames.

9. The one or more computer-readable hardware storage memory devices of claim 8, wherein the one or more sub-frames are a plurality of sub-frames, the predetermined staggered pilot symbol pattern is uniform from a second sub-frame of the plurality of sub-frames through a last sub-frame of the plurality of sub-frames, and the pilot symbol locations in the first sub-frame are substantially uniform with pilot symbol locations in the second through last sub-frames.

10. The one or more computer-readable hardware storage memory devices of claim 9, wherein the predetermined staggered pilot symbol pattern ends at or near an ending time boundary of the last sub-frame.

11. The one or more computer-readable hardware storage memory devices of claim 8, wherein a time spacing between the pilot symbol locations in the first sub-frame is greater than a time spacing between the pilot symbol locations in the other sub-frames.

12. The one or more computer-readable hardware storage memory devices of claim 8, wherein the first sub-frame includes additional pilot symbol locations as compared to the other sub-frames.

13. The one or more computer-readable hardware storage memory devices of claim 8, wherein the transmitter device comprises a mobile station.

14. The one or more computer-readable hardware storage memory devices of claim 8, wherein the transmitter device comprises an Orthogonal Frequency Division Multiplexing (OFDM) transmitter.

15. A method implemented, at least in part, using a computer, the method comprising:

receiving data symbols for a resource of a transmit frame, wherein the resource of the transmit frame is one or more sub-frames of a downlink frame;

receiving one or more pilot symbols; and inserting the one or more pilot symbols into the resource of the transmit frame according to a predetermined staggered pilot symbol pattern including one or more of a group consisting of:

pilot symbol locations located at or near each time boundary of the resource; and pilot symbol locations located at or near each frequency boundary of the resource, wherein the predetermined staggered pilot symbol pattern includes pilot symbol locations in a first sub-frame of the one or more sub-frames that are adjusted with respect to pilot symbol locations for other sub-frames of the one or more sub-frames such that the predetermined staggered pilot symbol pattern includes pilot symbol locations at or near a starting time boundary of the first sub-frame of the one or more sub-frames.

16. The method of claim 15, wherein the one or more sub-frames are a plurality of sub-frames, the predetermined staggered pilot symbol pattern is uniform from a second sub-frame of the plurality of sub-frames through a last sub-frame of the plurality of sub-frames, and the pilot symbol locations in the first sub-frame are substantially uniform with pilot symbol locations in the second through last sub-frames.

17. The method of claim 16, wherein the predetermined staggered pilot symbol pattern ends at or near an ending time boundary of the last sub-frame.

18. The method of claim 15, wherein a time spacing between the pilot symbol locations in the first sub-frame is greater than a time spacing between the pilot symbol locations in the other sub-frames.

19. The method of claim 15, wherein the first sub-frame includes additional pilot symbol locations as compared to the other sub-frames.

20. The method of claim 16, wherein the computer comprises an Orthogonal Frequency Division Multiplexing (OFDM) transmitter.

* * * * *